(12) United States Patent
Baek et al.

(10) Patent No.: US 9,170,449 B2
(45) Date of Patent: Oct. 27, 2015

(54) DISPLAY DEVICE

(71) Applicant: Samsung Display Co., Ltd., Yongin, Gyeonggi-Do (KR)

(72) Inventors: Seung Soo Baek, Hwaseong-si (KR); Woong Kwon Kim, Cheonan-si (KR); Sang Ho Kim, Cheonan-si (KR); Jae-Jin Song, Hwaseong-si (KR); Sang Wook Lee, Seoul (KR); Hea Chun Lee, Suwon-si (KR); Young Goo Song, Asan-si (KR); Nam-Heon Kim, Seongnam-si (KR); Dae Cheol Kim, Hwaseong-si (KR); Sung Ryul Kim, Asan-si (KR); Jung Suk Bang, Guri-si (KR); Ki Hun Jeong, Cheongan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/043,170

(22) Filed: Oct. 1, 2013

(65) Prior Publication Data
US 2014/0211103 A1   Jul. 31, 2014

(30) Foreign Application Priority Data

Jan. 28, 2013 (KR) .................. 10-2013-0009171
Feb. 15, 2013 (KR) .................. 10-2013-0016478

(51) Int. Cl.
*G02F 1/1337* (2006.01)
*G02F 1/1333* (2006.01)
*G02F 1/1335* (2006.01)
(Continued)

(52) U.S. Cl.
CPC ...... *G02F 1/13338* (2013.01); *G02F 1/133512* (2013.01); *G02F 1/133753* (2013.01); *G06F 3/0317* (2013.01); *G02F 1/133707* (2013.01); *G02F 1/136209* (2013.01); *G02F 2001/133374* (2013.01)

(58) Field of Classification Search
CPC .......... G02F 1/133707; G02F 1/13393; G02F 1/133753
USPC .......................................... 349/129, 130, 110
See application file for complete search history.

(56) References Cited

U.S. PATENT DOCUMENTS

| 6,465,784 | B1 | 10/2002 | Kimata |
| 6,502,756 | B1 | 1/2003 | Fahraeus |
| 6,597,427 | B1 | 7/2003 | Katsu |

(Continued)

FOREIGN PATENT DOCUMENTS

| JP | 2005-257463 | 9/2005 |
| JP | 2007-017756 | 1/2007 |

(Continued)

OTHER PUBLICATIONS

EP13186549 European Search Report dated Mar. 7, 2014.

*Primary Examiner* — Thanh-Nhan P Nguyen
(74) *Attorney, Agent, or Firm* — Innovation Counsel LLP

(57) ABSTRACT

Touch-related information which cannot be acquired by the naked eye (dubbed here as sub-optical pattern information) has its corresponding sub-optical patterns respectively positioned within the aperture areas of respective domains such that the displayed image, as viewed from different viewing angles is not adversely affected by the embedded sub-optical patterns. One type of touch-related information which can be conveyed is that of touch location of a sub-optical pattern sensing pen positioned over one or more of the sub-optical patterns.

35 Claims, 50 Drawing Sheets

(51) Int. Cl.
    *G06F 3/03*     (2006.01)
    *G02F 1/1362*   (2006.01)

(56)          References Cited

U.S. PATENT DOCUMENTS

| | | | |
|---|---|---|---|
| 6,663,008 | B1 | 12/2003 | Pettersson et al. |
| 6,689,966 | B2 | 2/2004 | Wiebe |
| 6,838,306 | B2 | 1/2005 | Cole |
| 6,864,880 | B2 | 3/2005 | Hugosson et al. |
| 6,992,655 | B2 | 1/2006 | Ericson et al. |
| 7,248,250 | B2 | 7/2007 | Pettersson et al. |
| 7,281,668 | B2 | 10/2007 | Pettersson et al. |
| 7,345,673 | B2 | 3/2008 | Ericson et al. |
| 7,408,536 | B2 | 8/2008 | Hugosson et al. |
| 7,418,160 | B2 | 8/2008 | Lynggaard |
| 7,436,393 | B2 | 10/2008 | Hong et al. |
| 7,588,191 | B2 | 9/2009 | Pettersson et al. |
| 7,622,182 | B2 | 11/2009 | Wang et al. |
| 7,710,408 | B2 | 5/2010 | Ericson et al. |
| 7,864,284 | B2 * | 1/2011 | Morii et al. .................. 349/155 |
| 7,950,588 | B2 | 5/2011 | Bjorklund |
| 8,074,891 | B2 | 12/2011 | Ericson et al. |
| 8,162,220 | B2 | 4/2012 | Pettersson et al. |
| 8,270,775 | B2 | 9/2012 | Yang et al. |
| 8,271,864 | B2 | 9/2012 | Lynggaard et al. |
| 8,570,465 | B2 * | 10/2013 | Kim et al. .................... 349/106 |
| 2001/0026347 | A1 * | 10/2001 | Sawasaki et al. ............ 349/156 |
| 2003/0112398 | A1 * | 6/2003 | Kim et al. .................... 349/129 |
| 2004/0227890 | A1 | 11/2004 | Chung |
| 2005/0104861 | A9 | 5/2005 | Pettersson et al. |
| 2005/0134788 | A1 * | 6/2005 | Park .............................. 349/158 |
| 2006/0082557 | A1 | 4/2006 | Ericson et al. |
| 2007/0003150 | A1 | 1/2007 | Xu |
| 2007/0153200 | A1 | 7/2007 | Kazuyoshi |
| 2007/0247445 | A1 | 10/2007 | Lynggaard et al. |
| 2008/0024706 | A1 * | 1/2008 | Yang et al. .................... 349/129 |
| 2008/0075333 | A1 | 3/2008 | Ericson et al. |
| 2008/0233360 | A1 | 9/2008 | Sekine et al. |
| 2009/0002588 | A1 | 1/2009 | Lee |
| 2009/0182527 | A1 | 7/2009 | Wiebe et al. |
| 2010/0136868 | A1 | 6/2010 | Chien et al. |
| 2010/0148067 | A1 | 6/2010 | Cheon et al. |
| 2011/0234512 | A1 | 9/2011 | Kim et al. |
| 2012/0154723 | A1 * | 6/2012 | Chang et al. ................. 349/106 |

FOREIGN PATENT DOCUMENTS

| | | |
|---|---|---|
| JP | 2007-323165 | 12/2007 |
| JP | 2008-026958 | 2/2008 |
| JP | 2009-109982 | 5/2009 |
| JP | 2009-151095 | 7/2009 |
| JP | 2011-028020 | 2/2011 |
| JP | 2011-073353 | 4/2011 |
| JP | 2012-098687 | 5/2012 |
| KR | 100628463 | 9/2006 |
| KR | 1020080061229 A | 7/2008 |
| KR | 1020110037218 A | 4/2011 |
| KR | 101103789 B1 | 1/2012 |

* cited by examiner

DISPLAY DEVICE

CROSS-REFERENCE TO RELATED APPLICATION

This application claims priority to and the benefit of Korean Patent Application No. 10-2013-0009171 filed in the Korean Intellectual Property Office on Jan. 28, 2013 and No. 10-2013-0016478 filed in the Korean Intellectual Property Office on Feb. 15, 2013, the entire contents of which applications are incorporated herein by reference.

BACKGROUND (a) Technical Field

The present disclosure of invention relates to a display device, and more particularly, to a display device capable of acquiring touch information.

(b) Description of Related Technology

Recently, advancements in display devices have been rapidly developing because flat and/or curved thin panel displays have been explosively capturing the market. Here, the flat and/or curved thin panel display means a display device having a thickness smaller than a size of a conventional CRT (cathode ray tube) screen, and may include as an example, a liquid crystal display (LCD), an organic light emitting diodes display (OLEDD), and the like.

The display device includes a plurality of pixels displaying an image and a driver for driving the plurality of pixels. In order to implement color display, each pixel uniquely displays in an area perceived by the naked eye as no more than a dot, one of primary colors or alternately displays the primary colors rapidly integrated over time so that a desired color is recognized by the spatial and temporal summing of the luminances of the primary colors as performed by the human visual system. An example of the primary colors may include three primary colors such as red, green, and blue. In the case of spatial division, each pixel of the display device may include a color filter or a light emitting member expressing one of the primary colors. A set of pixels expressing the respective primary colors may express full colors together.

The liquid crystal display (LCD) which is one of the most common types of flat (or curved) thin panel displays currently in use, includes two sheets of display panels with field generating electrodes such as a pixel electrode, a common electrode, and the like and a liquid crystal layer interposed therebetween. The liquid crystal display device generates an electric field in the liquid crystal layer by applying voltage to the field generating electrodes, and determines the direction of liquid crystal molecules of the liquid crystal layer by the generated electric field, thus controlling polarization of incident light so as to display images. The field generating electrodes generating the electric field in the liquid crystal layer may be provided on the two display panels, respectively, or alternatively they may be provided on the same display panel.

The liquid crystal display includes a switching element connected to each pixel electrode and a plurality of signal lines such as a gate line and a data line for applying voltage to the pixel electrode by controlling the switching element.

Long axes of liquid crystal molecules of the liquid crystal layer may be characterized as being pre-aligned to be vertical or horizontal to the two display panels while the electric field is not applied to the liquid crystal layer. In order to implement a wide viewing angle in the liquid crystal display, a plurality of domains having different alignment directions of the liquid crystal molecules may be formed in one pixel. In other words, each pixel is subdivided into a plurality of respective areas or domains each having a different liquid crystal orientation obtainable thereat when no drive signal is applied to the pixel.

As such, in the case of a vertical alignment (VA) mode liquid crystal display, a method of forming cutouts or protrusions in the field generating electrodes is included as a means of forming the plurality of domains in one pixel. The plurality of domains may be formed by the above method, by aligning the liquid crystal in a vertical direction to a fringe field by edges of the cutouts or the protrusions and a fringe field formed between the field generating electrodes facing the edges.

As another means of forming the plurality of domains in one pixel, a light alignment method of controlling an alignment direction and an alignment angle of the liquid crystal by irradiating light to a photosensitive alignment layer, a method of extending the field generating electrodes in different directions, or the like is included.

Meanwhile, recently, in the display device, various techniques which display images by acquiring touch information when an external object is touched on a screen of the display device and transmitting image signals to the display device based on the acquired touch information have been actively developed.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

The present disclosure of invention provides a display device with embedded sub-optical patterns that may be used for acquiring touch-related information such as absolute or relative position of a sub-optical pattern sensing device (e.g., opto-electronic pen) when the latter makes external touch with a portion of the display area of the display device. The embedded sub-optical patterns are configured so as to avoid deterioration of multiple viewing angle characteristics of the display device.

An exemplary display device comprising a plurality of pixels each including a plurality of domains having different aligned directions of liquid crystal molecules, wherein a pixel of the plurality of pixels comprises a plurality of sub-optical pattern portions (e.g., linear patterns) which are respectively disposed in respective ones of the plurality of domains in a manner that does not reduce aperture area for one domain more so than for others of the domains. The sub-optical patterns may be recognized from outside the display device by means of an appropriate opto-electronic pen or an equivalent sub-optical pattern sensing device.

The plurality of sub optical patterns included in the one pixel may have sizes in a similar range so that display characteristics in different viewing angles may be substantially the same as each other.

The display device may further include a light blocking member that blocks peripheral leakage light of the corresponding pixel and defines an opening area (aperture) of the pixel. A deviation in the size of the actual opening of each domain region due to inclusion of the sub-optical patterns is kept to less than approximately 50% with respect to a size of the actual opening in the one pixel when the sub-optical patterns are not counted.

At least one of the plurality of sub optical patterns included in the one pixel may include a portion positioned within the opening of the one pixel.

The plurality of sub optical patterns included in the one pixel may form an optical pattern of the pixel together, and at least two pixels of the plurality of pixels may have optical patterns having different shapes and/or respective positionings of their sub-optical pattern portions (e.g., linear patterns).

The optical pattern included in one pixel of the plurality of pixels may be selected from one optical pattern set including two or more different optical patterns.

Images of the plurality of optical patterns included in a photographing unit comprising two or more adjacent pixels may be different from each other according to a position.

The plurality of pixels may include a plurality of first color pixels displaying a first color, a plurality of second color pixels displaying a second color different from the first color, the first color pixel may include an optical pattern selected from a first optical pattern set including one or more optical patterns, and the second color pixel may include an optical pattern selected from a second optical pattern set including one or more optical patterns and provided separately from the first optical pattern set.

A deviation in size of the actual opening which is the opening of the first color pixel except for the optical pattern may be within approximately 50% with respect to a size of the actual opening in the plurality of first color pixels.

The plurality of sub optical patterns included in the one pixel may include at least one of a same material as the light blocking member, a semiconductive material, and a metal.

The sub optical pattern may protrude from a vertical or horizontal side of the per-pixel light blocking member into the bulk aperture area of the pixel.

The sub optical patterns positioned in a pair of adjacent domains among the plurality of domains of the one pixel may include sub-optical pattern portions (e.g., linear patterns) of the respective domains that are connected to each other.

The sub optical pattern may have an island shape which is separated from the light blocking member.

The sub optical patterns positioned in a pair of adjacent domains among the plurality of domains of the one pixel may be connected to each other.

The sub optical pattern may extend in parallel to a vertical portion or a horizontal portion of the light blocking member.

The vertical portion or the horizontal portion of the light blocking member may be bent at least once.

The one pixel may include a first subpixel and a second subpixel according to different gamma curves, and the plurality of sub optical patterns may be disposed in at least one of the first subpixel and the second subpixel.

Another exemplary display device includes a plurality of so-called, dots each including a plurality of pixels displaying different colors from each other, in which at least a portion of a plurality of first pixels displaying a first color of the plurality of pixels includes an optical pattern which may be recognized outside, and a pixel displaying a different color from the first pixel do not include the optical pattern.

The dot may include a plurality of basic color pixels for expressing full colors and at least one auxiliary pixel for assisting display, and the plurality of first pixels may include at least one auxiliary pixel.

The display device may further include a light blocking member defining an opening of the plurality of pixels, in which the optical pattern may include a same material as the light blocking member.

The display device may further include a thin film transistor connected with the pixel and including a semiconductor; and a signal line transferring a driving signal to the thin film transistor, in which the optical pattern may include a same material as at least one of the signal line and the semiconductor.

The optical patterns of at least two pixels among the plurality of first pixels may have different shapes or positions.

Images of the optical patterns included in a photographing unit (e.g., a repeated display area tessellating cell) comprising two or more adjacent dots may be different from each other according to a position.

An area of the auxiliary pixel may be substantially the same as an area of the basic pixel.

An area of the auxiliary pixel may be different from an area of the basic pixel.

The auxiliary pixel may include a white pixel or a yellow pixel.

The dot may include a plurality of basic pixels for expressing full colors, and the plurality of first pixels may include any one color pixel among the plurality of basic pixels.

An area of the first pixel may be different from an area a remaining pixel except for the first pixel among the plurality of pixels.

An area of the first pixel may be larger than an area of the remaining pixel except for the first pixel among the plurality of pixels.

The first color pixel may include any one of a red pixel, a blue pixel, and a green pixel.

According to the exemplary embodiments of the present teachings, it is possible to provide a display device capable of acquiring touch information when external touch exists and improving a viewing angle characteristic.

Further, according to the exemplary embodiments, it is possible to provide a display device capable of acquiring touch information when external touch exists and prevent display quality from deteriorating.

DETAILED DESCRIPTION

Figure 1:
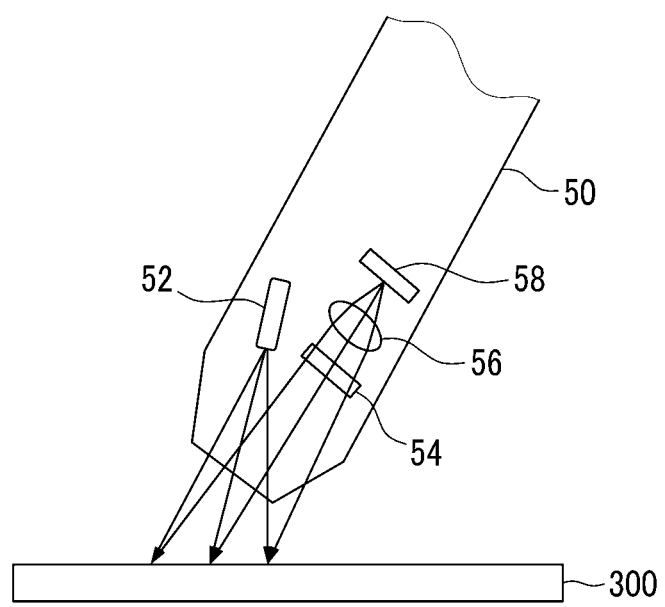
FIG. 1 is a cross-sectional view illustrating a display device and an opto-electronic pen capable of acquiring touch information according to an exemplary embodiment of the present disclosure of invention.

The present disclosure of invention will be described more fully hereinafter with reference to the accompanying drawings, in which exemplary embodiments are shown. As those skilled in the art would realize in light of the present disclosure, the described embodiments may be modified in various different ways, all without departing from the spirit or scope of the present teachings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device capable of acquiring touch location information according to an exemplary embodiment of the present teachings will be described with reference to FIGS. 1 to 6.

Figure 2:
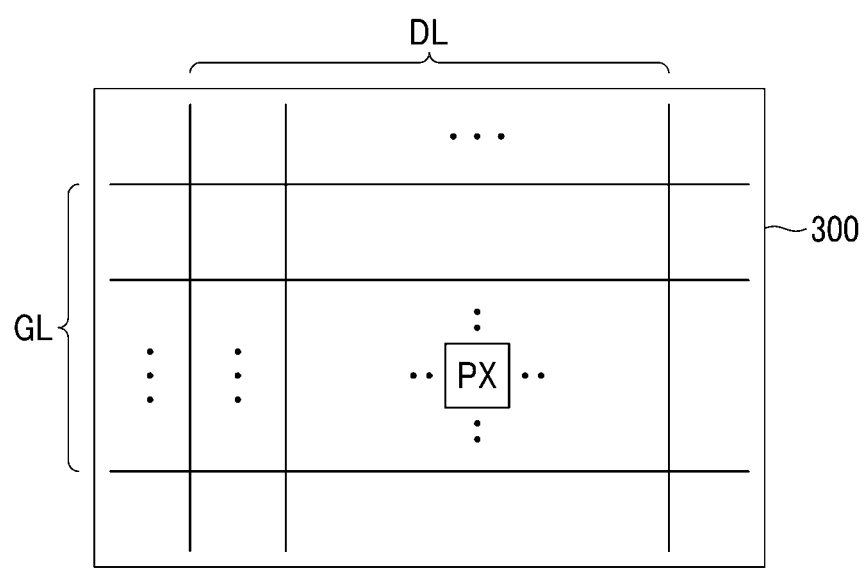
FIG. 2 is a schematic layout view of the display device according to the exemplary embodiment.
Figure 3:
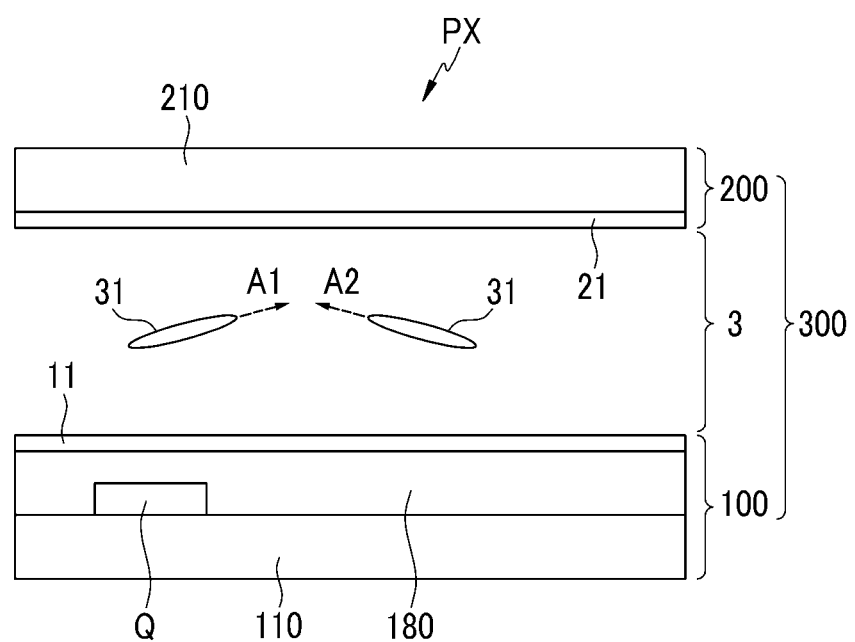
FIG. 3 is a cross-sectional view of one pixel of the display device according to the exemplary embodiment.
Figure 4:
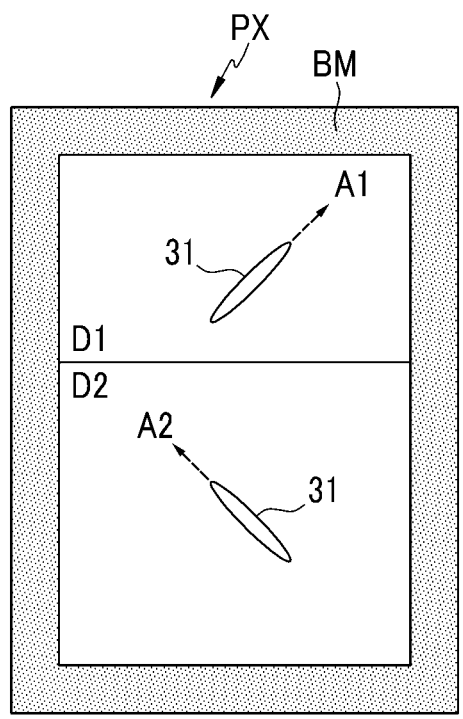
FIGS. 4 and 5 are diagrams illustrating a plurality of domain included in one pixel of the display device according to the exemplary embodiment, respectively.
Figure 5:
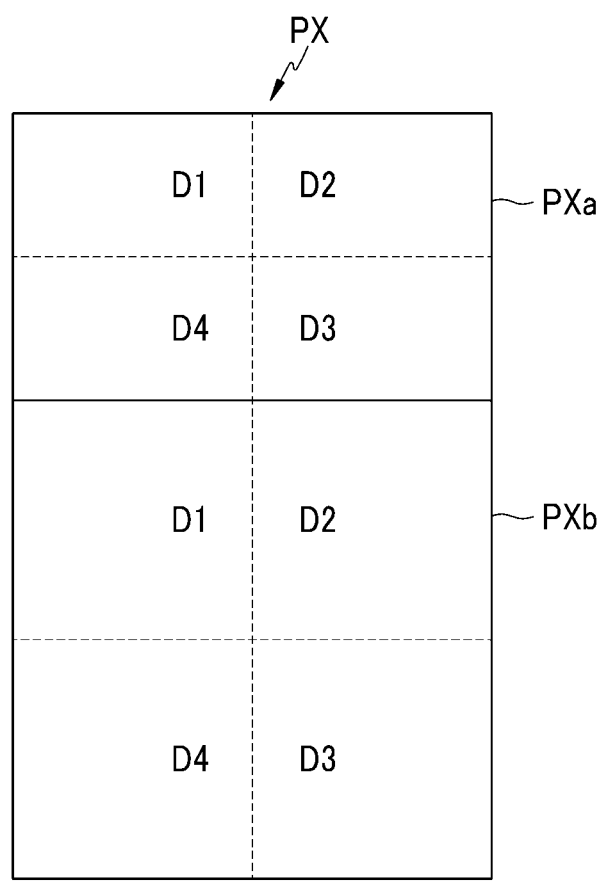

FIG. 1 is a cross-sectional view illustrating a display device and an electronic pen capable of acquiring touch location information according to a first exemplary embodiment. FIG. 2 is a schematic layout view of the display device according to the first exemplary embodiment. FIG. 3 is a cross-sectional view of one pixel of the display device according to the first exemplary embodiment. FIGS. 4 and 5 are diagrams illustrating a plurality of domains included in one pixel of the display device according to the first exemplary embodiment.

Referring to FIG. 1, the display device according to the exemplary embodiment, which is a display device capable of allowing a corresponding pen 50 to acquire touch location information, meaning a relatively precise touch position when the pen or another such external object is touched to or approached proximate to a top surface location of panel 300, where the latter is a display panel assembly 300 which is a target which the external object touches or closely approaches.

The external object capable of touching or approaching the display panel assembly 300 includes an optical device such as an electronic pen 50 as illustrated in FIG. 1. That is, the display device according to the exemplary embodiment of the present invention may be a display device capable of acquiring touch information through a magnification performed by the optical device such as the electronic pen 50. Here, the electronic pen 50 as the optical device capable of determining the touch position for the display device according to patterning of not-seen-by-the-naked eye features (sub-optical features) provided as examples in the exemplary embodiments of the present disclosure of invention.

The electronic pen 50 may sense an image through light returning after emitting the light to an object. The electronic pen 50 may directly touch the object to which the light is emitted or keep a relatively small, non-zero distance from the object. Hereinafter, not only the case where the electronic pen 50 directly touches the object but also the case where the electronic pen 50 keeps a relatively small but in focus distance from the object enough to sense the image will be considered as being a "touch".

In detail, referring to FIG. 1, the electronic pen 50 may include a light source 52, an optical bandpass filter 54, an optical lens 56, and an image sensor 58 therein.

The light source 52 generates light such as for example at least one of infrared rays, visible spectrum rays, and ultraviolet rays to emit the light to the outside through a light-passing aperture at an end of the electronic pen 50. Although FIG. 1 shows the emitted lights as being reflected directly off the top surface of the schematically-represented panel 300, it is to be understood that generally the pen emitted lights penetrate to slightly below the top surface and a portion of the penetrating rays is reflected back as an image defined by sub-optical features of the panel 300 while another portion of the emitted lights is substantially not reflected back; whereby the reflected back image is defined by the difference between the well-reflected back portion of the penetrating rays and the substantially not reflected back portion.

The optical bandpass filter 54 receives various lights which are incident through the aperture at the end of the electronic pen 50 and passes only lights having one or more predetermined wavelengths for further processing (e.g., magnification) by the optical lens 56 side. The light having the predetermined wavelength band passing through the optical filter 54 may be a wavelength band of light emitted from the light source 52 and/or a wavelength band of light which can be particularly well-sensed by the image sensor 58.

The optical lens 56 may collect the light incident through the optical filter 54 to the image sensor 58 side. The optical lens 56 may include at least one concave lens or convex lens.

The image sensor 58 may sense image information transferred by the light incident through the optical lens 56.

The electronic pen 50 may transmit as an output electrical signal, the image information sensed by the image sensor 58 for further processing by a touch information processing apparatus (not illustrated; for example one including a data processing device). The touch information processing apparatus may then responsively and automatically determine touch-related information such as a touch position of a touch object by use of the image information signal. The touch information processing apparatus may be positioned in the electronic pen 50 or provided separately (externally) from the electronic pen 50. More specifically, based on the in-band optical image defined by the reflected back light rays due to the sub-optical features of the panel 300, the touch information processing apparatus may determine a specific pixel (or small group of pixels) over which the pen is most closely positioned.

As illustrated in FIG. 1, in the case where the touch object of the electronic pen 50 is the display panel assembly 300, the electronic pen 50 may sense the image information of the touch position of the display panel assembly 300 and determine the touch information through the sensed image information.

However, the optical device capable of determining the touch information by sensing the image information of the touch position of the display panel assembly 300 may include various means capable of recognizing reflection or transmission of light in addition to or as an alternative to the illustrated electronic pen 50.

Referring to FIG. 2, the display panel assembly 300 includes a plurality of signal lines and a plurality of pixels PX surrounded by the signal lines and arranged substantially in a matrix form when viewed from an equivalent circuit perspective.

The signal lines include a plurality of gate lines GL transferring gate signals (referred to sometimes also as "scanning signals") and a plurality of data lines DL transferring data voltages. The gate lines GL mainly extend in a horizontal direction, and the data lines DL mainly extend in a vertical direction to cross the gate lines GL. The signal lines may be made of light reflecting metals such as aluminum-based metals (e.g., aluminum (Al) or aluminum alloys), silver-based metals (e.g., silver (Ag) or silver alloys), copper-based metals (e.g., copper (Cu) or copper alloys), molybdenum based metals (e.g., molybdenum (Mo) or a molybdenum alloy), chromium (Cr), tantalum (Ta), and titanium (Ti) or various other transparent conductors or opaque conductors where the latter may have covering materials disposed above them.

Each pixel PX may include at least one switching element Q connected to at least one data line DL and to at least one gate line GL and at least one pixel electrode (not illustrated) connected to and driven by the switching element Q. The switching element may include at least one thin film transistor, and is controlled according to a gate signal transferred by the gate line GL to transfer data voltage transferred by the data line DL to the pixel electrode.

In order to implement color display, each pixel PX uniquely displays one of primary colors (spatial division) or alternately displays the primary colors with time (temporal division) so that a desired color is recognized by the spatial and temporal sum of the primary colors. An example of the primary colors may include three primary colors such as red, green, and blue, or four primary colors such as red, green, blue, and white or yellow.

At least some of the plurality of pixels PX included in the display panel assembly 300 according to the exemplary embodiment of the present disclosure of invention includes small or otherwise not-seen-by-the naked-eye optical patterns capable which are nonetheless capable of being recognized by the optical device such as the electronic pen 50 described above. For example, the optical pattern may be recognized by the optical device by reflecting off of the metals of the signal lines, light emitted from the light source 52 of the optical device such as the electronic pen 50. It is within the contemplation of the present disclosure that alternatively or additionally, the optical pattern may be recognized by the optical device by absorbing some of the light emitted from the light source 52 or even absorbing the entire light. Examples of the usable optical patterns will be described below in detail.

Referring to FIG. 3, a liquid crystal display as the display device according to a first exemplary embodiment will now be described. The display panel assembly 300 of the liquid crystal display according to the first exemplary embodiment includes a lower panel 100 and a spaced apart upper panel 200 facing each other and a liquid crystal layer 3 interposed between the panels when viewed from a cross-sectional side view. The lower panel 100 includes a light-passing insulation substrate 110, and the upper panel 200 includes a light-passing insulation substrate 210.

The signal lines such as the gate line GL and the data line DL and the switching element Q may be mainly provided on the insulation substrate 110 of the lower panel 100. A passivation layer 180 may be positioned on the switching element Q.

An opposing electrode (or a common electrode) generating an electric field in the liquid crystal layer 3 together with the pixel electrode is positioned on the lower panel 100 or the upper panel 200. In the case where the pixel electrode and the opposing electrode are provided on the same one of panels 100 and 200, at least one of two electrodes may be formed in a linear or rod shape.

The liquid crystal layer 3 includes a plurality of liquid crystal molecules 31 having dielectric anisotropy. The liquid crystal layer 3 may further include an alignment aiding agent (not illustrated) for assisting alignment of the liquid crystal molecules 31. The liquid crystal molecules 31 may be aligned so that long axes thereof are vertical or horizontal to surfaces of the two panels 100 and 200 while the electric field is not applied to the liquid crystal layer 3.

Alignment layers 11 and 21 are coated on inner surfaces of the panels 100 and 200 and may be vertical or horizontal alignment layers.

When the electric field is generated in the liquid crystal layer 3, the liquid crystal molecules 31 of the liquid crystal layer 3 are tilted so that the long axes thereof are vertical or horizontal to the direction of the electric field in response to the electric field, and a change degree of polarization of incident light to the liquid crystal layer 3 varies according to an tilted degree of the liquid crystal molecule. The change of the polarization is represented as a transmittance change when passed through a polarizer, and as a result, the liquid crystal display displays an image. The pixel electrode and the opposing electrode which generate the electric field in the liquid crystal layer 3 form a liquid crystal capacitor as two plates having the interposed liquid crystal layer 3 serving as a dielectric material of the capacitor. A difference in voltage between the pixel electrode and the opposing electrode is represented as charging voltage of the liquid crystal capacitor, that is, pixel voltage.

Referring to FIG. 4, each pixel PX includes a light-passing opening (aperture area) which controllably transmits respective light rays to thereby form the display image. The aperture area of the pixel PX may be defined by a surrounding light blocking member BM which blocks the light at peripheral portions of the pixel PX. That is, an aperture ratio of the respective pixel PX may be defined as a ratio of an interior area of the pixel PX which is not covered by the light blocking member BM versus the total areas allotted to the respective pixel PX including that of its switching element Q and its signal lines.

The light blocking member BM is made of an opaque material which does not transmit light in a visible wavelengths portion of the spectrum although it could reflect in the IR or UV portion(s) of the spectrum.

The light blocking member BM may be positioned on at least one of the lower panel 100, the upper panel 200, and the liquid crystal layer 3. In the case where the light blocking member BM is positioned on the lower panel 100, at least a part of the light blocking member BM may be replaced with an opaque signal line such as the gate line GL or the data line DL. In the case where the light blocking member BM is positioned above the liquid crystal layer 3, an opaque spacer may serve as the light blocking member BM.

Referring to FIGS. 3 and 4, when the electric field is generated in the liquid crystal layer 3, the liquid crystal layer 3 of one pixel PX includes the liquid crystal molecules 31 arranged in different directions according to the applied data voltages. More specifically, each pixel PX may be subdivided into two or more domains D1 and D2, and the liquid crystal molecules 31 positioned in the different domains D1 and D2 of the one pixel PX may be caused to align in different directions such that the liquid crystal molecules 31 positioned in the same domain are aligned in a substantially same regular direction. For example, when the liquid crystal molecules 31 of a first domain D1 are aligned in a first direction A1, the liquid crystal molecules 31 of a second domain D2 may be aligned in a second direction A2 which is different from the first direction A1. This arrangement provides for improved viewing of the display image from the side angle of the screen as well as from a head-on direct viewing of the display screen. As such, an acceptable (e.g., relative to a predetermined reference) viewing angle of the liquid crystal display may be increased by varying tilt directions of the liquid crystal molecules 31 of each pixel PX.

FIG. 4 illustrates that one pixel PX that is subdivided into two domains D1 and D2, but it is not limited thereto and one pixel PX may instead include three or more domains. For sake of simplicity, the sub-optical features of the exemplary pixel PX are not shown in FIG. 4.

Referring to FIG. 5, one exemplary pixel PX of the liquid crystal display according to the first exemplary embodiment of the present disclosure may include a first subpixel PXa and a second subpixel PXb. The first subpixel PXa and the second subpixel PXb may display the image according to different gamma curves with respect to one input image signal or may also display the image according to the same gamma curve. That is, the first subpixel PXa and the second subpixel PXb may receive different data drive voltages with respect to a same input image signal that represents a corresponding same grayscale, where the first and second subpixels are nonetheless charged to respective and different pixel voltages. When two subpixels PXa and PXb are charged at different pixel voltages, tilted angles of the liquid crystal molecules 31 are different, and as a result, the two subpixels PXa and PXb are different in luminance. When charging voltages of the two subpixels PXa and PXb are appropriately adjusted, a side gamma curve may be maximally close to a front gamma curve and side visibility may be improved. Once again, for sake of simplicity, the sub-optical features of the exemplary pixel PX (the one having the plural subpixels PXa, PXb) are not shown in FIG. 5.

When at least some of the plurality of pixels PX included in the display panel assembly 300 include optical patterns (not yet shown), the optical patterns may be formed only in the larger second subpixel PXb and not in the smaller first subpixel PXa so as to enable displaying of an image having relatively low luminance.

As shown in FIG. 5, each of the subpixels PXa and PXb may include two or more domains D1 to D4 so that corresponding liquid crystal molecules 31 thereof are aligned in different directions, for example, four distinguishable domains D1 to D4.

As an alternative to this, even in a structure where one there is one pixel PX (and no subpixels) where the one pixel PX is charged at one pixel voltage, the one pixel PX may include four domains D1 to D4 arranged as illustrated in FIG. 5.

Then, the liquid crystal display capable of acquiring touch information, particularly, the optical patterns according to the exemplary embodiment of the present disclosure of invention will be described with reference to FIGS. 6 to 19 together with the drawings described above.

FIGS. 6 to 18 are respective plan views of a plurality of domains and corresponding light blocking members having various shapes, sizes or other sub-optical patternings (e.g., different bandpass attributes) usable in a liquid crystal display according to the exemplary embodiment where the sub-optical patternings are usable for relaying corresponding sub-optical information to a sub-optical pattern sensing device such as pen 50. More specifically, FIG. 19 is a plan view showing a plurality of adjacent pixels of a liquid crystal display according to the first exemplary embodiment wherein each pixel unit PX contains a distinct and respective sub-optical pattern whereby a sub-optical pattern sensing device such as pen 50 can be used to determine the corresponding touch position thereof to the resolution level of a single pixel unit PX if so desired (or that the tip of the pen is between two distinctly patterned (sub-optically patterned) pixel units PX.

Shapes, sizes and/or pen-sensed attributes the of respective sub-optical patterns included in at least two pixels PX among the plurality of pixels PX of the liquid crystal display according to the exemplary embodiment may be different from each other such that the sensing pen (50, or equivalent other device) can have distinguishable states when positioned over one as opposed to the other of the at least two pixels PX (e.g., PT1 versus PT2). Here, the shapes of the respective sub-optical patterns or the positions of the sub-optical patterns of the respective domains D1 to D4 are simply referred to as the shapes of the optical patterns, and when the optical patterns are the same as or different from each other, the shapes of the optical patterns may be the same as or different from each other.

One display panel assembly 300 may include a number n of pixels PX (n is a natural number of 2 or more) having different optical patterns, and any one pixel PX may include any one optical pattern among the n different optical patterns. As such, n kinds of different optical patterns set in all the plurality of pixels PX are referred to as an optical pattern set.

Some of all the pixels PX may not include optical patterns. In other words, the sub-optical patterns may be included in every other or every, third, fourth, etc. pixel unit PX rather than in each of adjacent pixel units PX. Further, sizes of some pixels PX of all the pixels PX may be different from sizes of others of the pixels PX, and in this case, the optical patterns may be formed only in some pixels PX (e.g., the larger ones) according to a size of the pixel PX. For example, when a size of a green pixel expressing green is larger than sizes of a remaining pixels PX, the optical pattern may be formed only in the green pixel, but it is not limited thereto. For example it alternatively may be formed in the blue pixels if those are the largest area ones.

According to an exemplary embodiment of the present invention, each optical pattern set may be allocated for each pixel PX having each color. For example, when an optical pattern set including n optical patterns is allocated to each of red pixels PX, an optical pattern set including m optical patterns (m is a natural number of 2 or more) having a configuration different from the optical pattern set allocated to the red pixel PX may be allocated to each of green pixels PX. Here, n and m may be different from or the same as each other. In other words, it is the combination of the color of the pixel's color filter and the pattern of the pixel's sub-optical pattern that is used for conveying distinct, per-pixel information to the touch sensing device (e.g., pen 50). Further, the n optical patterns and some of the m optical patterns may be the same as each other. Meanwhile, some of the pixels PX having at least one color may not include the sub-optical patterns.

According to an exemplary embodiment of the present disclosure, the optical patterns which can be recognized by the optical device such as the electronic pen 50 may be mainly positioned within the opening of each pixel PX. Further, the optical patterns may be positioned on the same layer with the same material as the light blocking member BM. In the respective exemplary embodiments illustrated in FIGS. 6 to 18 respectively, the case where the optical patterns are positioned on the same layer with the same material as the light blocking member BM is illustrated as an example. In this case, since the optical pattern is opaque, the size and the shape of the actual opening of the pixel PX vary according to the shape or the position of different optical patterns positioned within the opening. Accordingly, all the pixels PX or the pixels PX having predetermined colors may be classified into pixels PX having different opening shapes (due to their respective sub-optical patterns) which are as many as the number of optical patterns included in the allocated optical pattern set.

Particularly, as illustrated in FIGS. 3 to 5, when one pixel PX or one subpixel PXa or PXb includes a plurality of domains, in the case where the optical patterns of two pixels PX are positioned only in some domains, luminance depending on a viewing angle may vary according to a domain with the optical pattern and a viewing angle characteristic may deteriorate.

However, according to an exemplary embodiment of the present disclosure of invention, in the case where one pixel PX includes a plurality of domains, respective sub-optical patterns are formed in all domains of the one pixel PX so that the perceived luminance of each domain in its respective optimum angle of viewing is not differently altered by lack of a sub-optical pattern feature in that domain area. The plurality of sub-optical patterns included in one pixel PX forms the optical pattern of the corresponding pixel PX together, and hereinafter, the sub-optical pattern is referred to as the optical pattern of the corresponding pixel unit PX. Further, the plurality of sub-optical patterns included in one pixel PX has sizes within a predetermined similar range with each other so that images may be recognized with substantially the same luminance at all the respective viewing angles, for example those of the top, bottom, right, and left side views of the screen, thereby improving the viewing angle characteristic. Here, the size of the optical pattern in the similar range may mean a size within a predetermined range enough not to decrease the viewing angle characteristics because a difference in luminance at all viewing angles is not large.

In terms of more detail, for a pretty good viewing angle characteristic, the similar range of the sub-optical pattern in each domain to which a sub-optical pattern is inserted may be determined within a range so that a deviation in size of actual openings of the respective domain, except for the optical pattern of a pixel is within approximately 50% with respect to a size of an actual opening of a domain in the pixel. For example, when an area of the actual opening (aperture) of one domain of one pixel PX is 30 units (where specific unit is omitted here), the area of another actual opening of another domain may be approximately 15 to 45 units. Extremely, when the sizes of the optical patterns positioned in the respective domains of one pixel PX are the same as each other, a display characteristic in all the viewing angles may be the best.

Similarly, as described above, in the case where each optical pattern set is allocated for each colored pixel PX, a predetermined number of optical patterns included in one optical pattern set allocated in each colored pixel PX may have sizes in the similar range described above. Here, the sizes within the similar range may mean sizes in a range where the sizes of the actual openings (light-passing apertures) of the corresponding colored pixels PX are similar to each other so that a color spot may not recognized as being different due it containing a sub-optical pattern. In more detail, the sizes of the optical pattern may be determined within the similar range so that a deviation in sizes of actual openings of the corresponding colored pixels PX is within approximately 50% with respect to the size of an actual opening in the pixel PX.

Furthermore, in the case where one pixel PX includes the plurality of domains, the sizes of the optical patterns may be adjusted so that sizes of the actual openings of the corresponding domains of the same colored pixels PX may be within the similar range. Accordingly, the display characteristic for each color may be further improved in all the viewing angles.

However, the one or more materials used for forming the sub-optical pattern are not limited to the materials used for forming the light blocking member BM per se. The sub-optical pattern may have a laminated structure of a multilayer kind including any one or two or more of the same material as the light blocking member BM, a semiconductor material such as amorphous silicon or polysilicon, and metal. For example, the materials of the sub-optical pattern may include those positioned in the same layer as that of and made of the same material as that of one or more of the signal lines such as the gate lines GL and the data lines DL described above, and/or may include further material positioned in the same layer and made with the same material as a semiconductive layer such as that of a thin film transistor.

The shapes of the optical patterns positioned at the respective domains of one pixel PX may be the same as each other, and the shape of at least one optical pattern may be different from the shape of at least one other optical pattern. When one pixel PX includes the different shapes of optical patterns, at least two optical patterns may have the same shape.

As described above, the different sub-optical patterns included in one optical pattern set provided in one display panel assembly 300 may be provided by varying the shapes or the positions of the optical patterns of each pixel PX. Examples of various optical patterns will be described below.

In examples illustrated in FIGS. 6 to 18, one pixel PX includes a plurality of domains D1 to D4, and the respective domains D1 to D4 include respective sub-optical patterns P1 to P4. The sub-optical patterns P1 to P4 included in one pixel PX may have sizes in the similar range to one another as described above.

Figure 6:
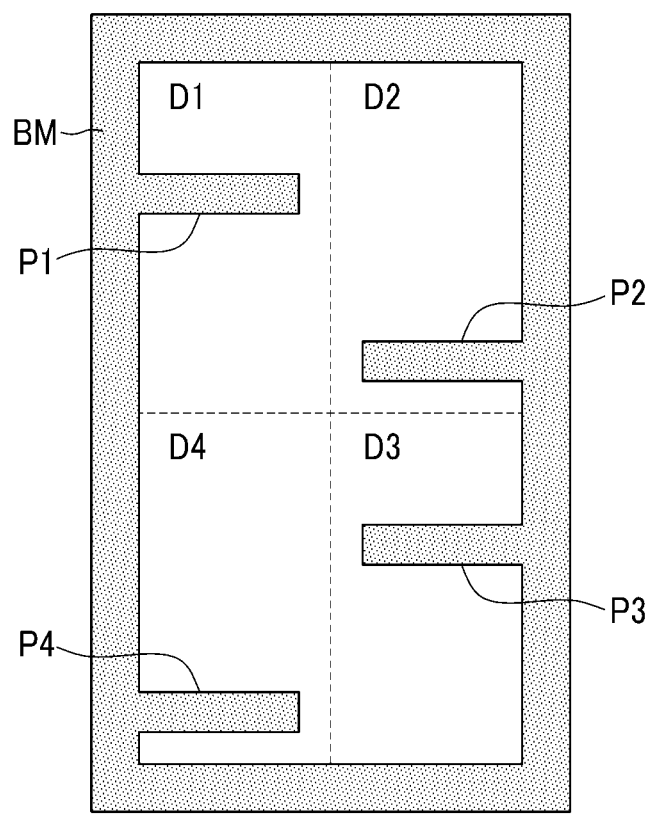
FIGS. 6 to 18 are plan views of a plurality of domains and a light blocking member of the display device according to the exemplary embodiment, respectively.

First, referring to FIG. 6, the shape of the opening (light-passing aperture portion) of one pixel PX may be substantially a rectangle when not counting the sub-optical patterns P1 to P4. The sub-optical patterns P1 to P4 may have rod shapes protruding inwardly from the periphery of the BM portion to the insides of the respective domains D1 to D4, for example from the vertical boundary portions of the light blocking member BM. The respective vertical position of each of the sub-optical patterns P1 to P4 may be variously adjusted in each respective pixel unit PX so that the combination of respective vertical positions (alone or together with pixel color) uniquely identifies the location of the pixel unit PX and/or other attributes of the respective pixel unit PX. More specifically, it may be noted in the example of FIG. 6 that sub-optical pattern P1 is spaced apart from the upper edge of the BM by a respective first spacing distance while remaining inside the first domain D1; that sub-optical pattern P2 is spaced apart from the upper edge of the BM by a respective second spacing distance (e.g., different from that of P1) while remaining inside the second domain D2; that the third sub-optical pattern P3 is spaced apart from the lower edge of the BM by a respective third spacing distance (e.g., different from the spacings of P1 and P2) while remaining inside the third domain D3; and that the fourth sub-optical pattern P4 is spaced apart from the lower edge of the BM by a respective fourth spacing distance (e.g., different from the spacings of P1, P2 and P3) while remaining inside the fourth domain D4. In a next adjacent pixel unit PX (not shown) to that of FIG. 6, the respective spacings of P1-P4 from their nearest horizontal edge may be differently set so that the sub-optical pattern of that next adjacent pixel unit PX (not shown) is measurably different from that FIG. 6, where measurability of difference is dependent on the pre-specified types of pens (50) or other such sensing devices to be used.

Figure 7:
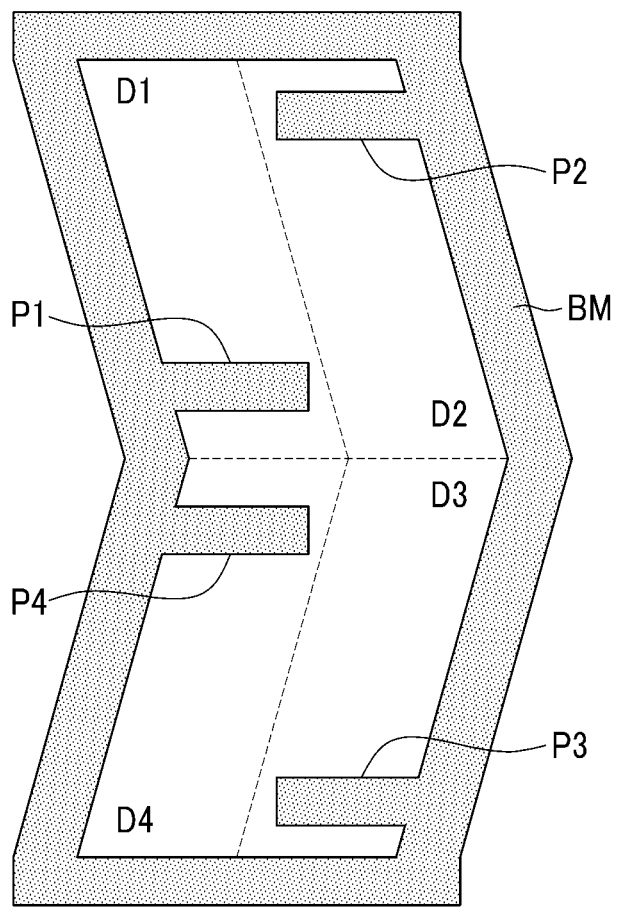

Referring next to FIG. 7, here the shape of the opening (aperture) of each of the pixel units PX (one shown) may be a shape in which two angled parallelograms are connected to each other in a vertical direction which is a vertically inversed symmetrical shape. The included sub-optical patterns P1 to P4 may have rod shapes protruding inwardly into only the areas of their respective domains D1 to D4 from the left and right side edge portions of the light blocking member BM. The relative vertical positions of the sub-optical patterns P1 to P4 may be variously adjusted such that each pixel unit PX may be uniquely identified, if not also by its respective color then at least by the unique spacings used for its respective sub-optical patterns P1 to P4. In FIG. 7 the respective spacings of P2 and P3 from their nearest horizontal edges of the BM pattern are shown to be equal and similarly the respective spacings of P1 and P4 from their nearest horizontal edges of the BM pattern are shown to be equal whereas in a next adjacent such pixel unit PX (not shown) at least one of the respective spacings may be different so that the next adjacent such pixel unit PX may be distinguished from the other pixels adjacent to it.

Figure 8:
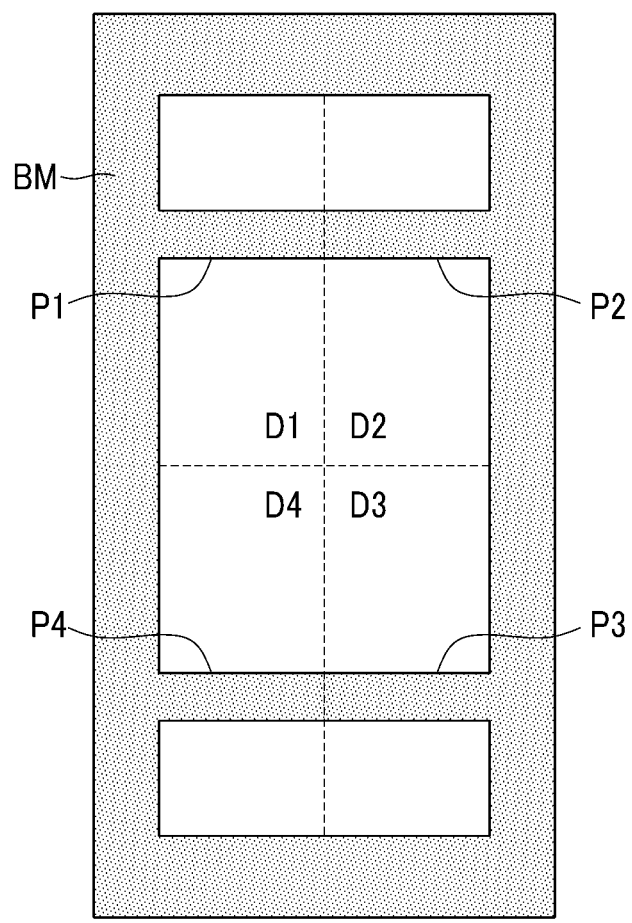

Referring next to FIG. 8, the shape of the opening of one pixel PX may be substantially a rectangle when not counting the inwardly protruding sub-optical patterns P1-P4 and the lengths of the sub-optical patterns P1-P4 may be essentially equal to the widths of their respective domains D1-D4. More specifically, the sub-optical patterns P1 to P4 may have rod shapes protruding inwardly into the respective domains D1 to D4 from vertical side portions of the light blocking member BM, and the sub-optical patterns P1 to P4 may be positioned along the left and right side edges of the respective domains D1 to D4 where the vertical positions of the sub-optical patterns P1-P4 (optionally always connected as pairs to each other) in the vertical direction may be variously adjusted.

Figure 9:
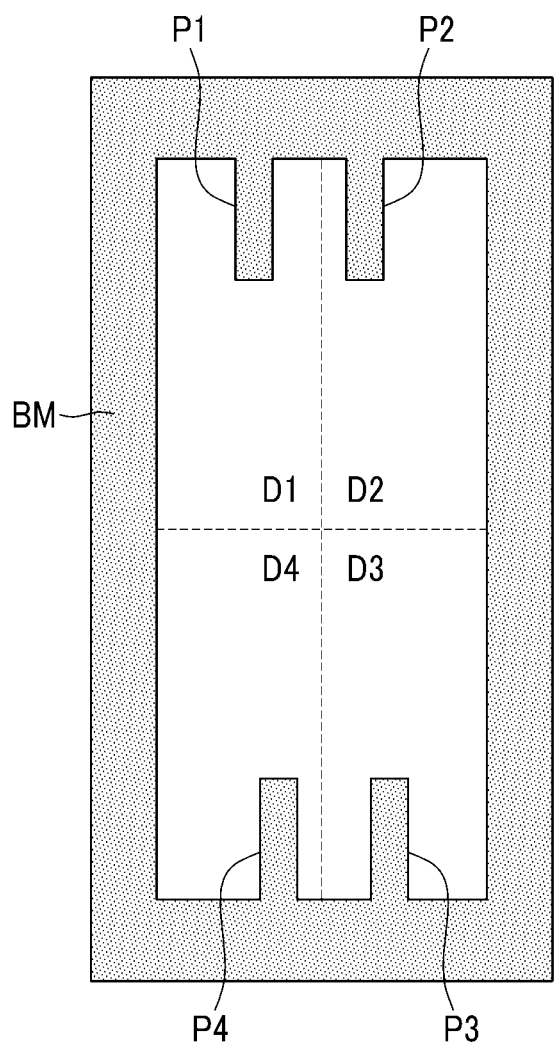

Referring to FIG. 9, the general shape of the opening of one pixel PX may again be substantially rectangular. The sub-optical patterns P1-P4 may have rod shapes protruding inwardly into only their respective domains D1 to D4 from the nearest horizontal edge portions of the light blocking member BM where the sub-optical patterns P1-P4 mainly extend in a vertical direction. Angles between the sub-optical patterns P1 to P4 and the horizontal part of the light blocking member BM may be right angles or may other than right angles. The respective horizontal positions and/or angles of protrusion of the sub-optical patterns P1-P4 may be variously adjusted so that each pixel unit PX may be uniquely identified, if not also by its respective color then at least by the unique spacings and/or protrusion angles and/or protrusion lengths used for its respective sub-optical patterns P1 to P4.

Figure 10:
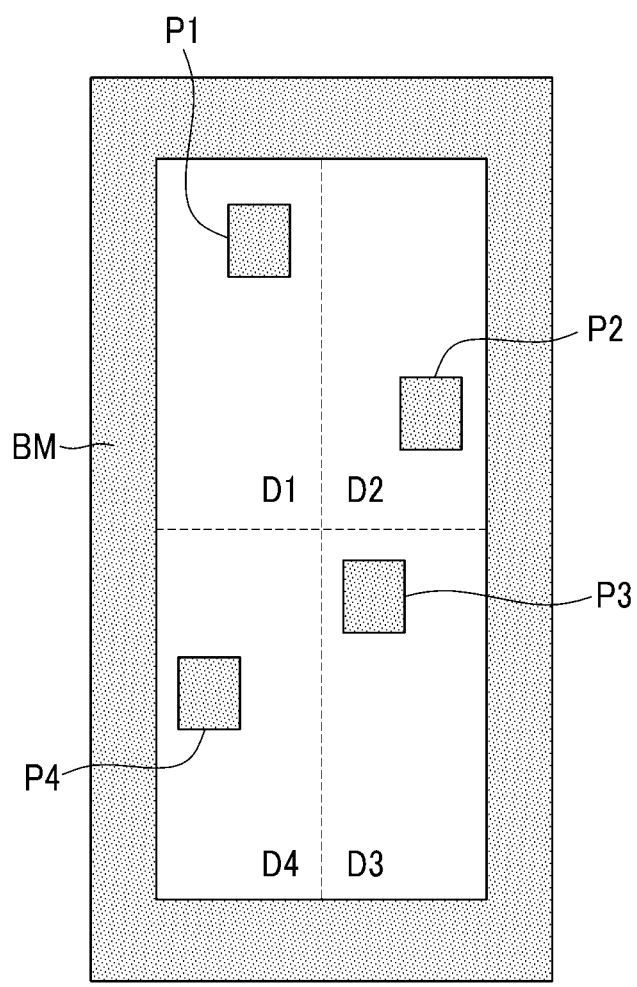

Referring to FIG. 10, the shape of the opening of one pixel PX may be a substantial rectangle (when not including the sub-optical patterns P1-P4 as part of the shape analysis). The sub-optical patterns P1 to P4 may be island shapes which are separated from the light blocking member BM. That is, the sub-optical patterns P1 to P4 are separated from the light blocking member BM and may be each positioned so as to be contained only in its respective one of domains D1 to D4. The position of the sub-optical patterns P1 to P4 within the openings of the respective domains D1 to D4 may be variously adjusted. Although the example of FIG. 10 shows the island shape of each of the sub-optical patterns P1-P4 to be close to that of a square, it is within the contemplation of the disclosure that shapes may be modified to be elongated rectangular for example with respective axes of elongation forming different angles relative to a predetermined reference line of the bulk BM shape (e.g., relative to the bottom horizontal edge) where the positions and/or angles of such island shapes provide the location and/or other information acquired by the pen 50 or other such sub-optical pattern sensing device.

Figure 11:
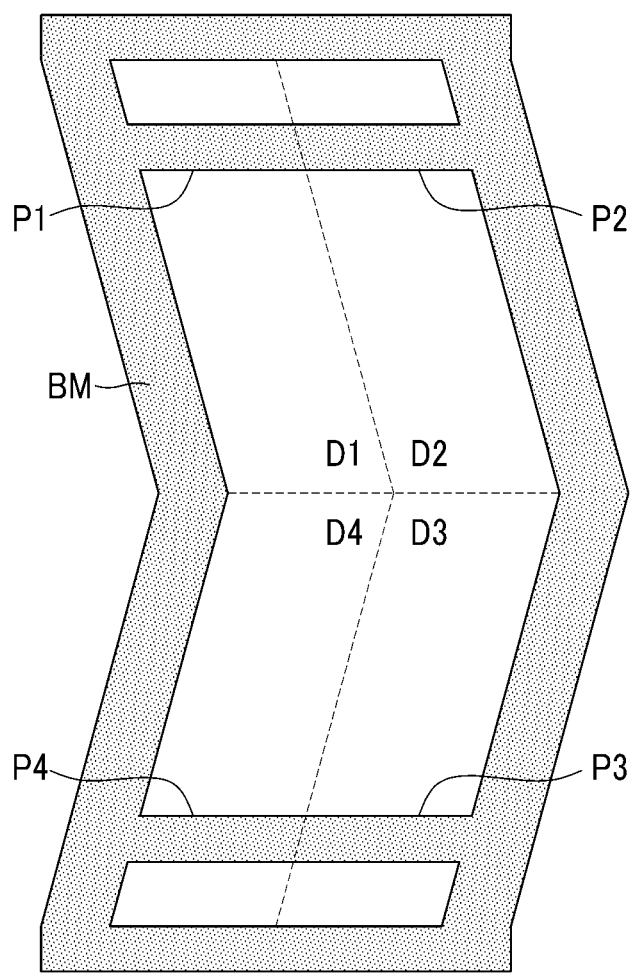

Referring to the exemplary embodiment of FIG. 11, the shape of the bulk opening (aperture) of one pixel PX may be a shape in which two angled parallelograms are connected to each other in a vertical direction to thereby define a vertically inversed symmetric (e.g., mirror image) shape. The sub-optical pattern segments P1 to P4 may have rod shapes protruding inward into their respective domains D1 to D4 from the left and right edge portions of the light blocking member BM as shown. The length of extension of the sub-optical pattern segments P1 to P4 may be as large as the horizontal widths of their respective domains D1 to D4 so that for at least one configuration, horizontally opposed patterns may extend in a horizontal direction to be connected to each other. The vertical positions of the respective sub-optical pattern segments P1 to P4 (where optionally opposed pairs remain connected to each other in the horizontal direction) may be variously adjusted.

Figure 12:
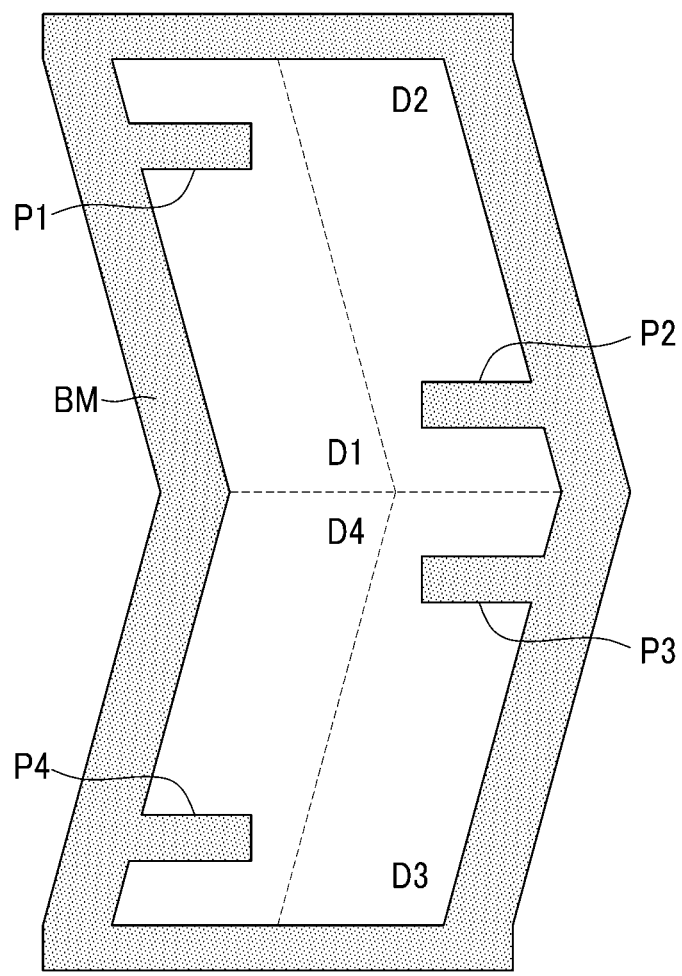

Referring to FIG. 12, the optical patterns according to the exemplary embodiment are almost the same as those of the exemplary embodiment illustrated in FIG. 7 described above, but an example in which the vertical position of the sub-optical patterns P1 to P4 is differently disposed is illustrated.

Figure 13:
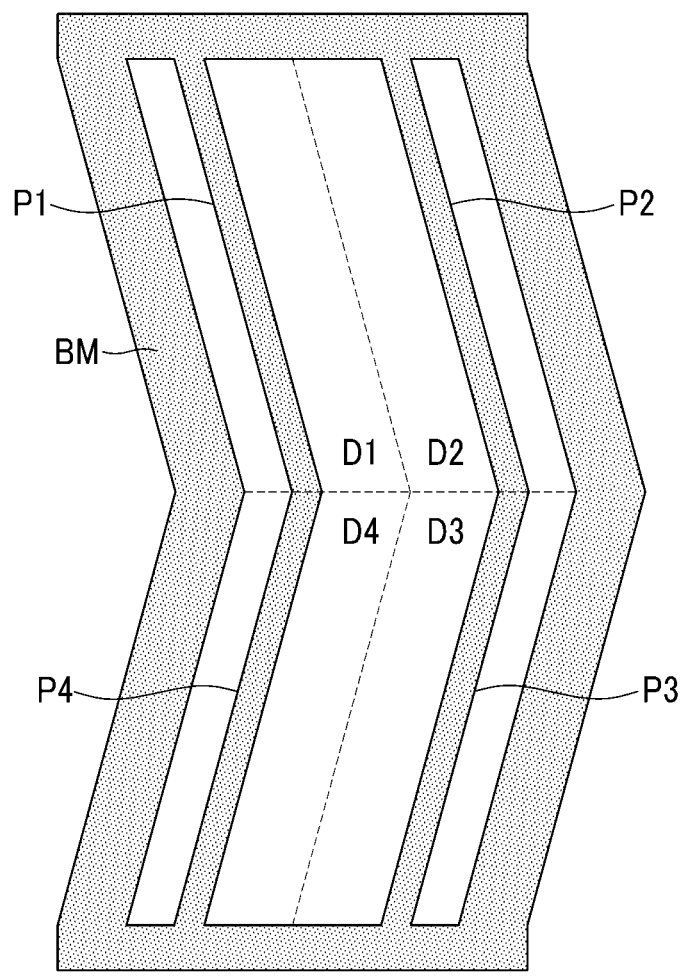

Referring to FIG. 13, the shape of the opening of one pixel PX may be a shape in which two angled parallelograms are connected to each other in a vertical direction to define a vertically inversed symmetric (e.g., mirror image) shape. The sub-optical patterns P1 to P4 may have rod shapes protruding inward the respective domains D1 to D4 from the top and bottom edge portions of the light blocking member BM. The sub-optical patterns P1 to P4 positioned in their respective ones of the adjacent domains D1 to D4 may extend substantially parallel to the adjacent left and right edges of the bulk shape of the BM and vertically-opposed pairs may optionally extend so as to be connected to each other. The horizontal base positions (where they start off from the top or bottom horizontal edges) of the sub-optical patterns P1 to P4 may be variously adjusted and in one embodiment, vertically opposed pairs of the sub-optical patterns P1 to P4 may remain connected to each other as their positions are horizontally varied.

Figure 14:
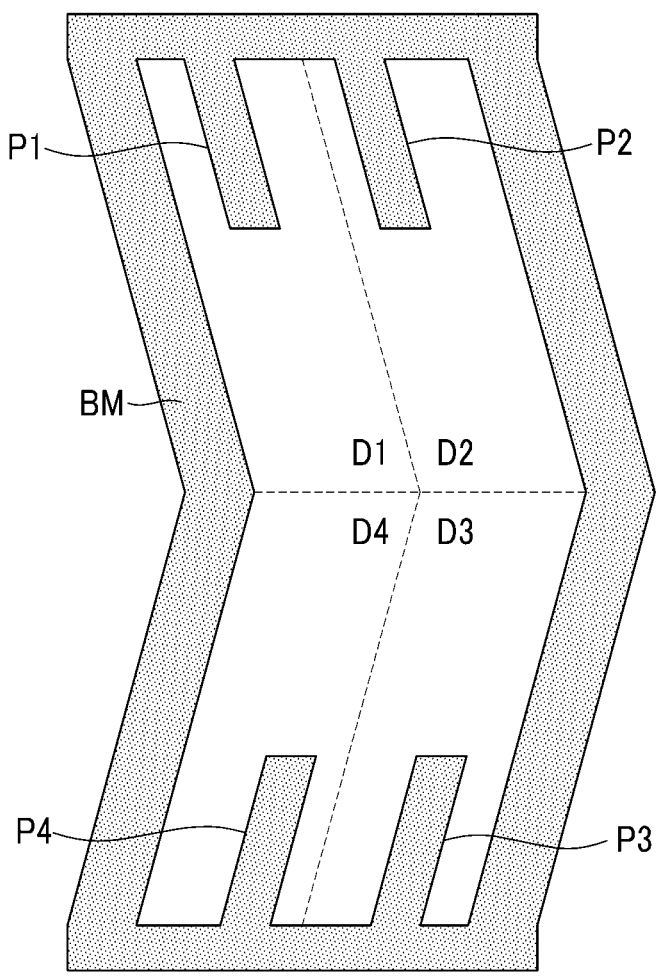

Referring to FIG. 14, the shape of the opening of one pixel PX may be a shape in which two tilted parallelograms are connected to each other in a vertical direction which is a vertically inversed symmetry shape. The sub-optical patterns P1 to P4 may have rod shapes protruding inward in the respective domains D1 to D4 from a horizontal part of the light blocking member BM which mainly extends in a horizontal direction. The sub-optical patterns P1 to P4 may extend in parallel to the adjacent left and right side edges of the light blocking member BM. The horizontal position of the sub-optical patterns P1 to P4 may be variously adjusted.

Figure 15:
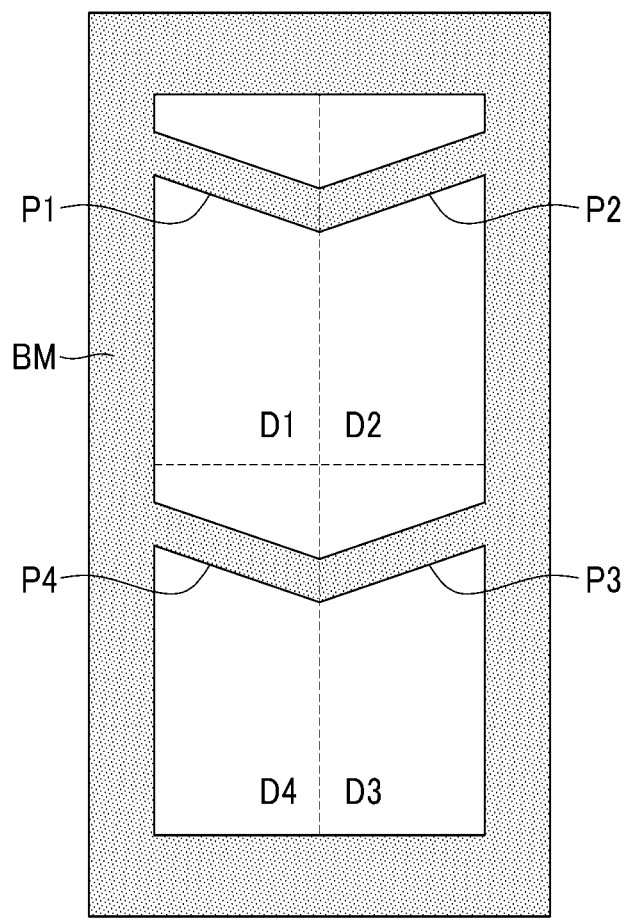

Referring to FIG. 15, the shape of the opening of one pixel PX may be a substantial rectangle. The sub-optical patterns P1 to P4 may have rod shapes protruding to the left and right insides of their respective domains D1 to D4 so as to extend in an angled direction other than vertically or horizontally relative to the bulk shape of the light blocking member BM. The sub-optical patterns P1 to P4 positioned at the adjacent domains D1 to D4 in a horizontal direction may extend in a horizontal direction so as to be connected to each other. Particularly, an angle between at least one of the sub-optical patterns P1 to P4 and the vertical portion of the light blocking member BM may be other than a right angle. Accordingly, the sub-optical patterns P1 to P4 connected to each other in the horizontal direction may have shapes bent upwards and downwards in the middle portions. The vertical position of the sub-optical patterns P1 to P4 connected to each other in the horizontal direction may be variously adjusted.

Figure 16:
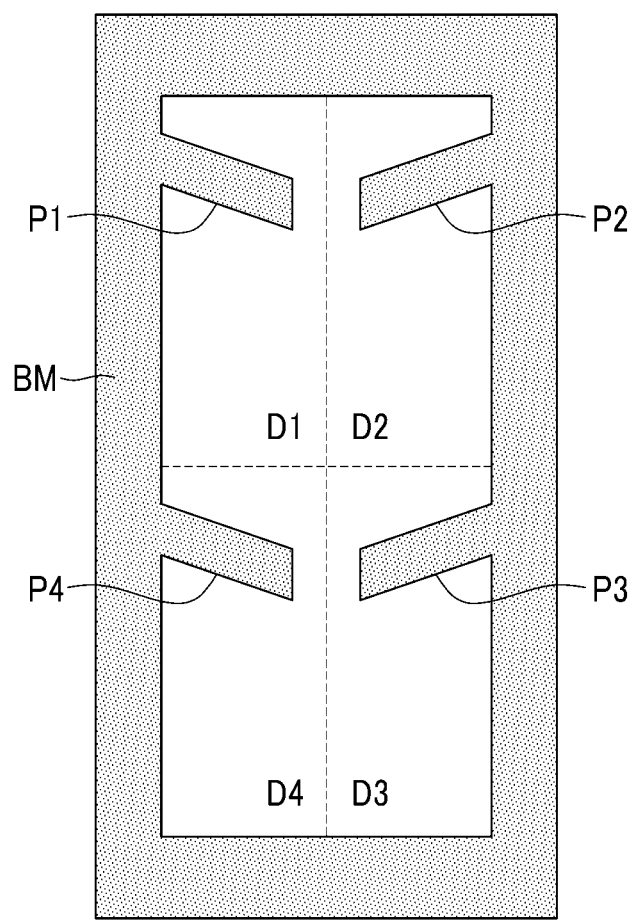

Referring to FIG. 16, the optical patterns according to the exemplary embodiment are almost the same as those of the exemplary embodiment illustrated in FIG. 6 described above, but an angle between at least one of the sub-optical patterns P1 to P4 and the vertical portion of the light blocking member BM may be other than a right angle.

Figure 17:
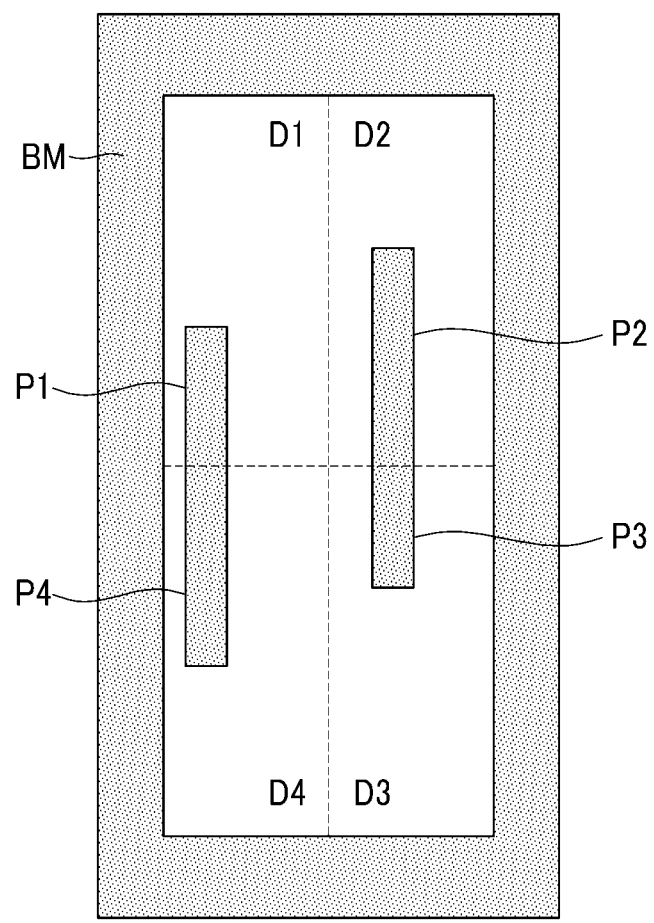

Referring to FIG. 17, the shape of the opening of one pixel PX may be a substantial rectangle. The sub-optical patterns P1 to P4 may be island shapes which are separated from the light blocking member BM. That is, the sub-optical patterns P1 to P4 are separated from the light blocking member BM and may be positioned exclusively within the openings of their respective domains D1 to D4 except that the two sub-optical patterns P1 and P4 respectively positioned at the vertically adjacent domains D1 and D4 may extend in the vertical direction to be connected to each other and likewise the two sub-optical patterns P2 and P3 respectively positioned at the vertically adjacent domains D2 and D3 may extend in the vertical direction to be connected to each other as is shown. The horizontal positions of the sub-optical patterns P1 to P4 within the openings of their respective domains D1 to D4 may be variously adjusted.

Figure 18:
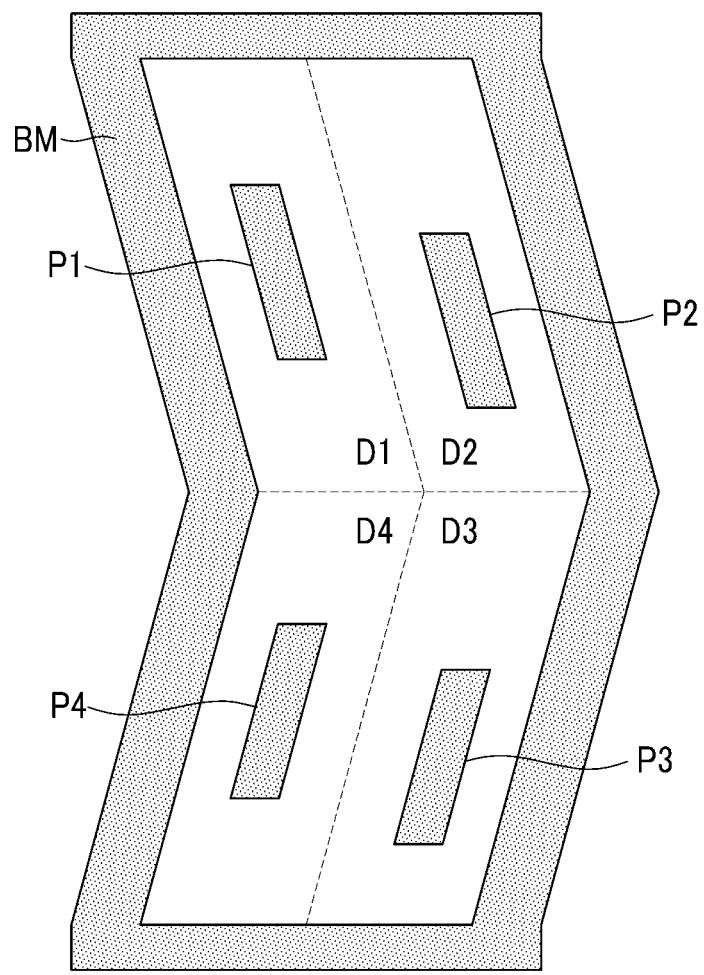
Figure 19:
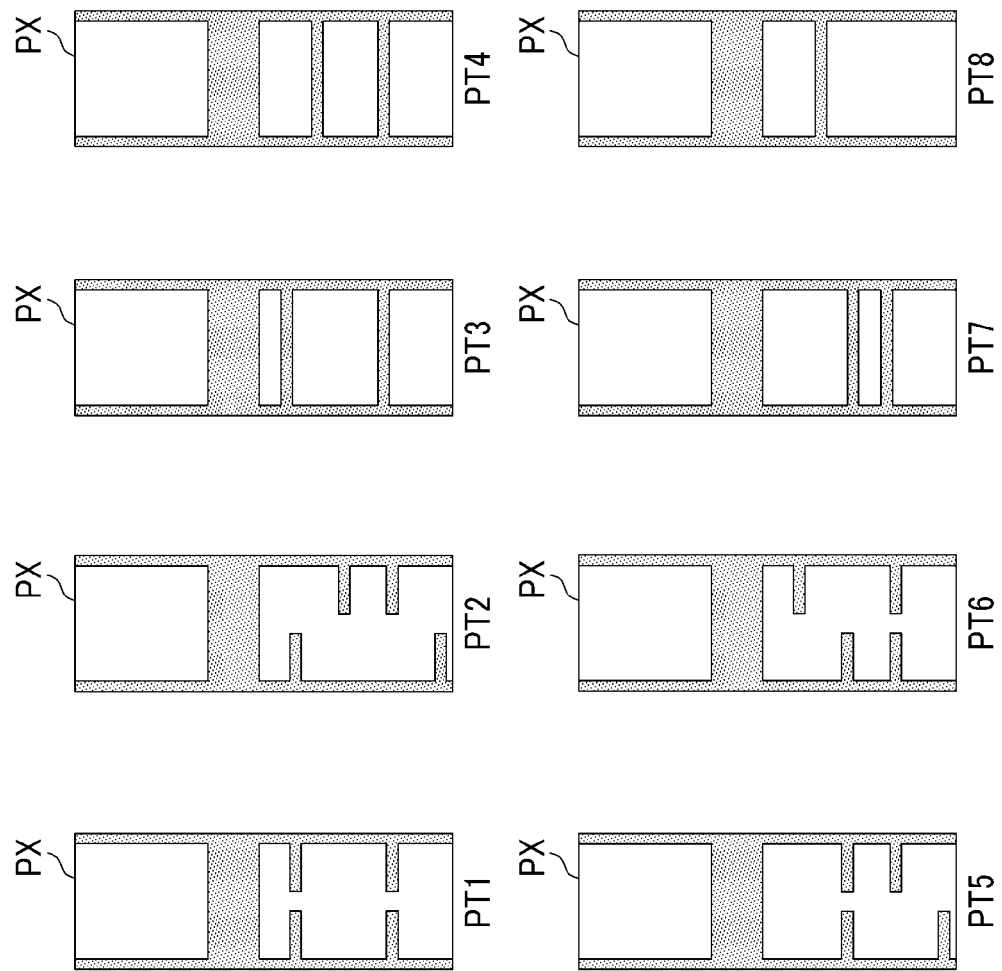
FIG. 19 is a plan view of many adjacent pixels of the display device according to the exemplary embodiment.

Referring to FIG. 18, the shape of the opening of one pixel PX may be a shape in which two tilted parallelograms are connected to each other in a vertical direction which is a vertically inversed symmetry shape. The sub-optical patterns P1 to P4 may be island shapes which are separated from the light blocking member BM. That is, the sub-optical patterns P1 to P4 are separated from the light blocking member BM and may be positioned exclusively within the openings of their respective domains D1 to D4. At least one of the sub-optical patterns P1 to P4 may extend in parallel to the angled left and right side edges of the illustrated light blocking member BM. The positions of the sub-optical patterns P1 to P4 within the openings of the respective domains D1 to D4 may be variously adjusted.

In addition, it is within the contemplation of the disclosure that various other shapes and positions and anglings and compositional changes (optically detectable ones) of the sub-optical patterns P1 to P4 can be used for representing per pixel or per-group-of pixels information that is to being acquired through use of the pen 50 and/or an alike sub-optical pattern sensing device.

The optical patterns illustrated in FIGS. 6 to 18 described above may be applied to one pixel PX and may be applied to the respective subpixels PXa and PXb included in one pixel PX. Particularly, as described above, when one pixel PX includes two or more subpixels PXa and PXb according to different gamma curves, the optical patterns may be formed only in the second subpixel PXb displaying an image having relatively lower luminance than that of its partner PXa whereby the luminance of the higher subpixel is not detracted from by including sub-optical patterns in the aperture area of that higher luminance subpixel. Further, the optical patterns illustrated in FIGS. 6 to 18 may be applied to even the case where the number of domains included in the pixel PX having various shaped openings or one pixel PX and the layout of the domains are different.

Next, a method of determining a position of a touched pixel PX in the liquid crystal display according to an exemplary embodiment of the present disclosure of invention will be described with reference to FIG. 19 together with the drawings described above.

FIG. 19 is a schematic top plan view of many adjacent pixels of a liquid crystal display according to the exemplary embodiment now being described.

The optical device such as the electronic pen 50 is configured to detect and distinguish between the various sub-optical patterns shown in FIG. 19 whereby the positioning of the pen 50 directly over one such pixel PX or between two or more such pixels PX may be determined based on the differences between the optical patterns as described above. The sub-optical patterns of the various optical patterns may be composed of materials that reflect, absorb, or partially absorb and partially reflect one or more lights having respective predetermined wavelengths (or bands of such wavelengths) in a manner so as to be recognized by the optical device, and the optical device such as the electronic pen 50. In other words, the pen 50 or equivalent other sensing device may recognize the pattern of light reflected or absorbed by the optical pattern and may thereby acquire the information (e.g., pixel location) represented by the corresponding optical pattern.

Particularly, the electronic pen 50 may determine a position or coordinate of the touched pixel PX in the display panel assembly 300 or a predetermined region of the display panel assembly 300 through recognition of one or a combination of the optical patterns of two or more of a predetermined number of adjacent pixels PX (referred to as a photographing unit PU) to thus measure position within the image. To this end, information on the optical patterns included in the pixels PX of the display panel assembly 300 may be pre-stored in a memory such as a lookup table LUT and may be used when determining touch information such as location within the display area of the screen. In order to determine an accurate touch position, shapes of the combination of the optical patterns of the photographing unit PU acquired in various positions of the display panel assembly 300 or the predetermined region of the display panel assembly 300 may be different from each other.

For example, as illustrated in FIG. 19, the photographing unit PU includes eight adjacent pixels PX. The optical device such as the electronic pen 50 may sense an image of optical patterns PT1 to PT8 of the pixels PX of the photographing unit and determine the position or coordinate in the display panel assembly 300 of the pixel PX touched through the image of the combination of the 8 optical patterns (or a fewer number of such optical patterns). Particularly, FIG. 19 illustrates a case where in for each pixel PX, a first subpixel having a wider area of the two included subpixels has the sub-optical patterns included inside of it while the partner subpixel which has a smaller aperture and thus provides a comparatively lower luminance is devoid of such aperture-area decreasing sub-optical patterns.

Next, various examples of the liquid crystal display including the plurality of domains where the optical patterns may be formed according to an exemplary embodiment of the present disclosure will be described with reference to FIGS. 20 to 36.

Figure 20:
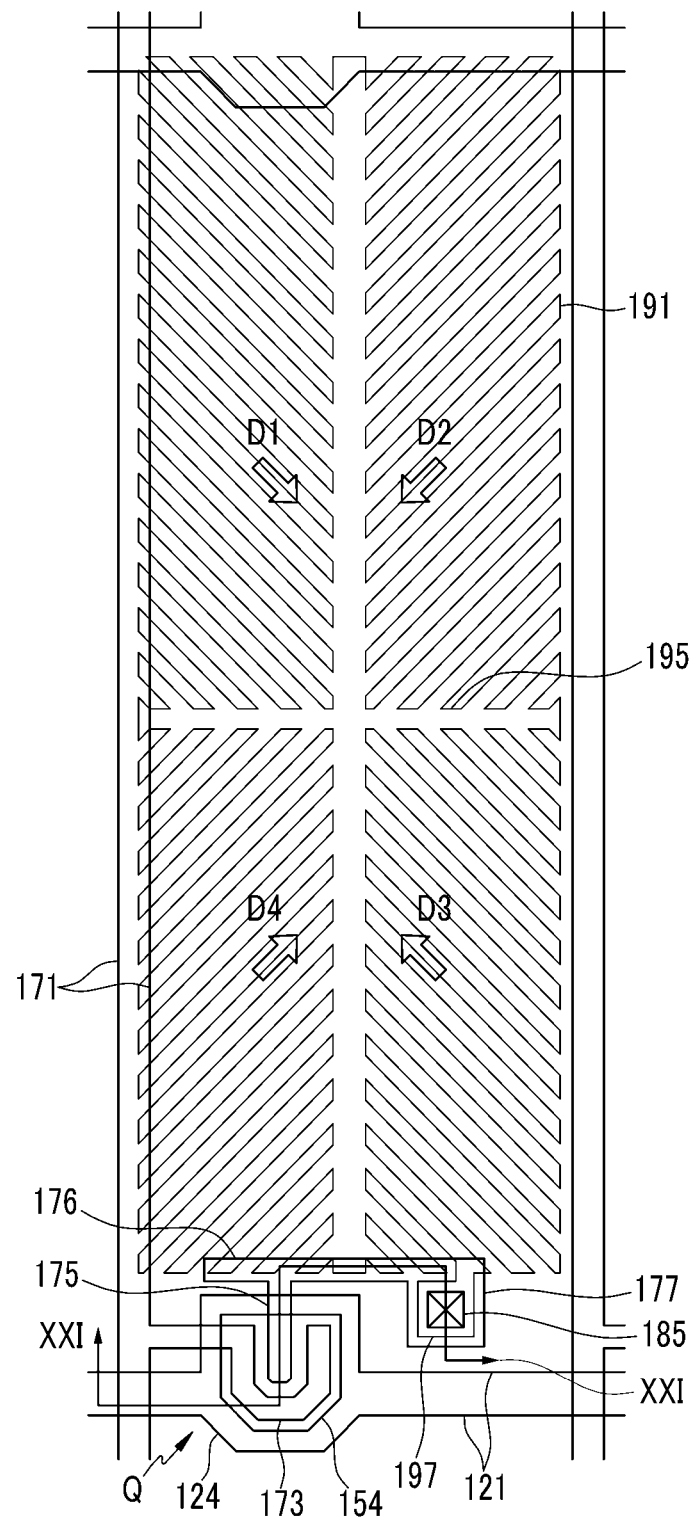
FIG. 20 is a layout view of one pixel of a display device according to an exemplary embodiment.
Figure 21:
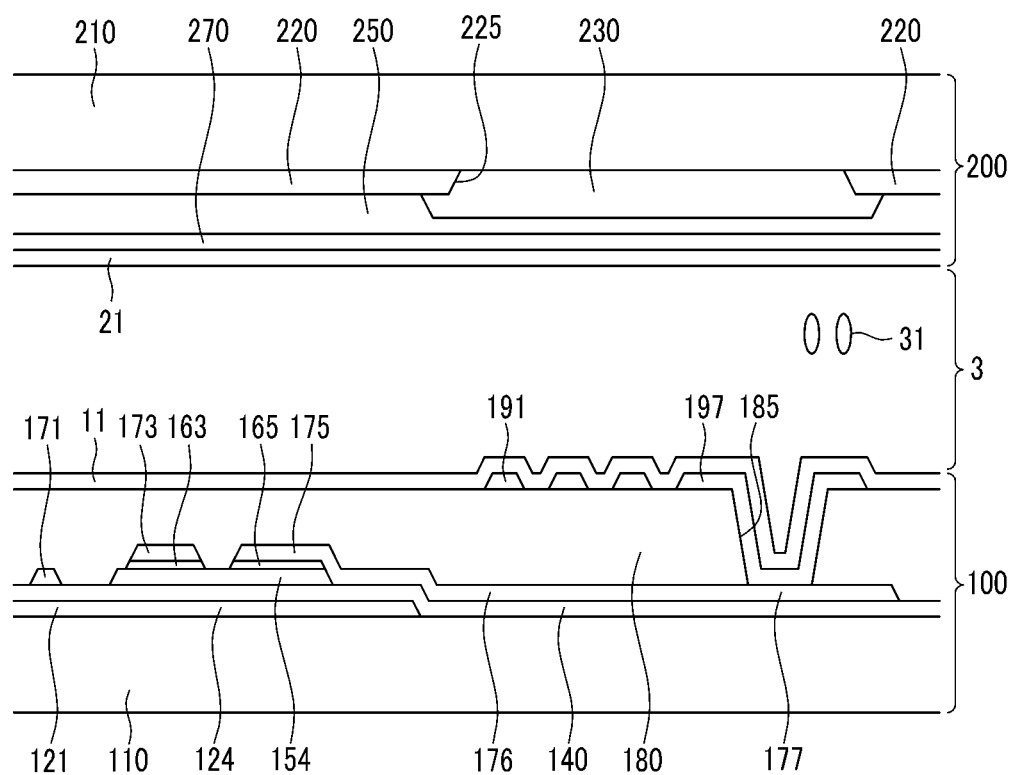
FIG. 21 is a cross-sectional view of the display device of FIG. 20 taken along line XXI-XXI.

FIG. 20 is a layout view of one pixel of the liquid crystal display according to a corresponding exemplary embodiment of the present disclosure. FIG. 21 is a cross-sectional view of the liquid crystal display of FIG. 20 taken along line XXI-XXI.

Referring to FIGS. 20 and 21, a display panel assembly 300 of a liquid crystal display device according to the corresponding exemplary embodiment includes a lower panel 100 and an upper panel 200 spaced apart and facing each other, and a liquid crystal layer 3 interposed in the spacing between the two panels 100 and 200.

First, when describing the lower panel 100, a plurality of gate lines 121 including respective gate electrodes 124 is formed on a light-passing insulation substrate 110. A gate insulating layer 140 is formed on the gate line 121, and a plurality of semiconductive islands 154 made of at least one of silicon, a semiconductive oxide, or the like is formed on the gate insulating layer 140. Ohmic contacts 163 and 165 may be positioned on the semiconductive islands 154. A plurality of data lines 171 including a source electrode 173 and a plurality of drain electrodes 175 are respectively positioned on the respective ohmic contacts 163 and 165 and on the gate insulating layer 140. The drain electrode 175 includes a vertical portion, a horizontal portion 176, and an expansion 177. The vertical portion of the drain electrode 175 faces the source electrode 173 based on the gate electrode 124, and the horizontal portion 176 vertically crosses the vertical portion and horizontally extends in parallel to the gate line 121. The expansion 177 is positioned at an end of the horizontal portion 176 and has a wide area in order to contact another layer.

The gate electrode 124, the source electrode 173, and the drain electrode 175 form a thin film transistor (TFT) Q together with the semiconductive island 154.

A passivation layer 180 is positioned on the data line 171, the drain electrode 175, and the exposed semiconductor 154 portion. A plurality of contact holes 185 exposing the expansion 177 of the drain electrode 175 are formed through the passivation layer 180.

A plurality of pixel electrodes 191 made of a transparent conductive material such as indium tin oxide (ITO) or indium zinc oxide (IZO) or a reflective metal such as aluminum, silver, chromium, or an alloy thereof are positioned on the passivation layer 180. The overall shape of each pixel electrode 191 may be a quadrangle, and the pixel electrode 191 includes a cross-shaped cross stem 195, a plurality of minute branches (not illustrated), and a lower protrusion 197. The pixel electrode 191 is divided into four subregions by the cross stem 195, and directions in which the minute branches extend are different from each other in each respective subregion as shown. An angle between the minute branch of each subregion and the gate line 124 may be approximately 45 degrees or 135 degrees.

The pixel electrode 191 is connected with the drain electrode 175 through the contact hole 185 in the lower protrusion 197 to receive data voltage from the drain electrode 175.

Next, a patterned light blocking member (BM) 220 is positioned on a light-passing insulation substrate 210 of the upper panel 200. The light blocking member 220 blocks light leakage between the pixel electrodes 191 and includes an opening 225 defining an opening area (aperture area for the respective pixel unit PX). A plurality of color filters 230 are positioned on the insulation substrate 210 and the light blocking member 220. Each color filter 230 may display one of primary colors such as the three primary colors of red, green and blue or four primary colors of red, green, blue, and white or yellow. A planarizing overcoat 250 is formed on the color filter 230 and the light blocking member 220, and then an opposing electrode 270 (e.g., common electrode) made of a transparent conductor such as ITO and IZO is formed on the front surface of the overcoat 250.

Alignment layers 11 and 12 are coated on inner facing surfaces of the panels 100 and 200. The two alignment layers 11 and 21 may be vertical alignment layers.

Polarizers (not illustrated) may be provided on outer surfaces of the panels 100 and 200.

The liquid crystal layer 3 interposed between the lower panel 100 and the upper panel 200 includes liquid crystal molecules 31 having negative dielectric anisotropy, and the liquid crystal molecules 31 may be aligned so that long axes thereof are vertical to the surfaces of the two panels 100 and 200 while an electric field is not applied. The liquid crystal molecules 31 may form pretilts so that long axes thereof are substantially parallel to a length direction of the minute branch of the pixel electrode 191. To this end, the liquid crystal layer 3 may further include a cured alignment aiding agent such as mesogen.

The pixel electrode 191 receiving an externally supplied data voltage generates an electric field in the liquid crystal layer 3 together with the opposing electrode 270 receiving an externally supplied common voltage. Then, the liquid crystal molecules 31 of the liquid crystal layer 3 change directions so that the long axes thereof are vertical to the direction of the electric field in response to the applied voltage between the pixel electrode and the common electrode. A change degree of polarization of incident light in the liquid crystal layer 3 varies according to a tilted degree of the liquid crystal molecule 31, and the change of the polarization is represented as a transmittance change due to the polarizer, and as a result, the liquid crystal display displays the image.

The tilt directions of the liquid crystal molecules 31 may be determined by a fringe field due to the minute branches of the pixel electrode 191, and as a result, the liquid crystal molecules 31 are tilted in a parallel direction to a length direction of the minute branches. Since one pixel electrode 191 includes four subregions of which length directions of the minute branches are different from each other, the tilt directions of the liquid crystal molecules 31 are approximately four, and four domains D1 to D4 of which alignment directions of the liquid crystal molecules 31 are different from each other are formed in the liquid crystal layer 3. Arrows illustrated in FIG. 20 substantially represent the tilt directions of the liquid crystal molecules 31. As described above, it is possible to provide the liquid crystal display capable of improving a viewing angle characteristic and acquiring touch information by forming the optical patterns according to the exemplary embodiments described above in the four domains D1 to D4.

Figure 22:
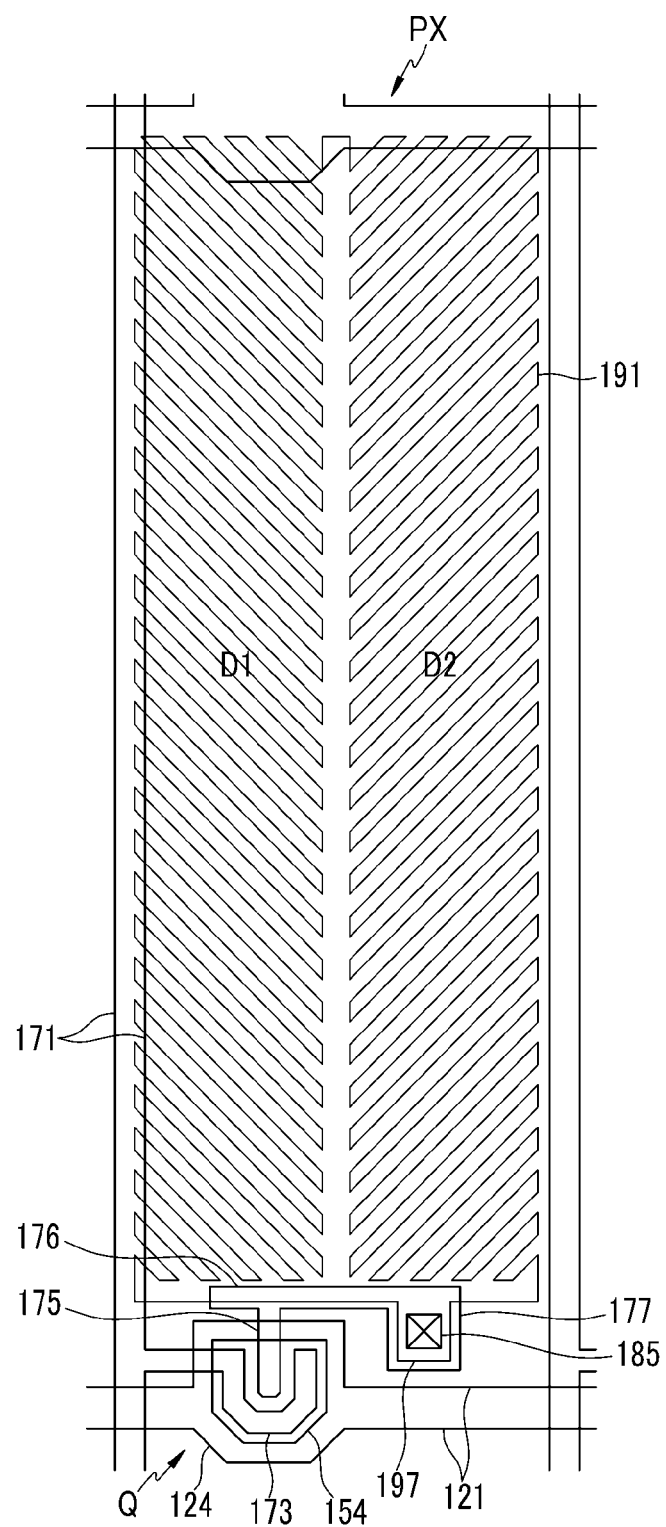
FIG. 22 is a layout view of one pixel of a display device according to an exemplary embodiment.

FIG. 22 is a layout view of one pixel of the liquid crystal display according to other exemplary embodiment.

The exemplary embodiment illustrated in FIG. 22 is almost the same as the exemplary embodiment illustrated in FIGS. 20 and 21, except that each pixel electrode 191 includes only the vertical stem instead of the cross stem and as a result, the one pixel electrode 191 includes only two subregions. Accordingly, the liquid crystal layer 3 corresponding to the pixel electrode 191 may be divided into two domains D1 and D2.

Figure 23:
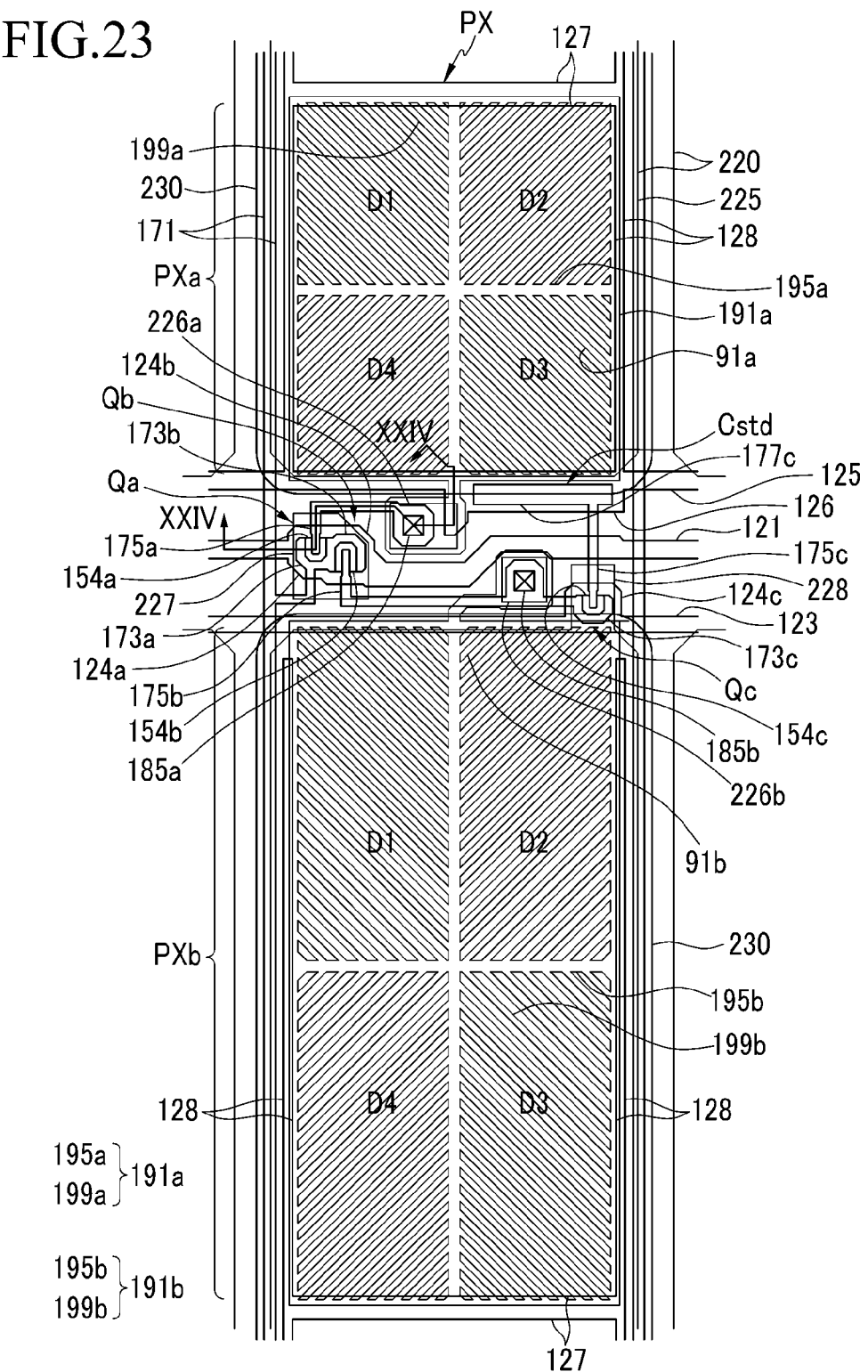
FIG. 23 is a layout view of one pixel of a display device according to an exemplary embodiment.
Figure 24:
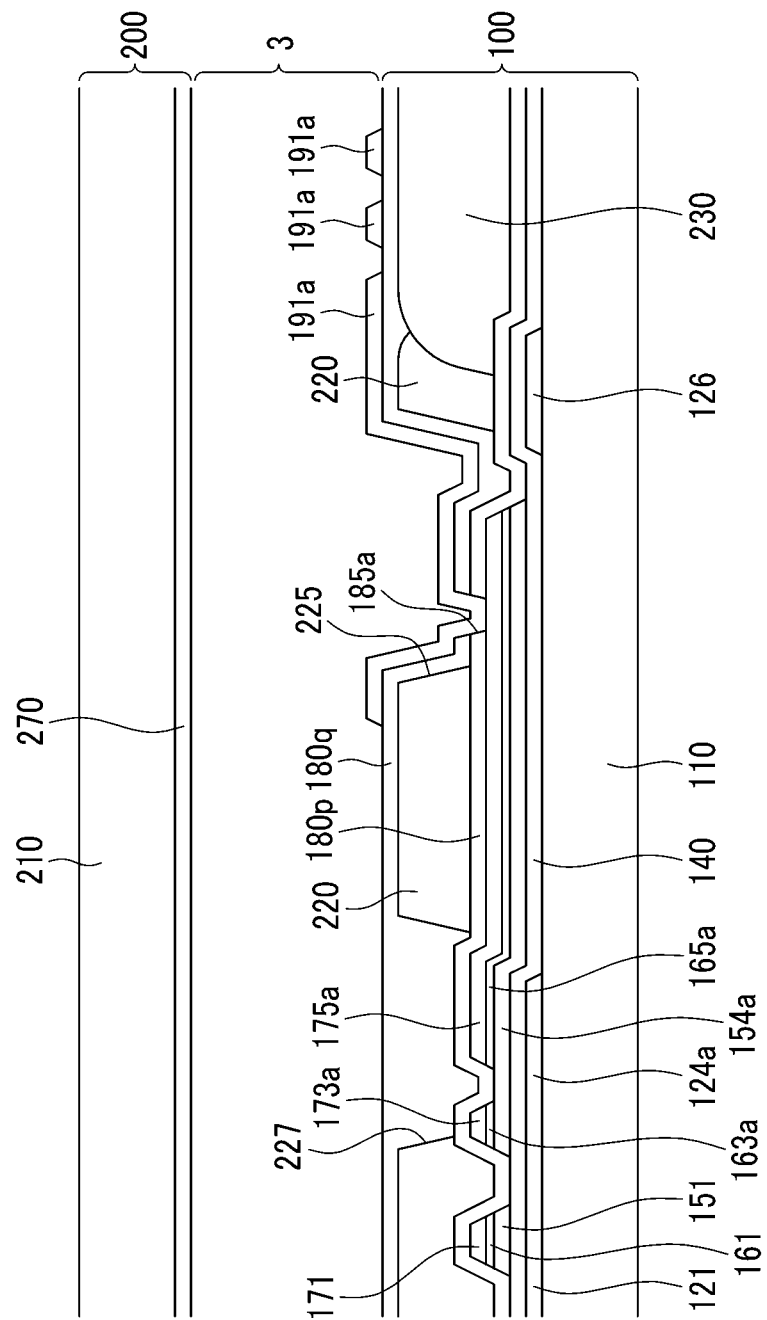
FIG. 24 is a cross-sectional view of the display device of FIG. 23 taken along line XXIV-XXIV.
Figure 25:
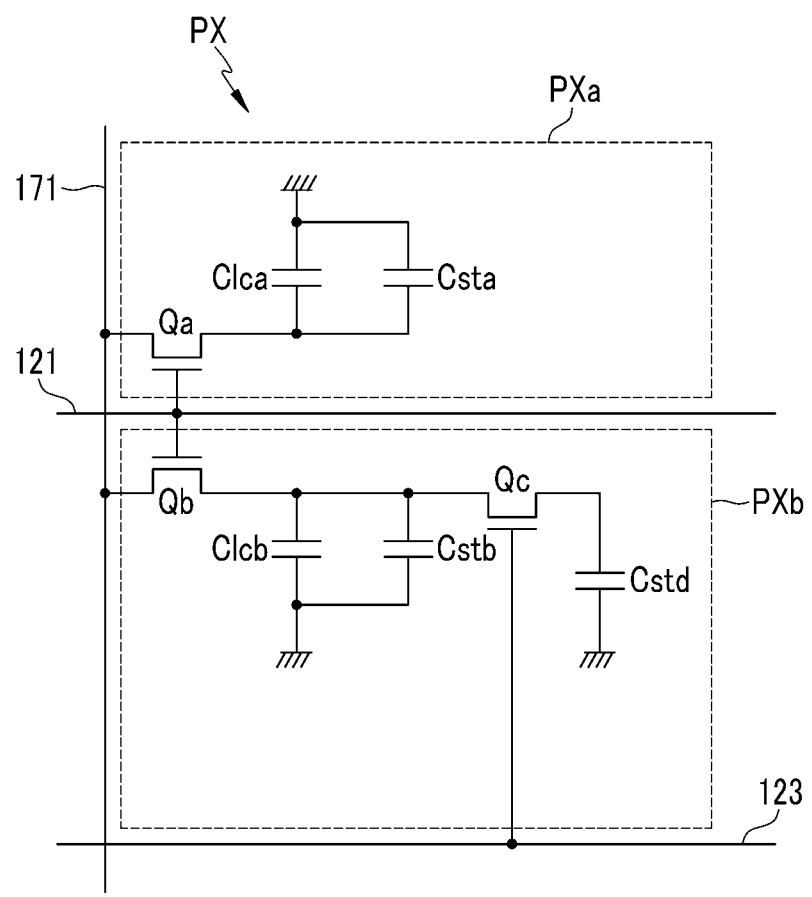
FIG. 25 is an equivalent circuit diagram of one pixel of the display device according to the exemplary embodiment.

FIG. 23 is a layout view of one pixel of a liquid crystal display according to another exemplary embodiment. FIG. 24 is a cross-sectional view of the liquid crystal display of FIG. 23 taken along line XXIV-XXIV. FIG. 25 is an equivalent circuit diagram of one pixel of the liquid crystal display according to the present exemplary embodiment.

First, referring to FIG. 25, the liquid crystal display according to the exemplary embodiment may include signal lines including a main gate line 121, a step-down gate line 123, and a data line 171, and a pixel PX connected thereto. Each pixel PX includes first and second subpixels PXa and PXb. The first subpixel PXa includes a first switching element Qa, a first liquid crystal capacitor Clca, and a first storage capacitor Csta, and the second subpixel PXb includes second and third switching elements Qb and Qc, a second liquid crystal capacitor Clcb, a second storage capacitor Cstb, and a step-down capacitor Cstd. The first and second switching elements Qa and Qb are connected to the main gate line 121 and the data line 171, respectively, and the third switching element Qc is connected to the step-down gate line 123. The first and second switching elements Qa and Qb are three-terminal elements such as a thin film transistor, and control terminals thereof are connected to the gate line 121, input terminals are connected to the data line 171, and output terminals are connected to the first and second liquid crystal capacitors Clca and Clcb and the first and second storage capacitors Csta and Cstb, respectively. The third switching element Qc is also a three-terminal element such as a thin film transistor, and a control terminal thereof is connected to the step-down gate line 123, an input terminal is connected to the second liquid crystal capacitor Clcb, and an output terminal is connected to the step-down capacitor Cstd. The step-down capacitor Cstd is connected to the output terminal of the third switching element Qc and the common voltage.

When describing an operation of the pixel PX, first, the first and second liquid crystal capacitors Clca and Clcb are charged by a difference between a data voltage Vd and a common voltage Vcom through the first and second thin film transistors Qa and Qb which are turned on when a gate-on voltage Von is applied to the gate line 121. Next, when a gate-off voltage Voff is applied to the main gate line 121 and simultaneously, the gate-on voltage Von is applied to activate the step-down gate line 123, the third switching element Qc is temporarily turned on so that the pre-charged voltage of the second liquid crystal capacitor Clcb which is connected to the output terminal of the second switching element Qb drops due to charge sharing. Accordingly, the charging voltage of the second liquid crystal capacitor Clcb is lower than the charging voltage of the first liquid crystal capacitor Clca after that, thereby improving side visibility of the liquid crystal display.

FIGS. 23 and 24 illustrate examples of a structure of the pixel PX.

Referring to FIGS. 23 and 24, since the liquid crystal display according to the exemplary embodiment is almost the same as the exemplary embodiment illustrated in FIGS. 20 and 21 described above, differences will be mainly described, and hereinafter, this is the same.

A plurality of gate lines 121, a plurality of step-down gate lines 123, and a plurality of common voltage lines 125 transferring the common voltage Vcom are positioned on the insulation substrate 110 of the lower panel 100. The gate line 121 may include a first gate electrode 124a and a second gate electrode 124b protruding upward and downward, and the step-down gate line 123 may include a third gate electrode 124c protruding upward. The common voltage line 125 may include an expansion 126, a pair of vertical portions 128 extending upward to be substantially vertical to the gate line 121, and a horizontal portion 127 connecting the pair of vertical portions 128.

A gate insulating layer 140 and a semiconductor stripe 151 are formed on the gate lines 121 and the step-down gate line 123. The semiconductor stripe 151 may mainly extend in a vertical direction, and include first and second semiconductors 154a and 154b which extend toward the first and second gate electrodes 124a and 124b and are connected with each other, and a third semiconductor 154c connected with the second semiconductor 154b. Ohmic contacts 161, 163a, and 165a may be positioned on the semiconductor stripe 151, the first semiconductor 154a, the second semiconductor 154b and the third semiconductor 154c.

A plurality of data lines 171, a plurality of first drain electrodes 175a, a plurality of second drain electrodes 175b, and a plurality of third drain electrodes 175c are positioned on the ohmic contacts 161 and 165a. Each data line 171 includes a first source electrode 173a and a second source electrode 173b. One wide end portion of the second drain electrode 175b is extended to form a third source electrode 173c. A wide end portion 177c of the third drain electrode 175c is overlapped with the expansion 126 to form the step-down capacitor Cstd, and a rod-shaped end portion is partially surrounded by the third source electrode 173c.

The first/second/third gate electrodes 124a/124b/124c, the first/second/third source electrodes 173a/173b/173c, and the first/second/third drain electrodes 175a/175b/175c form respective first/second/third thin film transistors Qa/Qb/Qc together with the first/second/third semiconductors 154a/154b/154c, respectively.

A lower passivation layer 180p, a color filter 230, and a light blocking member 220 are positioned on the data line 171 and exposed portions of the semiconductors 154a, 154b, and 154c. The light blocking member 220 may include an opening 227 positioned on the first thin film transistor Qa and the second thin film transistor Qb, an opening 226a positioned on the wide end portion of the first drain electrode 175a, an opening 226b positioned on the wide end portion of the second drain electrode 175b, and an opening 228 positioned on the third thin film transistor Qc. Unlike this, at least one of the color filter 230 and the light blocking member 220 may be positioned on the upper panel 200.

An upper passivation layer 180q may be formed on the color filter 230 and the light blocking member 220. A plurality of contact holes 185a and 185b exposing the first drain electrode 175a and the second drain electrode 175b, respectively is formed in the lower passivation layer 180p and the upper passivation layer 180q.

The pixel electrode including the first subpixel electrode 191a and the second subpixel electrode 191b is formed on the upper passivation layer 180q. The overall shape of the first subpixel electrode 191a included in the first subpixel PXa is a quadrangle, and the first subpixel electrode 191a includes a cross stem 195a, and a plurality of minute branches 199a extending obliquely outward from the cross stem 195a. A minute slit 91a is positioned between the adjacent minute branches 199a. The overall shape of the second subpixel electrode 191b included in the second subpixel PXb is a quadrangle, and the second subpixel electrode 191b includes a cross stem 195b, and a plurality of minute branches 199b extending obliquely outward from the cross stem 195b. A minute slit 91b is positioned between the adjacent minute branches 199b.

Each of the first subpixel electrode 191a and the second subpixel electrode 191b is divided into four subregions by each of the cross stems 195a and 195b. Accordingly, the tilt directions of the liquid crystal molecules 31 are approximately four in each of the subpixels PXa and PXb, and four domains D1 to D4 having different alignment directions of the liquid crystal molecules 31 are formed on the liquid crystal layer 3 of each of the subpixels PXa and PXb. As described above, it is possible to provide the liquid crystal display capable of improving a viewing angle characteristic and acquiring accurate touch information by forming the optical patterns according to the exemplary embodiments described above in the four domains D1 to D4 of each of the subpixels PXa and PXb, particularly, the second subpixel PXb having low luminance.

Figure 26:
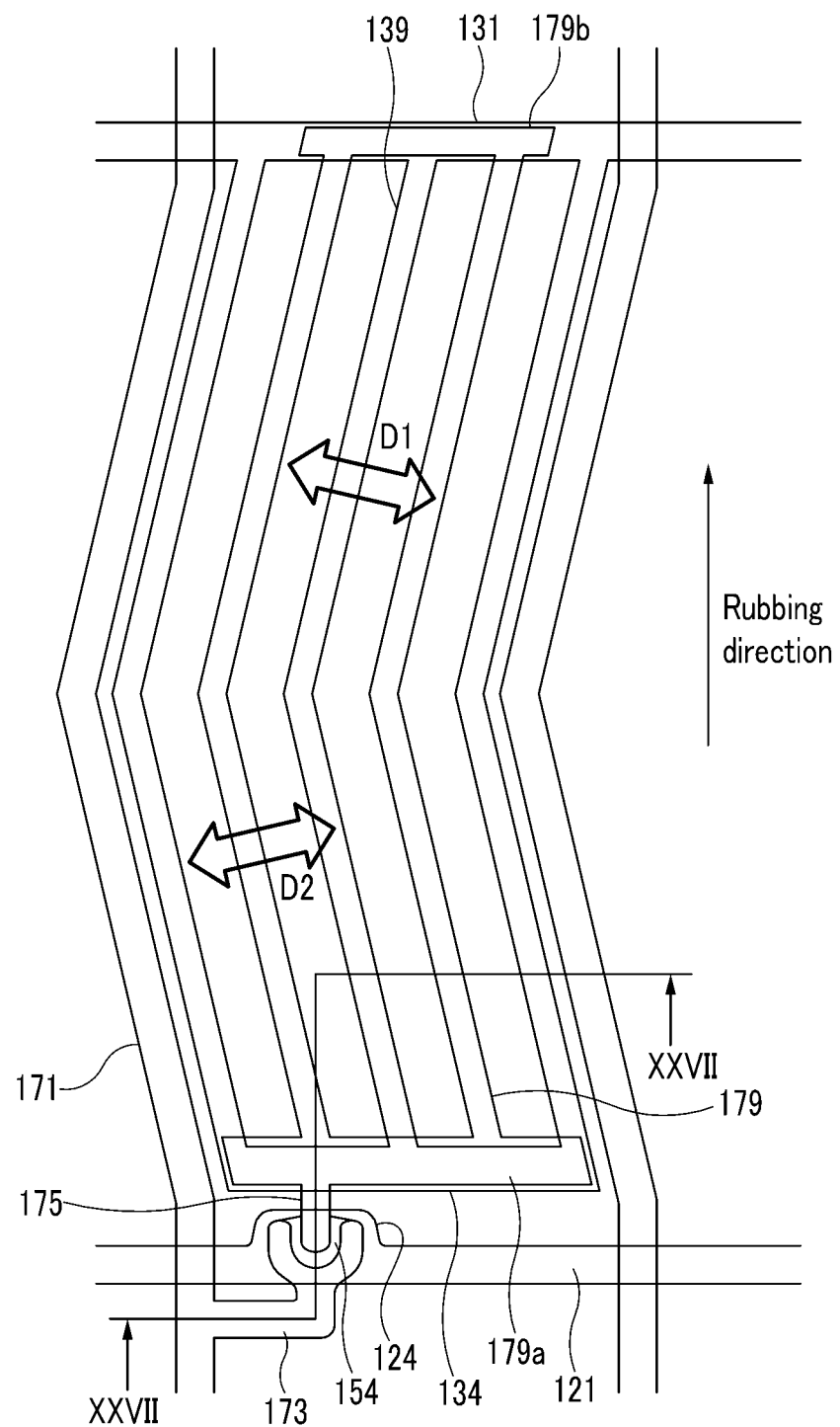
FIG. 26 is a layout view of one pixel of a display device according to an exemplary embodiment.
Figure 27:
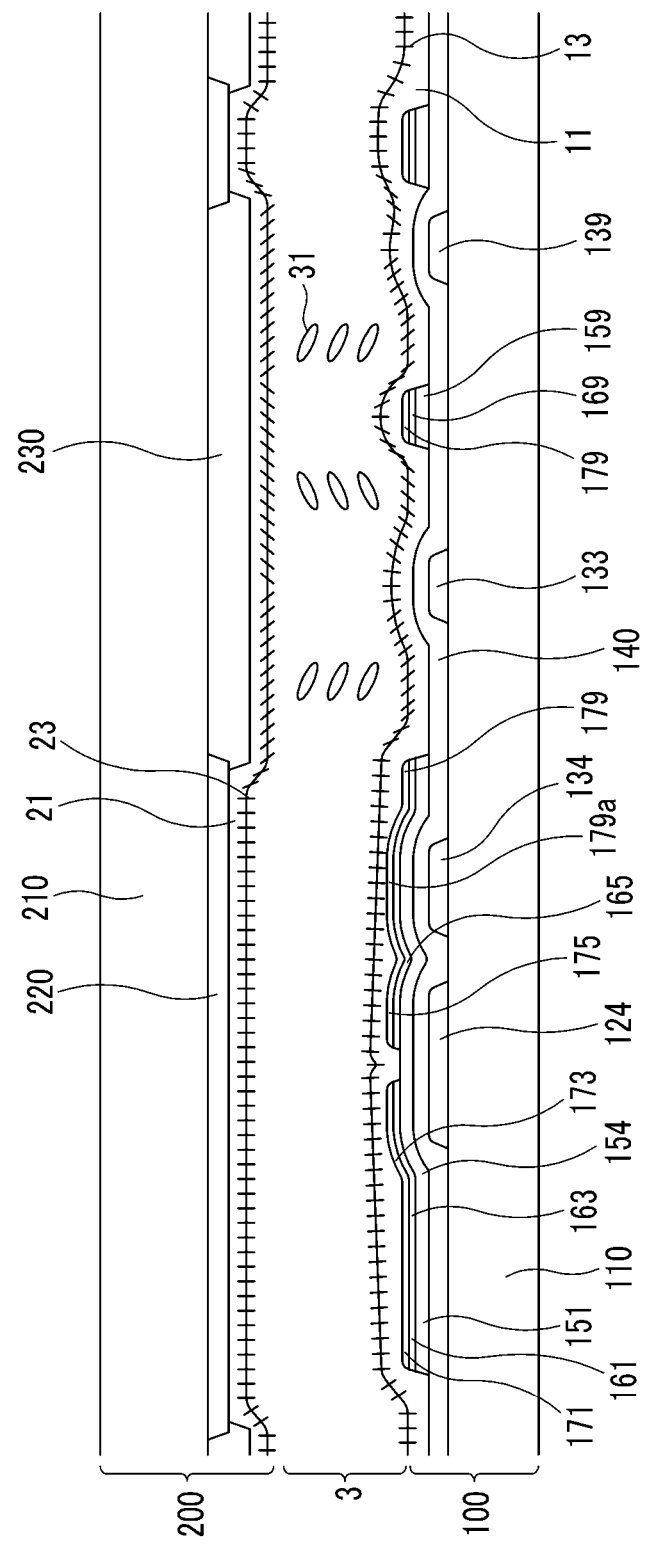
FIG. 27 is a cross-sectional view of the display device of FIG. 26 taken along line XXVII-XXVII.

FIG. 26 is a layout view of one pixel of the liquid crystal display according to a corresponding exemplary embodiment. FIG. 27 is a cross-sectional view of the display device of FIG. 26 taken along line XXVII-XXVII.

First, the gate line 121 including the gate electrode 124 and a common electrode line 131 are positioned on the insulation substrate 110 of the lower panel 100. A linear opposing electrode 139 is connected to the common electrode line 131. End portions of the linear opposing electrode 139 may be connected to a connection portion 134. The linear opposing electrode 139 may be bent at least once. The gate insulating layer 140, semiconductors 151, 154, and 157, and ohmic contacts 161, 163, 165, and 167 may be positioned on the gate line 121 and the common electrode line 131.

A data line 171 including a plurality of source electrodes 173, a drain electrode 175, and a linear pixel electrode 179 connected with the drain electrode 173 are positioned on the ohmic contacts 161, 163, 165, and 167. The linear pixel electrode 179 extends in parallel to the linear opposing electrode 139, and both ends thereof may be connected to each other by a first connection portion 179a and a second connection portion 179b, respectively. The data line 171 and the linear pixel electrode 179 may be bent at least once, similarly to the linear opposing electrode 139.

Alignment aids (e.g., branching out mesogens) 13 and 23 may be coupled with the alignment layers 11 and 12 which are coated on the inner surfaces of the two panels 100 and 200. The alignment layers 11 and 21 may be horizontal alignment layers. In a manufacturing process of the liquid crystal display, the alignment layers 11 and 21 are rubbed, and the liquid crystal molecules 31 may be aligned so as to be substantially parallel to the rubbing directions. As illustrated in FIG. 26, the rubbing direction may be substantially vertical to the gate line 121. Meanwhile, the alignment aiding agents 13 and 23 may be formed by photopolymerizing photopolymerizable monomers or oligomers, and the liquid crystal molecules 31 may have pretilts of angles having more than 0 degree with respect to the rubbing directions by the alignment aiding agents 13 and 23.

The liquid crystal molecule 31 may have positive dielectric anisotropy. When an electric field is generated in the liquid crystal layer 3 by applying voltages to the linear opposing electrode 139 and the linear pixel electrode 179, the liquid crystal molecules 31 are realigned so as to be substantially parallel to the electric field. Accordingly, the liquid crystal layer 3 corresponding to one pixel electrode 191 may be divided into two domains D1 and D2. Arrows of FIG. 26 represent the tilt directions of the liquid crystal molecules 31 in the respective domains D1 and D2.

Figure 28:
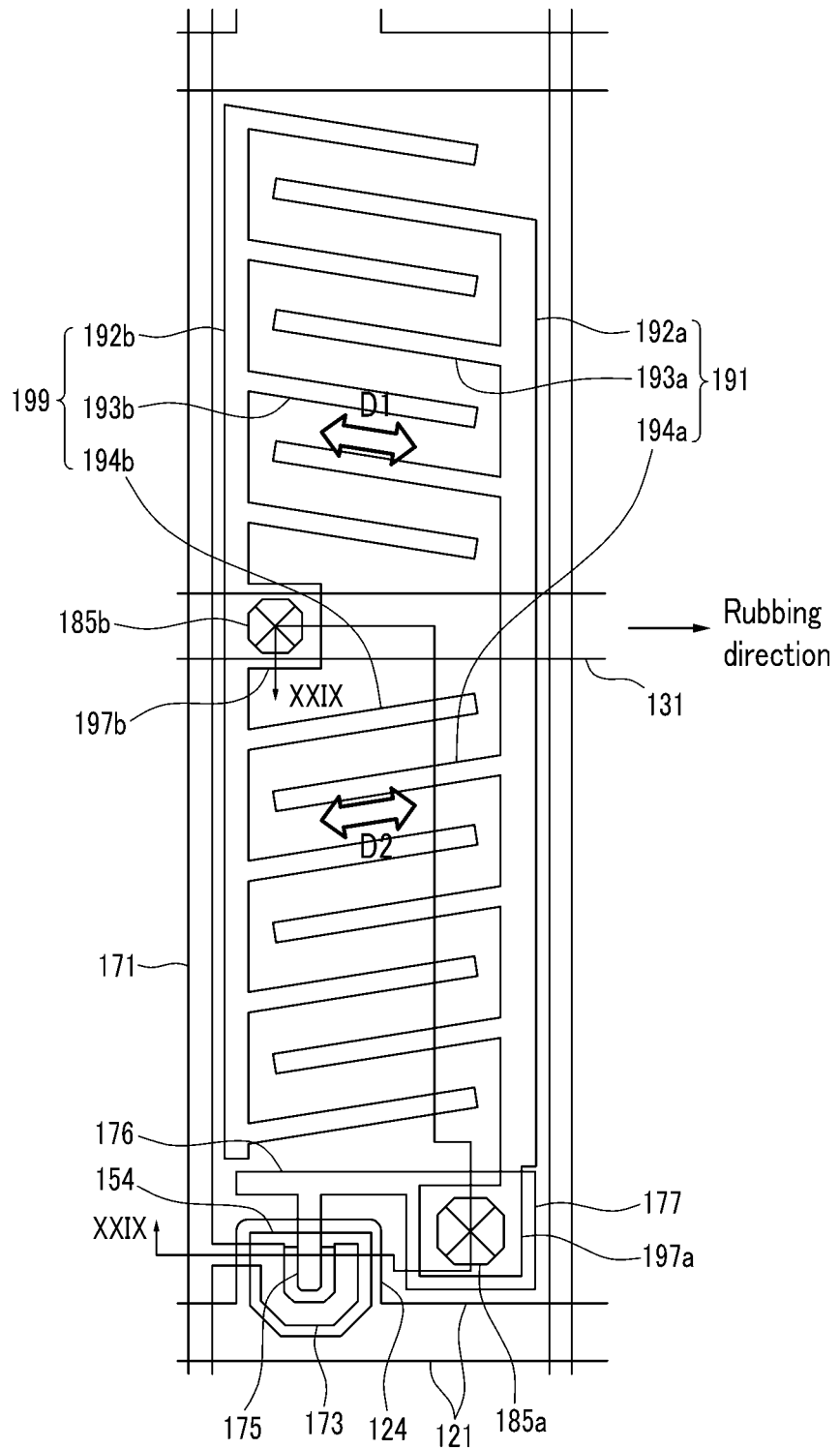
FIG. 28 is a layout view of one pixel of a display device according to an exemplary embodiment.
Figure 29:
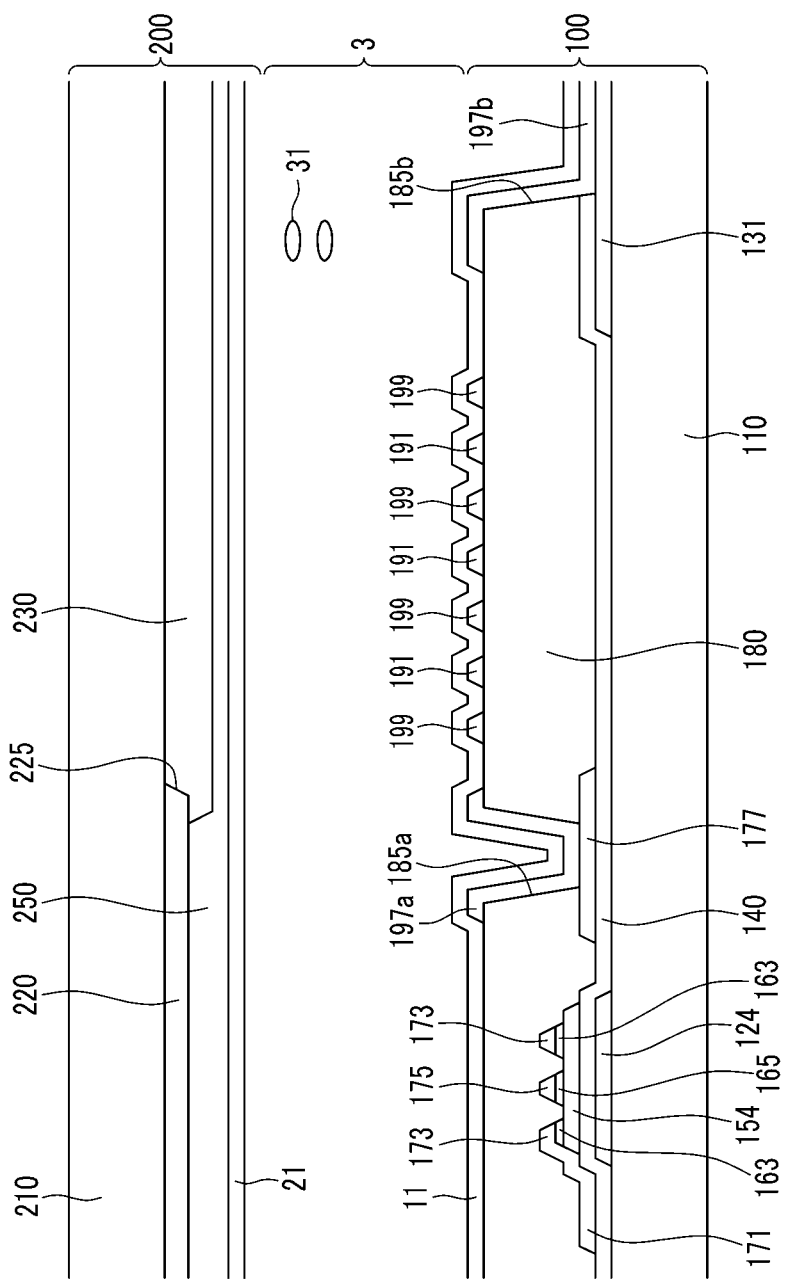
FIG. 29 is a cross-sectional view of the display device of FIG. 28 taken along line XXIX-XXIX.

FIG. 28 is a layout view of one pixel of the liquid crystal display according to a corresponding exemplary embodiment. FIG. 29 is a cross-sectional view of the display device of FIG. 28 taken along line XXIX-XXIX.

Referring to FIGS. 28 and 29, since the liquid crystal display according to the exemplary embodiment is almost the same as the exemplary embodiment illustrated in FIG. 26 or 27 described above, differences will be mainly described.

First, the gate line 121 including a plurality of gate electrodes 124 and the common electrode line 131 are positioned on the insulation substrate 110 of the lower panel 100. The gate insulating layer 140 is positioned on the gate line 121 and the common electrode line 131, and a plurality of semiconductors 154, a plurality of ohmic contacts 163 and 165, a plurality of data lines 171, and a plurality of drain electrodes 175 are sequentially formed thereon. A passivation layer 180 is positioned on the data line 171, the drain electrode 175, and the exposed semiconductor 154. A plurality of contact holes 185a exposing the expansion 177 of the drain electrode 175 is formed in the passivation layer 180, and a plurality of contact holes 185b exposing the common electrode line 131 is formed in the passivation layer 180 and the gate insulating layer 140.

A plurality of pixel electrodes 191 and a plurality of common electrodes 199 are formed on the same layer of the passivation layer 180. The pixel electrode 191 may include a vertical portion 192a which is vertically elongated, an upper branch 193a obliquely extending toward the upper left side from the vertical portion 192a, a lower branch 194a obliquely extending toward the lower left side from the vertical portion 192a, and a lower protrusion 197a. Further, the common electrode 199 may include a vertical portion 192b which is vertically elongated, an upper branch 193b obliquely extending toward the lower right side from the vertical portion 192b, a lower branch 194b obliquely extending toward the lower right side from the vertical portion 192h, and a protrusion 197b protruding toward the right side from the center of the vertical portion 192b. The branches 193a and 194a of the pixel electrode 191 and the branches 193b and 194b of the common electrode 199 face each other and cross each other. The upper branches 193a and 193b are tilted in a lower right direction to form a first subregion, and the lower branches 194a and 194b are tilted in an upper right direction to form a second subregion.

The alignment layers 11 and 21 which are coated on the inner surfaces of the two panels 100 and 200 may be horizontal alignment layers and may be rubbed in a horizontal direction which is substantially parallel to the gate line 121. When the electric field is generated in the liquid crystal layer 3 by applying a voltage difference between the pixel electrode 191 and the common electrode 199, the liquid crystal layer 3 on the first and second subregions of the pixel electrode 191 is divided into two domains D1 and D2 having different alignment directions of the liquid crystal molecules 31. In the case of the liquid crystal molecules 31 having negative dielectric anisotropy, as illustrated by an arrow in FIG. 28, the liquid crystal molecules 31 may be aligned in a substantially parallel direction to the branch of the pixel electrode 191.

Figure 30:
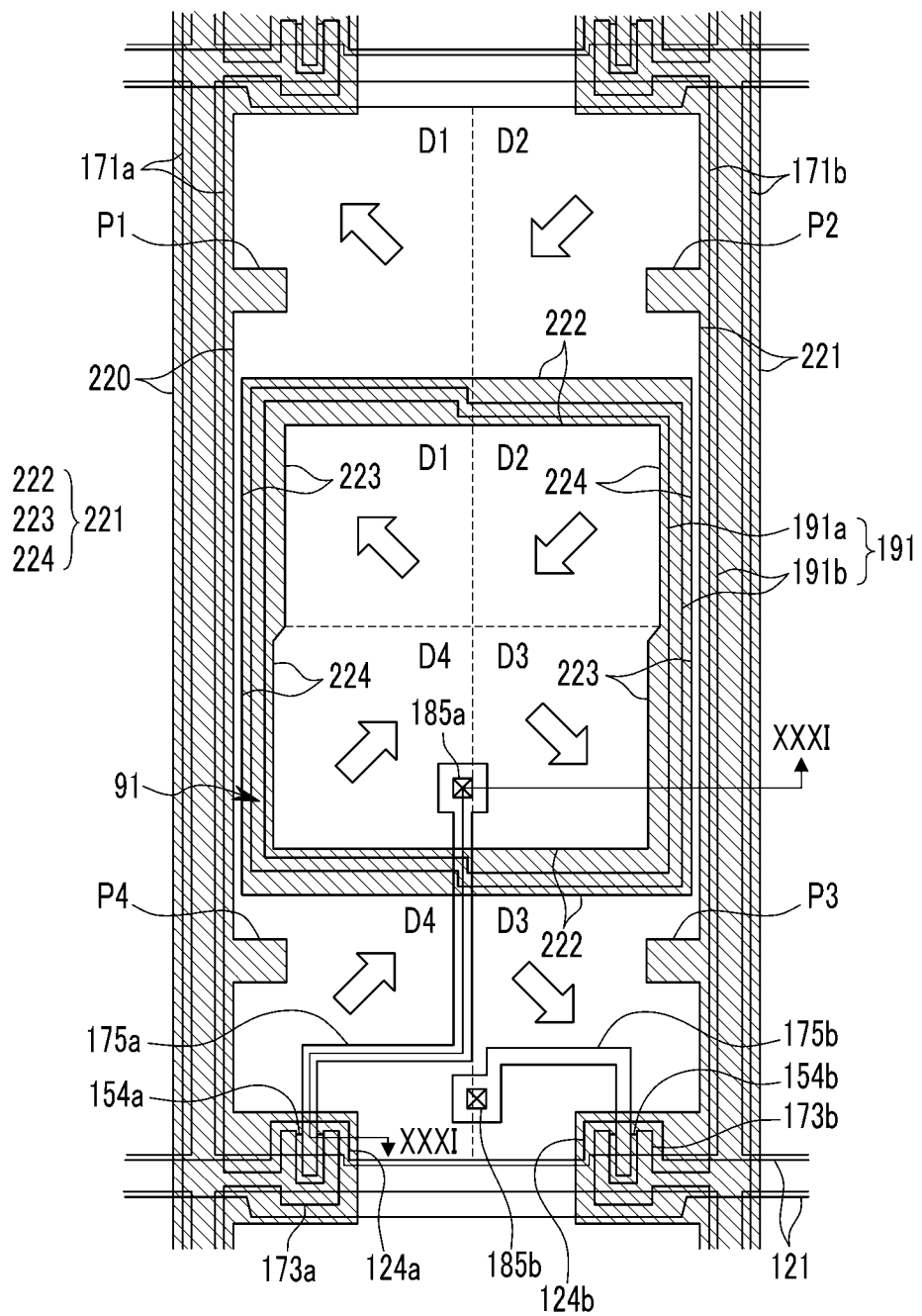
FIG. 30 is a layout view of one pixel of a display device according to an exemplary embodiment.
Figure 31:
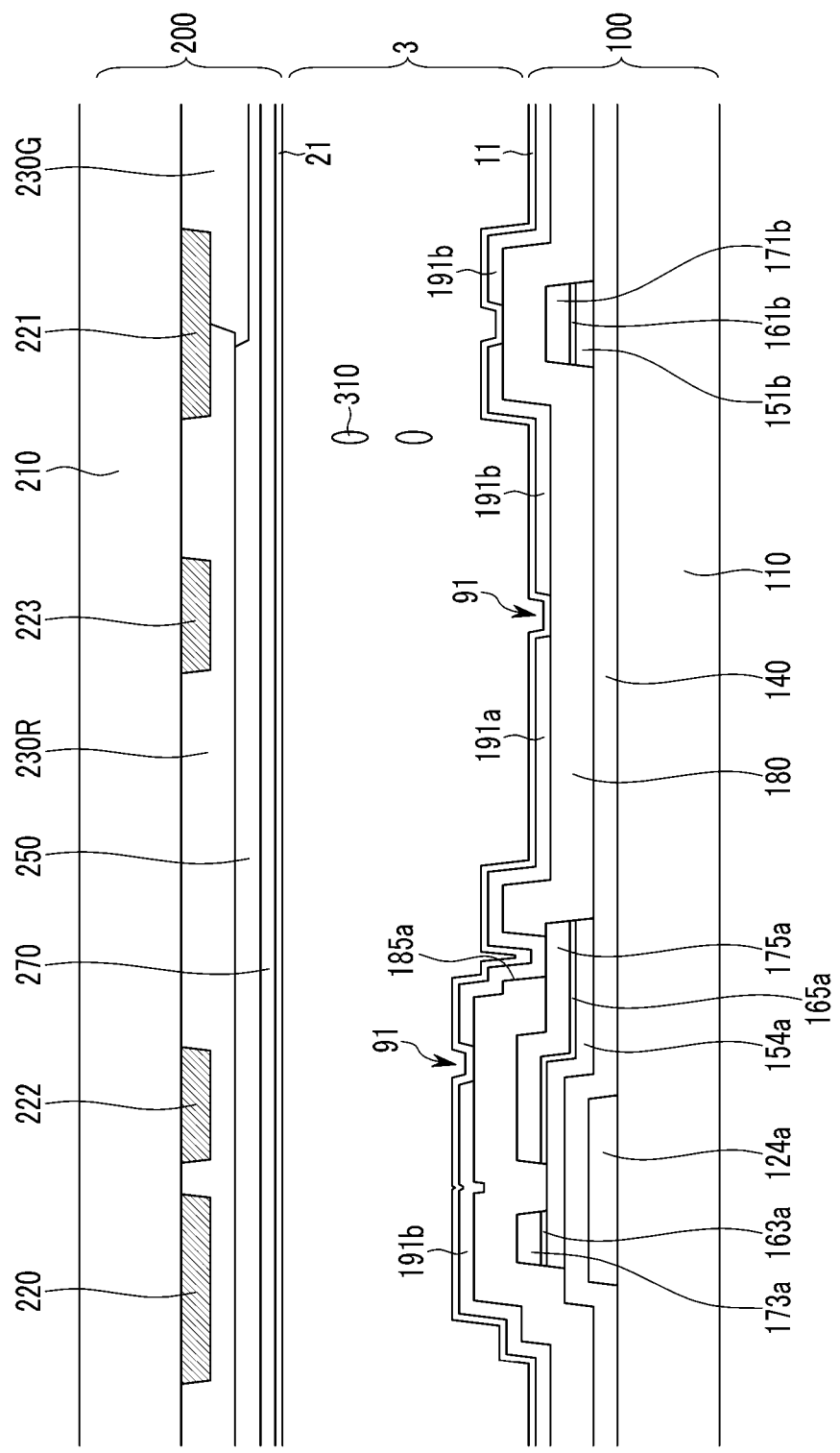
FIG. 31 is a cross-sectional view of the display device of FIG. 30 taken along line XXXI-XXXI.
Figure 32:
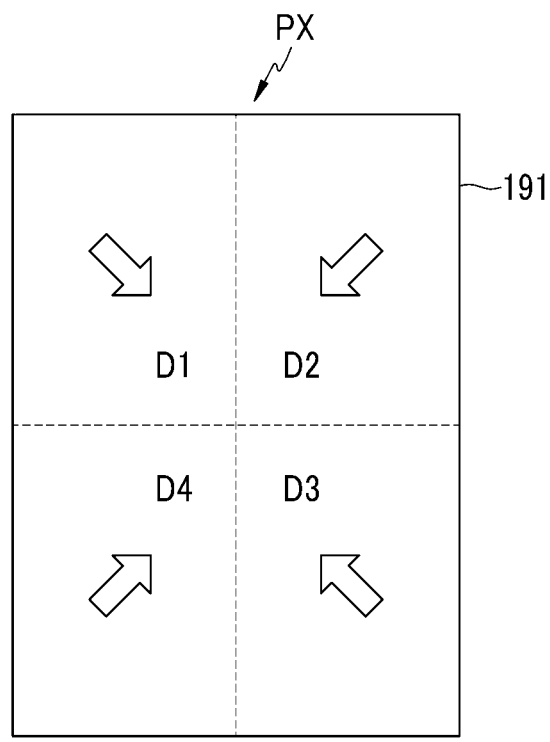
FIG. 32 is a plan view illustrating tilt directions of liquid crystal molecules in the plurality of domains included in one pixel of the display device according to the exemplary embodiment.

FIG. 30 is a layout view of one pixel of the liquid crystal display according to a corresponding exemplary embodiment. FIG. 31 is a cross-sectional view of the display device of FIG. 30 taken along line XXXI-XXXI. FIG. 32 is a plan view illustrating tilt directions of liquid crystal molecules in the plurality of domains included in one pixel of the liquid crystal display according to the corresponding exemplary embodiment.

First, when describing the lower panel 100, a gate line 121 including first and second gate electrodes 124a and 124b and a wide end portion 129 is positioned on an insulation substrate 110, a gate insulating layer 140 is positioned thereon, and a semiconductor stripe 151b including first and second semiconductors 154a and 154b and ohmic contacts 161b, 163a, and 165a are positioned thereon. First and second data lines 171a and 171b and first and second drain electrodes 175a and 175b are positioned thereon. The first data line 171a includes a first source electrode 173a which extends toward the first gate electrode 124a, and the second data line 171b includes a second source electrode 173b which extends toward the second gate electrode 124b. A passivation layer 180 including contact holes 185a and 185b is positioned on the first and second data lines 171a and 171b and the first and second drain electrodes 175a and 175b.

The pixel electrode 191 is positioned on the passivation layer 180. The pixel electrode 191 includes a pair of first and second subpixel electrodes 191a and 191b which are separated from each other with a gap 91 therebetween. The gap 91 between the first subpixel electrode 191a and the second subpixel electrode 191b may have a quadrangular band shape. The first subpixel electrode 191a and the second subpixel electrode 191b may receive different voltages through different switching elements.

Next, a plurality of light blocking members 220, color filters 230R and 230G, and a shielding member 221 overlapped with the gap 91 between the first subpixel electrode 191a and the second subpixel electrode 191b may be positioned on an insulation substrate 210 of the upper panel 200. An overcoat 250 may be positioned on the light blocking member 220 and the shielding member 221, and an opposing electrode 270 may be positioned thereon.

The alignment layers 11 and 21 which are coated on the inner surfaces of the two panels 100 and 200 may be vertical alignment layers, and the surfaces of the alignment layers 11 and 21 may have end portions tilted in different directions according to a region. The liquid crystal layer 3 positioned between the first subpixel electrode 191a and the opposing electrode 270, and the liquid crystal layer 3 positioned between the second subpixel electrode 191b and the opposing electrode 270 may be divided into four domains including the liquid crystal molecules 31 aligned in four different directions like arrows illustrated in FIG. 30, respectively. The plurality of domains D1 to D4 may be formed by a photo alignment method for the alignment layers 11 and 21. Photoreactive chains (e.g., mesogens) disposed on the surfaces of the alignment layers 11 and 21 may be set to be tilted in a light irradiated direction by obliquely irradiating light to the vertical alignment layers 11 and 21 by the photo alignment method. As illustrated in FIG. 30, optical patterns P1 to P4 may be formed in the formed domains D1 to D4, particularly, the domains D1 to D4 facing the second subpixel electrode 191b, respectively. In the exemplary embodiment, the optical patterns P1 to P4 may be positioned on the same layer as the light blocking member 220 and connected with the light blocking member 220.

Referring to FIG. 32, the exemplary embodiment is almost the same as the exemplary embodiment illustrated in FIGS. 30 and 31, but one pixel PX is not divided into two subpixels, but rather the one pixel PX may include one pixel electrode 191. The one pixel PX may include four domains D1 to D4, and each of the domains D1 to D4 may be set by a photo alignment method for the alignment layers 11 and 21.

Figure 33:
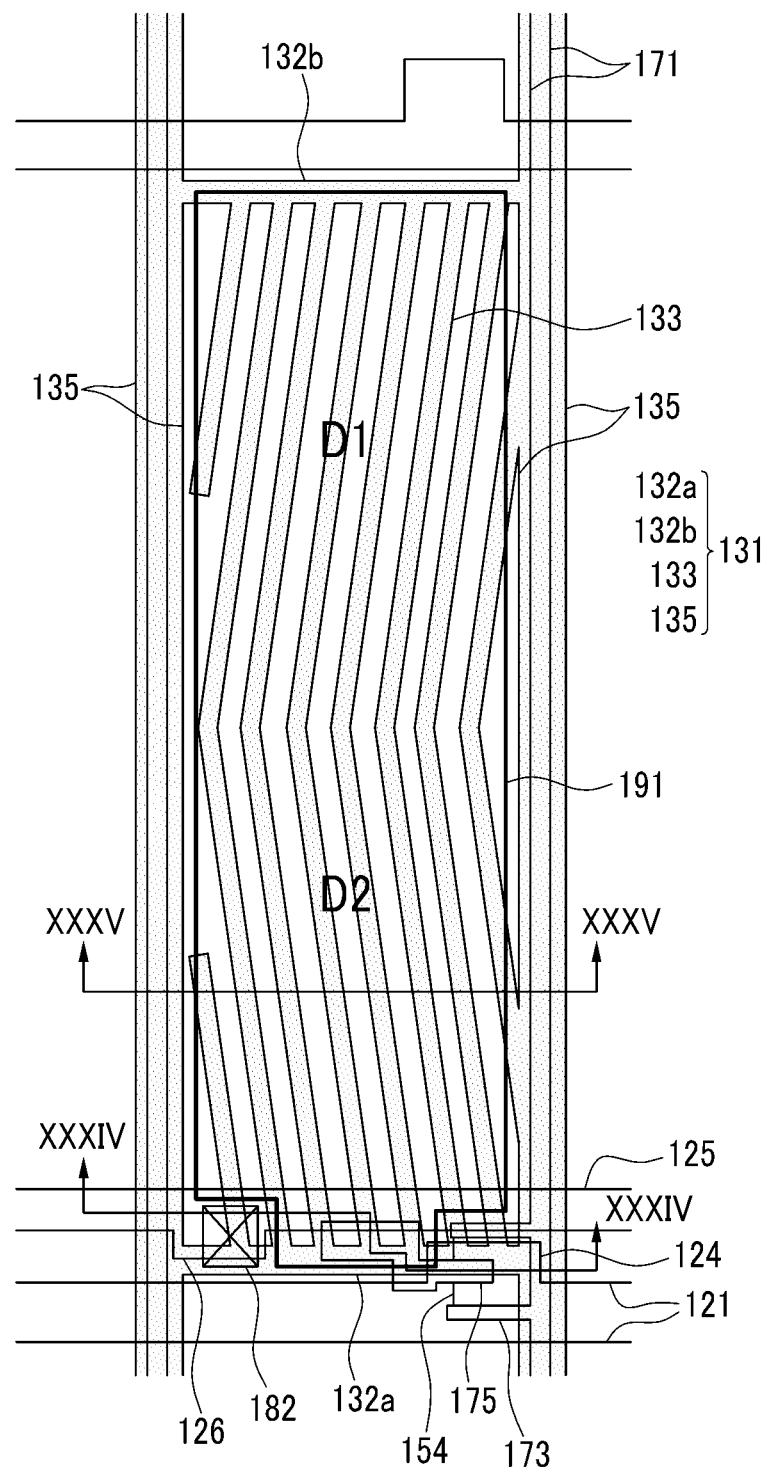
FIG. 33 is a layout view of one pixel of a display device according to an exemplary embodiment.
Figure 34:
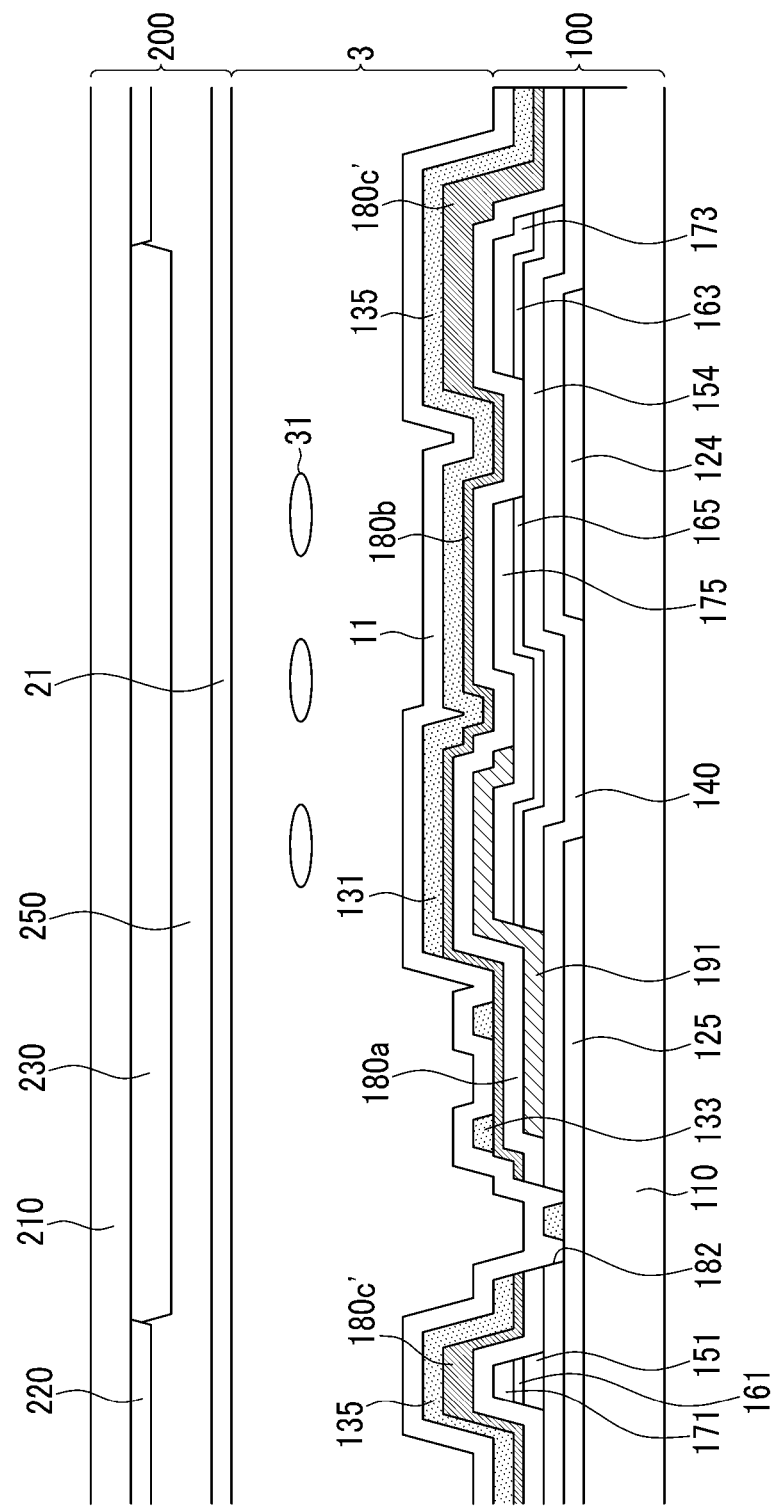
FIGS. 34 and 35 are cross-sectional views illustrating the display device of FIG. 33 taken along line XXXIV-XXXIV, respectively.
Figure 35:
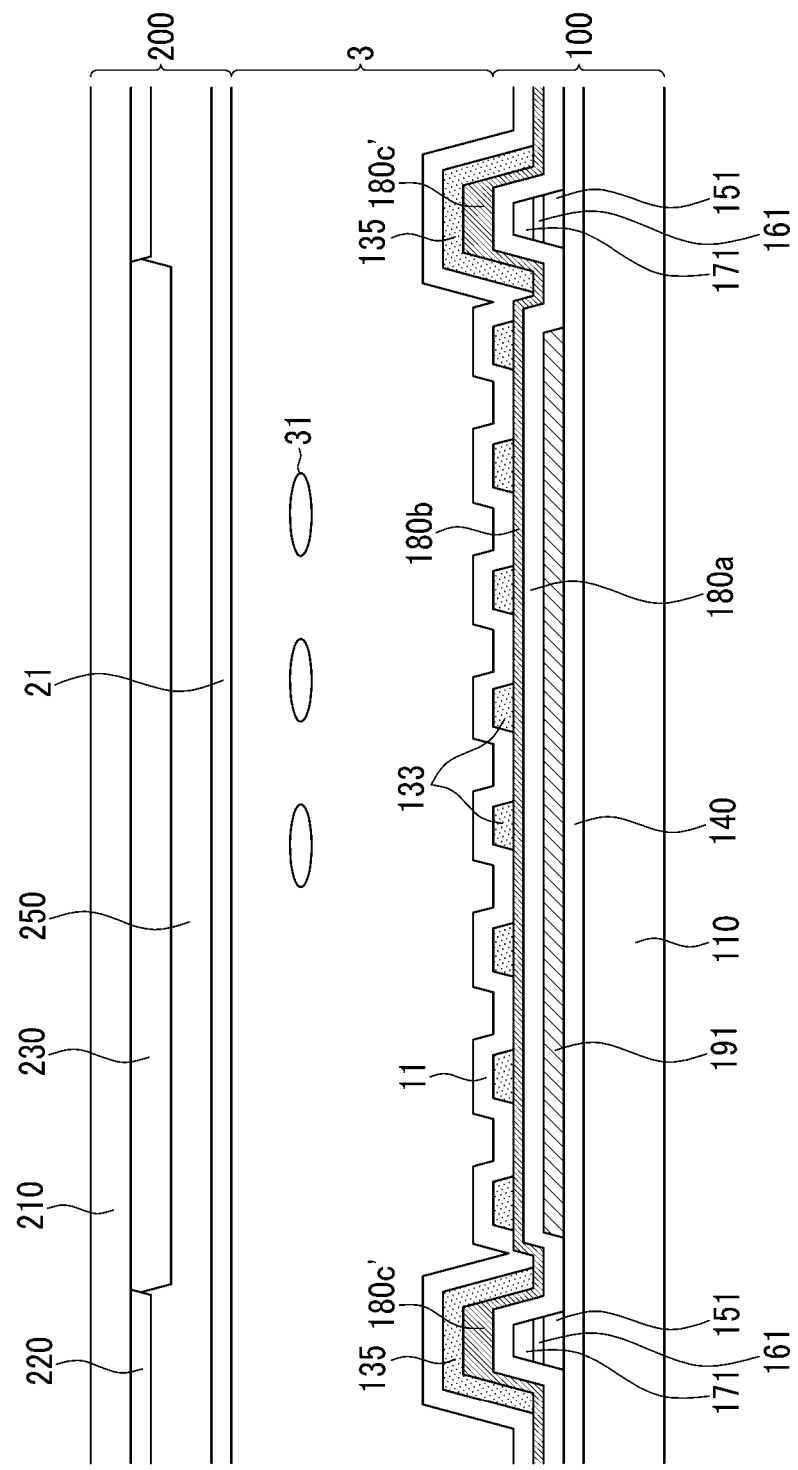

FIG. 33 is a layout view of one pixel of the liquid crystal display according to a corresponding exemplary embodiment. FIGS. 34 and 35 are cross-sectional views illustrating the display device of FIG. 33 taken along line XXXIV-XXXIV, respectively.

First, the gate line 121 including the gate electrode 124, and a common voltage line 125 including an expansion 126 are positioned on the insulation substrate 110 of the lower panel 100. The gate insulating layer 140, the semiconductor 154 including the exposed semiconductor 154, the ohmic contacts 161, 163, and 165, the data line 171, and the drain electrode 175 are positioned on the gate line 121 and the common voltage line 125. A plane-shaped pixel electrode 191 may be positioned on the data line 171, and a first passivation layer 180a and a second passivation layer 180b may be positioned thereon. The second passivation layer 180b covers the data line 171 and may include a relatively thick portion 180c' positioned along the data line 171. A contact hole 182 exposing the expansion 126 of the common voltage lines 125 is formed in the first passivation layer 180a, the second passivation layer 180b, and the gate insulating layer 140.

A plurality of common electrode lines 131 made of a transparent conductive material such as ITO or IZO is positioned on the second passivation layer 180b. Each common electrode line 131 may include a vertical portion 135 covering the data line 171 and an upper portion of the second passivation layer 180b, a plurality of branch electrodes 133 which is positioned between two vertical portions 135 and separated from each other, and a lower horizontal portion 132a and an upper horizontal portion 132b connecting ends of the plurality of branch electrodes 133. The plurality of branch electrodes 133 are substantially parallel to each other and may form an oblique angle with an extending direction of the gate line 121, and the oblique angle may be 45 degrees or more. The common electrode line 131 may receive a common voltage from the common voltage line 125 through the contact hole 182.

The alignment layers 11 and 21 which are coated on the inner surfaces of the two panels 100 and 200 may be horizontal alignment layers and may be rubbed in a vertical direction in FIG. 33.

When the pixel electrode 191 to which the data voltage is applied generates an electric field in the liquid crystal layer 3 together with the common electrode line 131, the liquid crystal molecules 31 may be aligned in a vertical or horizontal direction to a length direction of the branch electrode 133 of the common electrode line 131 according to the dielectric anisotropy. Since one pixel PX includes the branch electrodes 133 extending in different directions as illustrated in FIG. 33, the liquid crystal molecules 31 may be aligned in different directions in two domains D1 and D2.

Figure 36:
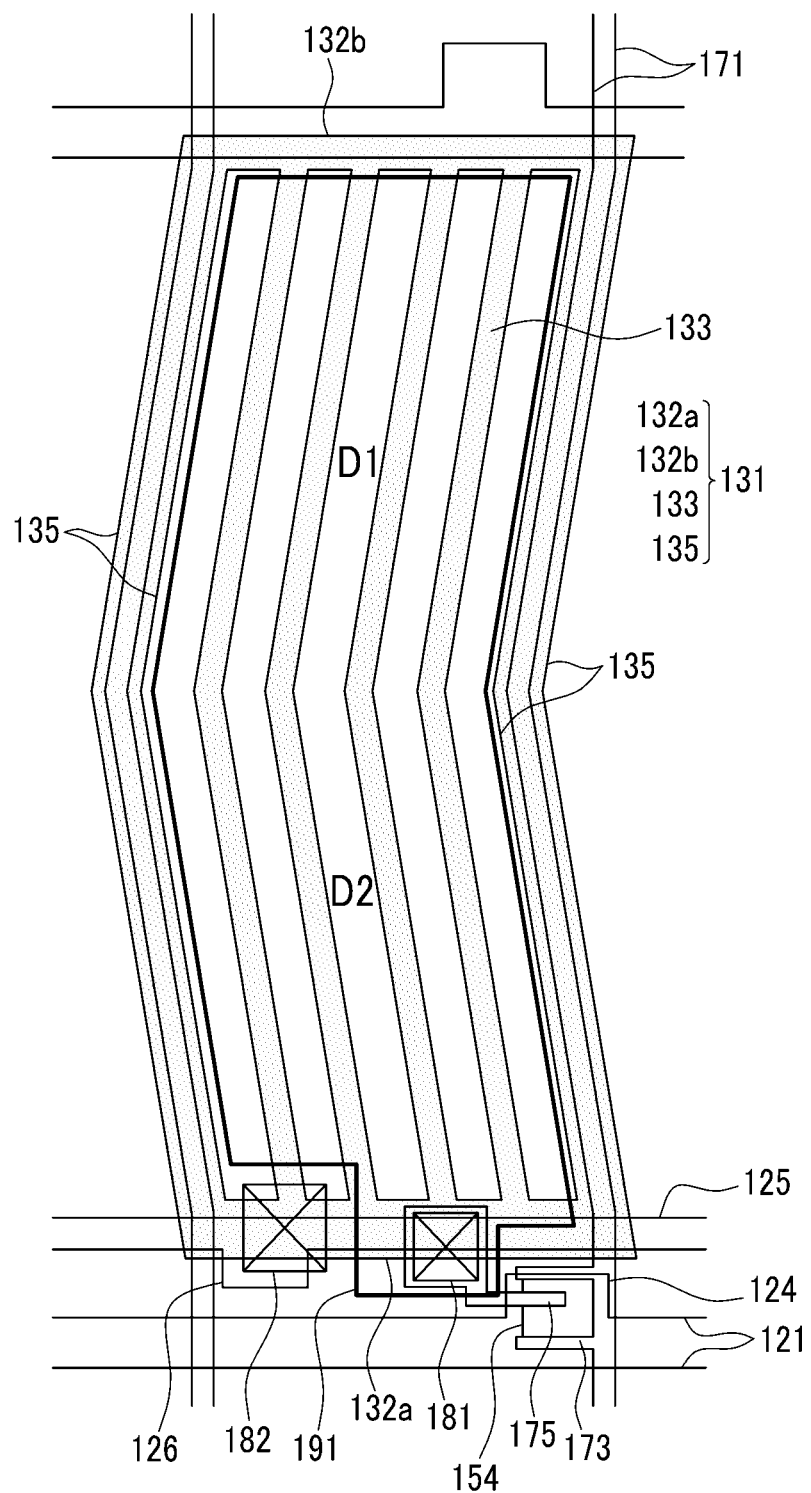
FIG. 36 is a layout view of one pixel of a display device according to an exemplary embodiment.

FIG. 36 is a layout view of one pixel of the liquid crystal display according to a corresponding exemplary embodiment.

The exemplary embodiment illustrated in FIG. 36 is almost the same as the exemplary embodiment illustrated in FIGS. 33 to 35, but a structure of the data line 171, the pixel electrode 191, and the common electrode line 131 may be different. The data line 171 may be periodically bent and may form an oblique angle with an extending direction of the gate line 121. The first passivation layer 180a includes a contact hole 181 exposing a part of the drain electrode 175, and the pixel electrode 191 is electrically connected with the drain electrode 175 through the contact hole 181. A second passivation layer 180b is positioned on the pixel electrode 191, and the common electrode line 131 is positioned thereon. A plurality of contact holes 182 exposing the expansion 126 of the common voltage lines 125 is formed in the gate insulating layer 140, the first passivation layer 180a, and the second passivation layer 180b. The common electrode line 131 is electrically connected with the common voltage line 125 through the contact hole 182 to receive the common voltage. The common electrode line 131 may include a bent vertical portion 135 which is overlapped with the data line 171 so as to cover the data line 171 in a width direction, a plurality of branch electrodes 133 which is positioned between two vertical portions 135, extends to be substantially parallel to the vertical portion 135, and separated from each other, and a lower horizontal portion 132a and an upper horizontal portion 132b connecting ends of the plurality of branch electrodes 133.

Even in the exemplary embodiment, the liquid crystal layer 3 corresponding to two subregions which have different length directions of the branch electrodes 133 of the common electrode line 131 may be divided into two domains D1 and D2 in which the liquid crystal molecules 31 are aligned in different directions. Like the exemplary embodiments described above, it is possible to provide the liquid crystal display capable of improving a viewing angle characteristic and acquiring accurate touch information by forming the optical patterns in the two domains D1 and D2.

Next, a display device capable of acquiring touch information according to at least one exemplary embodiment among the many disclosed herein will be described with reference to FIG. 37 together with FIGS. 1 and 2 described above.

Figure 37:
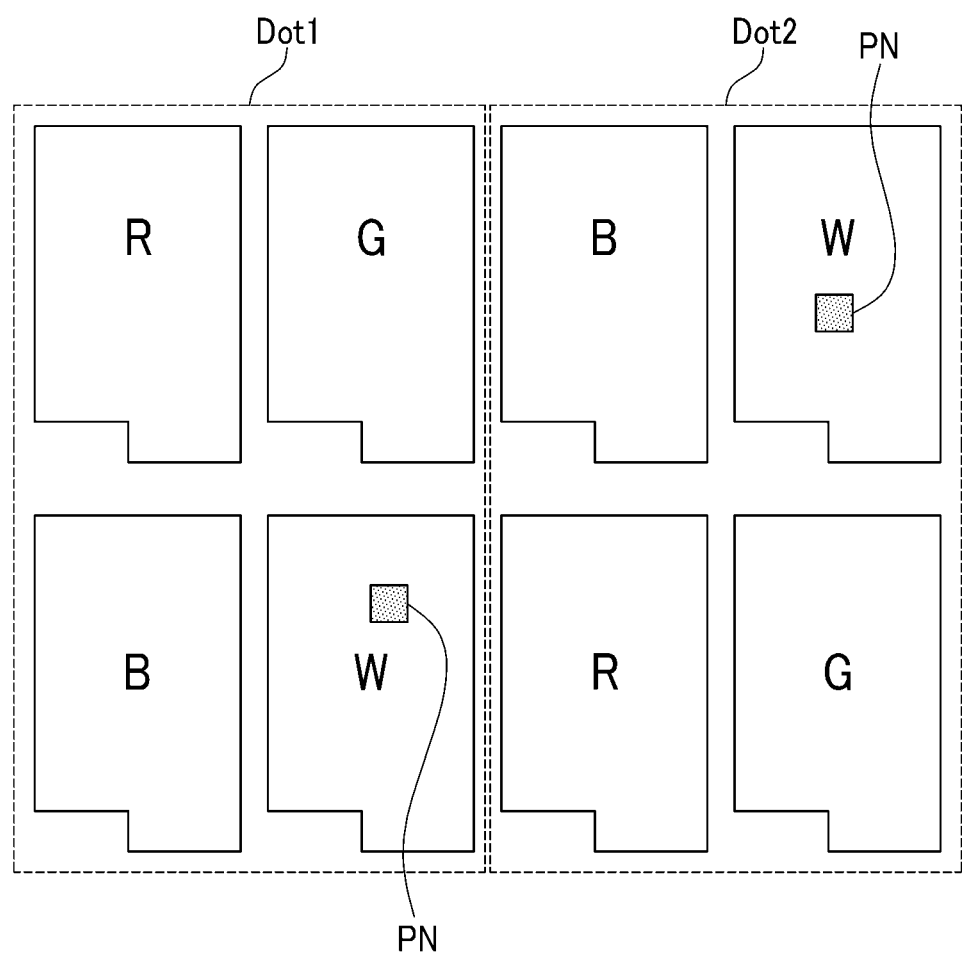
FIGS. 37 to 40 are layouts views of a plurality of pixels included in the display device according to the exemplary embodiment, respectively.

FIG. 37 is a layout view of a plurality of differently colored pixels included in the display device according to a corresponding exemplary embodiment.

Referring to FIG. 37, one dot Dot1 (the left set of RGBW pixels) or a second Dot2 (the right set of RGBW pixels) of the display device according to the corresponding exemplary embodiment each includes three basic pixels expressing primary colors for expressing full colors plus a fourth white or clear pixel. For example, the three basic pixels may include a red pixel R displaying red, a green pixel G displaying green, and a blue pixel B displaying blue. In this case, the red pixel R, the green pixel G, and the blue pixel B may express the full colors. In addition, three basic pixels may include three primary colored pixels having different colors instead of the three primary colors of red, green, and blue, for example, a white pixel, a yellow pixel, a cyan pixel, or a magenta pixel.

One dot Dot1 or Dot2 may include at least one auxiliary pixel for improving color reproducibility or increasing luminance in addition to the three basic pixels. FIG. 37 illustrates an example in which one dot Dot1 or Dot2 includes a white pixel W for increasing the luminance. However, the auxiliary pixel is not limited to the white pixel W and may include pixels having various colors such as yellow Y and a mixed color of the primary colors for improving color reproducibility.

A layout of three basic pixels and at least one auxiliary pixel may be variously determined in one dot Dot1 or Dot2.

Referring to FIG. 37, the three basic color pixels and the one auxiliary color pixel may be disposed in the form of a square matrix in each of the first dot Dot1 and the second dot Dot2. When exemplifying the basic pixels of the red pixel R, the green pixel G and the blue pixel B and the auxiliary pixel of the white pixel W, the red pixel R and the white pixel W may be disposed to be adjacent to each other in a diagonal direction, and the green pixel G and the blue pixel B may be disposed to be adjacent to each other in a diagonal direction. Further, the red pixel R and the blue pixel B may be adjacent to each other in a column direction, and the green pixel G and the white pixel W may be adjacent to each other in a column direction. Further, the red pixel R and the green pixel G may be adjacent to each other in a row direction, and the blue pixel B and the white pixel W may be adjacent to each other in a row direction.

Further, layouts of the pixels in the adjacent dots Dot1 and Dot2 may be different from each other. Referring to FIG. 37, rows in the two adjacent dots Dot1 and Dot2 may be different from each other with respect to one colored pixel. For example, in the case where the red pixel R and the green pixel G are positioned above the blue pixel B and the white pixel W in one dot Dot1, the red pixel R and the green pixel G may be positioned below the blue pixel B and the white pixel W in the adjacent dot Dot2.

Each pixel R, G, B, or W includes an opening (light-passing aperture) capable of selectively transmitting light of its respective color (e.g., RGBW) to thereby display an image. The opening area (aperture area) of each of the pixels R, G, B, or W may be defined by a light blocking member which blocks the light. That is, the opening of the pixel R, G, B, or W may be defined as an area which is not covered by the light blocking member among a display area which displays the image in the display panel assembly 300.

According to an exemplary embodiment of the present invention, at least a part of a pixel PX displaying a predetermined color among a plurality of pixels PX (e.g., only the W pixels) includes a sub-optical pattern PN which may be recognized by a sub-optical pattern detecting device such as the electronic pen 50 described above, and the remaining pixels PX do not include respective optical patterns PN.

For example, in the case of the exemplary embodiment illustrated in FIG. 37, at least some of the plurality of auxiliary pixels W include respective ones of the sub-optical patterns PN which may be recognized by an optical device such as an electronic pen 50, and the remaining basic pixels R, G and B do not include the sub-optical patterns PN. Some of the auxiliary pixels W may not have the sub-optical patterns PN according to a position in the display panel assembly 300.

The sub-optical patterns PN may be recognized by the optical device by reflecting light emitted from the light source 52 of the optical device such as the electronic pen 50. Alternatively, the sub-optical pattern PN may be recognized by the optical device by absorbing some of the light emitted from the light source 52 and reflecting some of the emitted light, and absorbing the entire light.

The optical patterns PN may be mainly positioned within the opening of the auxiliary pixel W, but are not limited thereto, and may be positioned in a region where the light blocking member is positioned.

At least one of a position, a size, a shape and a bandpass characteristic of the optical pattern PN may be different from each other according to a position of the pixel PX. For example, the optical pattern PN may be a rod shape protruding from an edge side of each auxiliary pixel W and may be an island shape as illustrated in FIG. 37. Further, the optical pattern PN may have various shapes such as a polygon such as a rectangle, a circle, and an oval, and the size thereof may be variously set.

The optical pattern PN may be positioned on the same layer as the light blocking member and made with the same material as the light blocking member. However, it is not limited thereto, and the optical pattern PN may be made of a semiconductor material such as amorphous silicon or polysilicon or metal, or may be formed in a laminated structure thereof.

For example, the optical pattern PN may be positioned on the same layer with the same material as the signal lines such as the gate line GL and the data line DL, and may be positioned on the same layer with the same material as a semiconductor layer such as a thin film transistor. In addition, the optical pattern PN may be formed by a single layer made of a material having good reflectance or absorption for light having a wavelength band which may be sensed by the optical device such as the electronic pen 50, or may be formed of a multilayer made of at least two kinds or more of materials so as to have good reflectance or absorption for light having a wavelength band which may be sensed by the optical device such as the electronic pen 50.

The optical device such as the electronic pen 50 may recognize the optical pattern PN by sensing an image returned from the optical pattern PN in one or more predetermined wavelength bands. The optical pattern PN may reflect, absorb, or partially absorb and partially reflect light having a predetermined wavelength band which can be recognized by the optical device, and the optical device such as the electronic pen 50 may recognize the light reflected or absorbed by the optical pattern PN to thereby determine the image pattern of the optical pattern PN.

Particularly, the electronic pen 50 may determine a position or a coordinate of the touched dots Dot1 and Dot2 in the display panel assembly 300 through recognition of a combination of the optical patterns PN of two or more of predetermined number of adjacent dots Dot1 and Dot2 (referred to as a photographing unit) to sense location within the image. To this end, information on the optical patterns PN included in the dots Dot1 and Dot2 of the display panel assembly 300 may be pre-stored in a memory such as a lookup table LUT and be used when determining touch location and/or other touch-related information. In order to determine an accurate touch position, shapes of the combination of the optical patterns PN of the photographing unit acquired in various positions of the display panel assembly 300 or the predetermined region of the display panel assembly 300 may be different from each other.

By positioning the optical patterns PN only in one kind of pixel, say the auxiliary pixel W as is the case in the example of FIG. 37, and by not reducing aperture in one or more other specific colored ones of the pixels PX, for example, not in the basic color pixels R, G and B, it is possible to prevent substantial deterioration of display quality such as color purity or color non-uniformity which may occur by a difference in area between the openings of the basic color pixels R, G and B due to asymmetrical presence therein by the optical patterns PN. Further, it is possible to prevent a display defect, such as a moire phenomenon due to a change in an aperture ratio or transmittance of the basic pixels R, G and B generated when the optical patterns PN are positioned in the basic pixels R, G and B expressing the primary colors.

Next, a display device capable of acquiring touch information according to an exemplary embodiment will be described with reference to FIGS. 38 to 40 together with the drawings described above.

Figure 38:
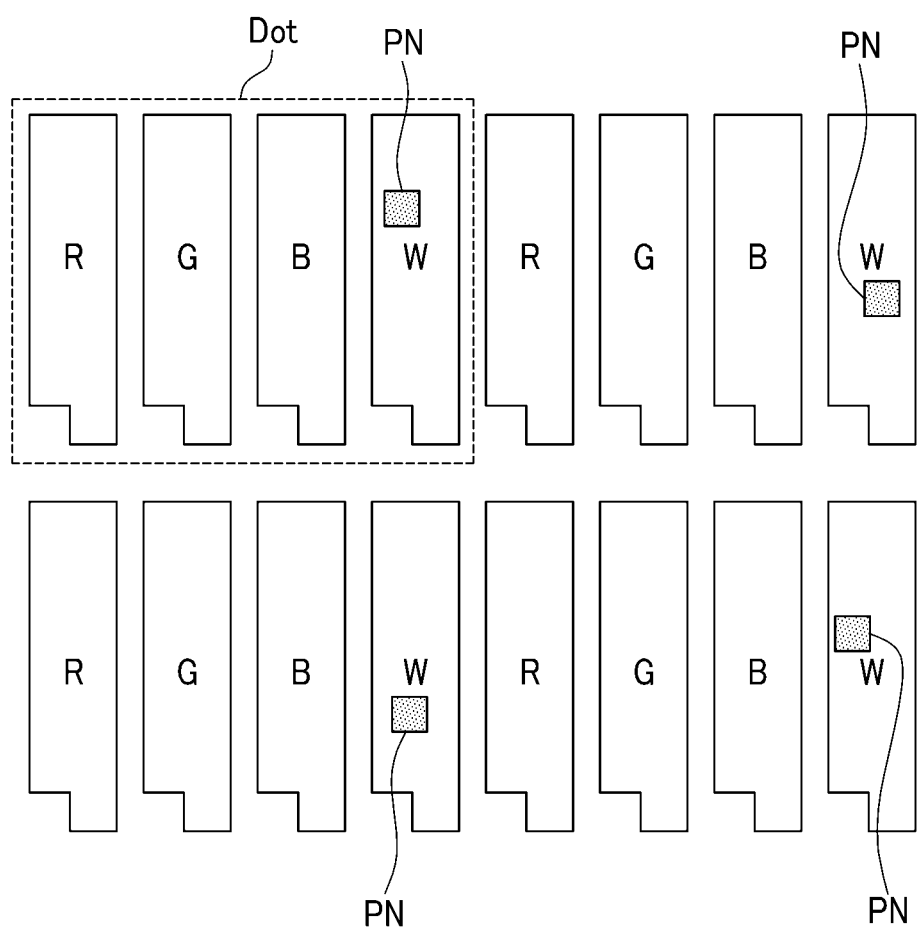
Figure 39:
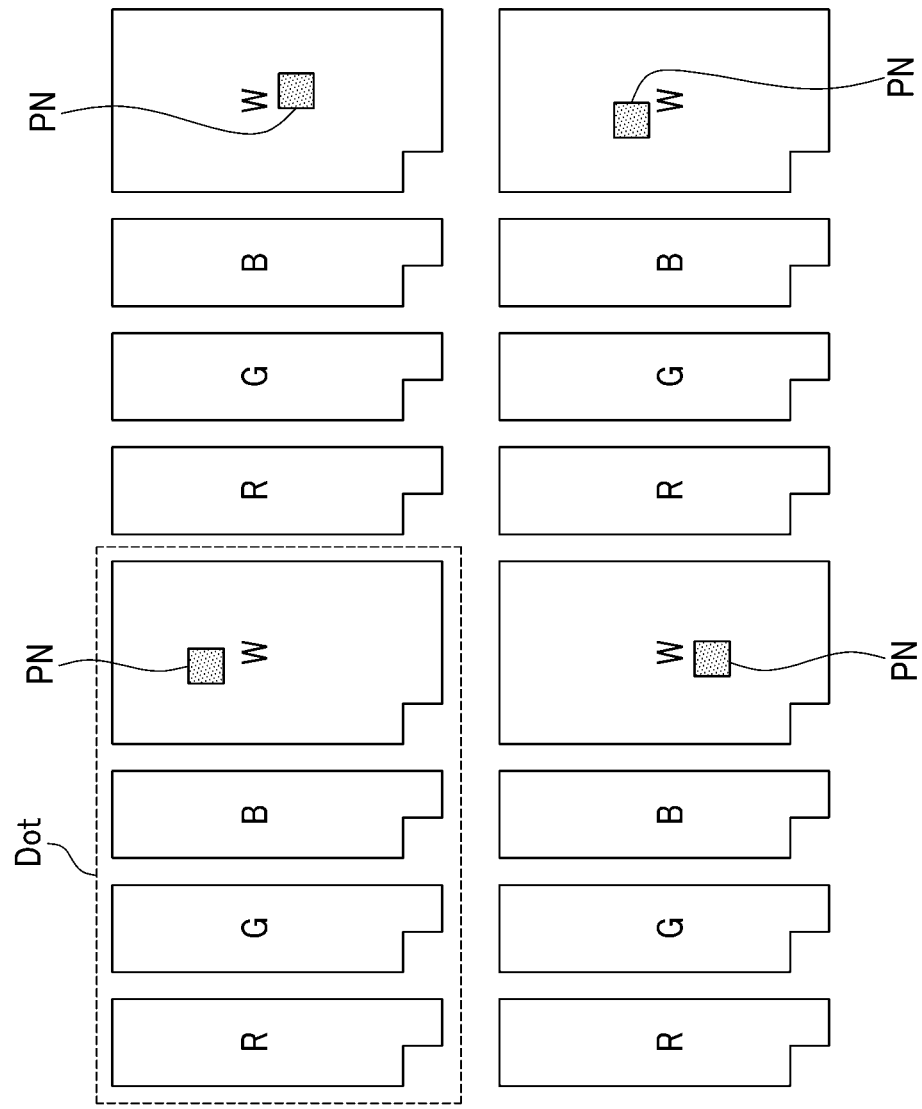
Figure 40:
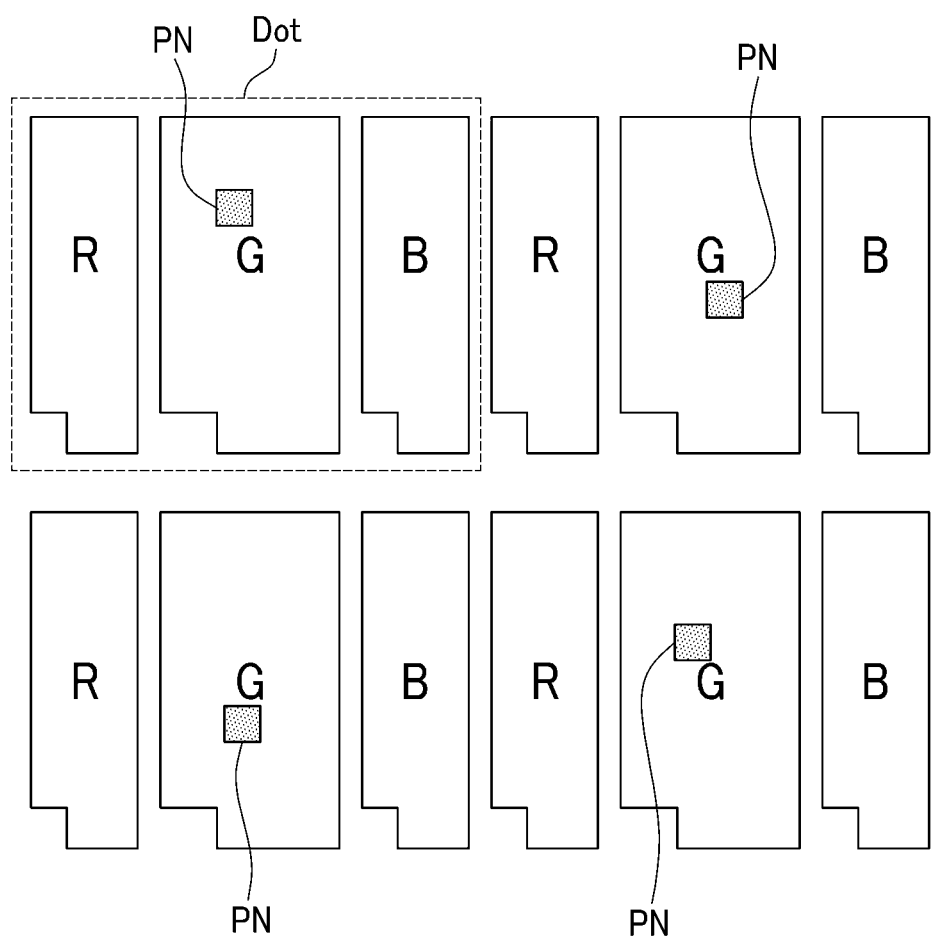

FIGS. 38 to 40 are layouts views of a plurality of pixels included in the display device according to corresponding exemplary embodiments.

The display device according to the next described exemplary embodiments are almost the same as the exemplary embodiment illustrated in FIG. 37 described above, but layouts, shapes, and kinds of pixels may be different from each other. Differences from the exemplary embodiments described above will be mainly described.

First, referring to FIG. 38, one dot Dot (the dash surrounded one) of the display device according to the exemplary embodiment of the present invention includes three basic color pixels expressing primary colors for expressing full colors, and as examples of the three basic pixels, a red pixel R, a green pixel G, and a blue pixel B are illustrated. The three basic pixels may include three primary colored pixels having different colors instead of three primary colors of red, green, and blue, for example, a yellow pixel, a cyan pixel, and a magenta pixel. Further, the one dot Dot includes at least one auxiliary color or luminance providing pixel in addition to the three basic pixels, and as an example of the auxiliary pixel, a white pixel W is illustrated. However, the auxiliary pixel is not limited to the white pixel W, and may include pixels having various colors such as yellow Y and a mixed color of the primary colors or a clear window for improving color reproducibility.

Three basic pixels and at least one auxiliary pixel may be disposed in a row as is shown in the one dot Dot of FIG. 38. For example, the basic pixels of the red pixel R, the green pixel G and the blue pixel B and the white pixel W may be sequentially disposed in a row direction. Further, at least one of sizes and shapes of the red pixel R, the green pixel G, the blue pixel B, and the white pixel W may be the same as each other.

The layout of the pixel in one dot Dot may be the same as each other for each dot, but is not limited thereto, and layout orders of the pixels of different dots Dot may be different from each other.

Even in the exemplary embodiment, the pixels PX having the predetermined color, for example, at least some of the plurality of auxiliary pixels W include the optical patterns PN which may be recognized outside by reflecting or absorbing the light emitted from the light source 52 of the electronic pen 50, and the remaining basic pixels R, G and B may not include the optical patterns PN. Some of the auxiliary pixels W may not have the optical patterns PN according to a position in the display panel assembly 300. At least one of positions, sizes, and shapes of the optical patterns PN positioned at different auxiliary pixels W may be the same as each other and may be different from each other.

Next, referring to FIG. 39, the display device according to the corresponding exemplary embodiment is almost the same as the display device according to the exemplary embodiment illustrated in FIG. 38 described above, except that an area of the auxiliary pixels W may be different from (greater than) an area of one or more of the basic pixels R, G and B. In more detail, the area of the auxiliary pixel W may be larger than all the respective areas of each of the basic pixels R, G and B. In the case where the area of the auxiliary pixel W is larger than the area of each of the basic pixels R, G and B, decrease of the opening for letting through white light due to presence of the optical pattern PN may be offset by the expanded area of the auxiliary pixel W, thereby decreasing the luminance reduction that results from including the sub-optical patterns.

Next, referring to FIG. 40, one dot Dot of the display device according to the exemplary embodiment includes three basic pixels expressing primary colors for expressing full colors, and as examples of the three basic pixels, a red pixel R, a green pixel G, and a blue pixel B are illustrated. The three basic pixels may include three primary colored pixels having different colors instead of three primary colors of red, green, and blue, for example, a yellow pixel, a cyan pixel, and a magenta pixel.

Three basic pixels may be disposed in a line in one dot Dot. For example, the basic pixels of the red pixel R, the green pixel G and the blue pixel B may be sequentially disposed in a row direction.

The layout of the pixels in one dot Dot may be the same as each other for each dot, but is not limited thereto, and layout orders of the pixels of different dots Dot may be different from each other.

According to the exemplary embodiment, an area of any one, but preferably the Green one of the red pixel R, the green pixel G, and the blue pixel B may be larger in area from the areas of the remaining pixels. In more detail, the area of any one of the three basic pixels may be larger than areas of the remaining pixels. For example, as illustrated in FIG. 40, the area of the green pixel G may be larger than areas of the remaining basic pixels, that is, areas of the red pixel R and the blue pixel B. (Green is chosen here because it is generally perceived by the human eye as being brightest while Blue is generally perceived by the human eye as being darkest. Thus perception of Green will be least affected by slightly reducing its aperture with inclusion of an sub-optical pattern therein.)

In the illustrated case, a basic pixel having an area larger than other pixels includes the optical pattern PN which may be recognized outside by reflecting or absorbing the light emitted from the light source 52 of the electronic pen 50, and the remaining basic pixels may not include the optical patterns PN. Some of the basic pixels having relatively large areas may not have the optical patterns PN according to a position in the display panel assembly 300. At least one of positions, sizes, and shapes of the optical patterns PN may be the same as each other or may be different from each other according to a position of the basic pixel.

As such, when the optical pattern PN is positioned in the basic pixel having relatively large area, decrease in the aperture ratio and decrease in the transmittance due to the optical pattern PN may be offset by the expanded area of that colored pixel (e.g., Green). Accordingly, since there is substantially no difference in aperture ratio or transmittance between the basic pixel with the optical pattern PN and the basic pixel without the optical pattern PN, it is possible to prevent display quality such as modification of a color coordinate or color non-uniformity from deteriorating.

According to the exemplary embodiment, the optical patterns PN are positioned only in at least a part of the pixel PX displaying a predetermined color among the plurality of pixels PX included in the display panel assembly 300, thereby preventing display quality such as modification of a color coordinate or color non-uniformity from deteriorating and preventing a display defect such as a moire phenomenon. The pixel PX having the predetermined color where the optical pattern PN is positioned may be an auxiliary pixel like the exemplary embodiments described above, and may be a specific basic pixel having a different area from other pixels PX.

Next, a detailed structure of a display device according to an exemplary embodiment will be described with reference to FIGS. 41 to 44 together with the drawings described above.

Figure 41:
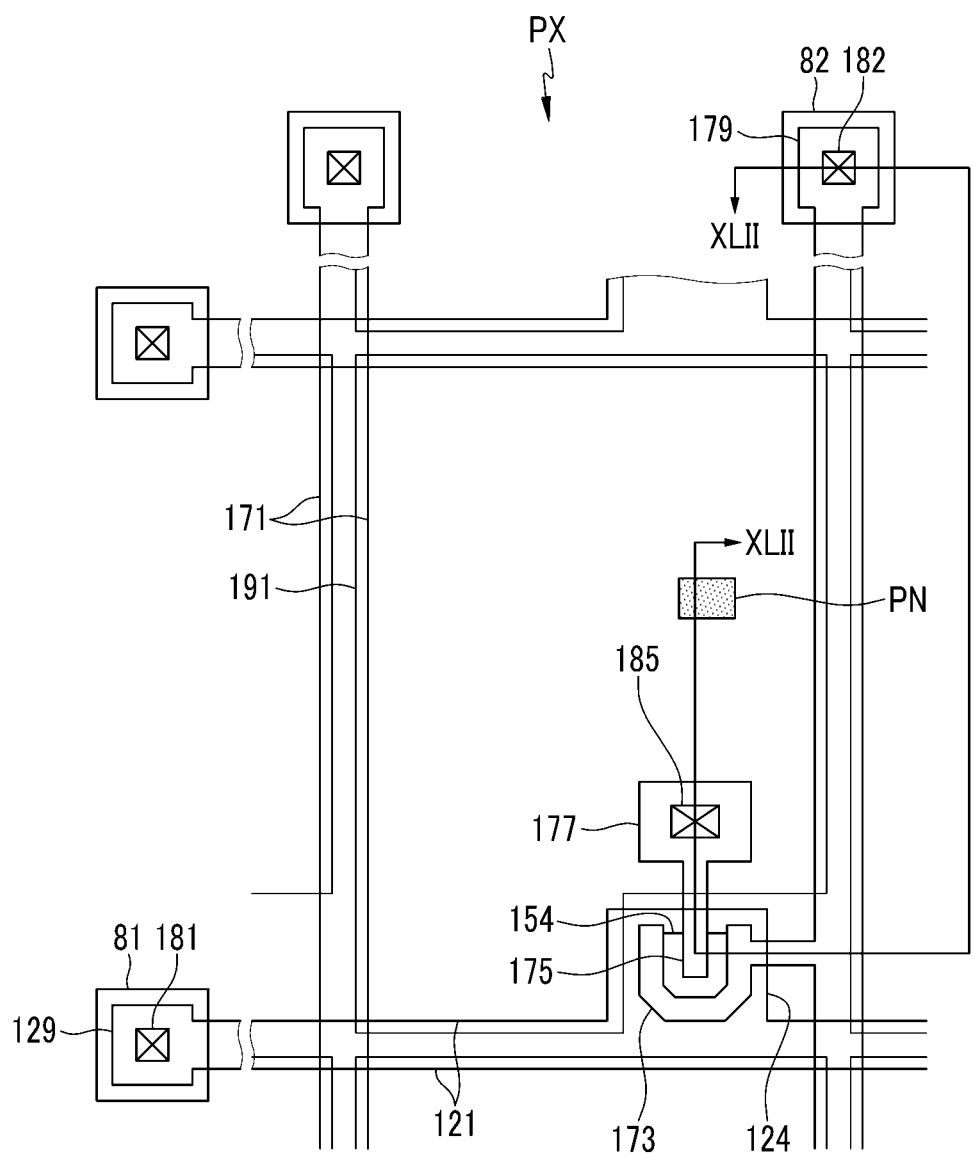
FIG. 41 is a layout view of one pixel of a display device according to an exemplary embodiment.
Figure 42:
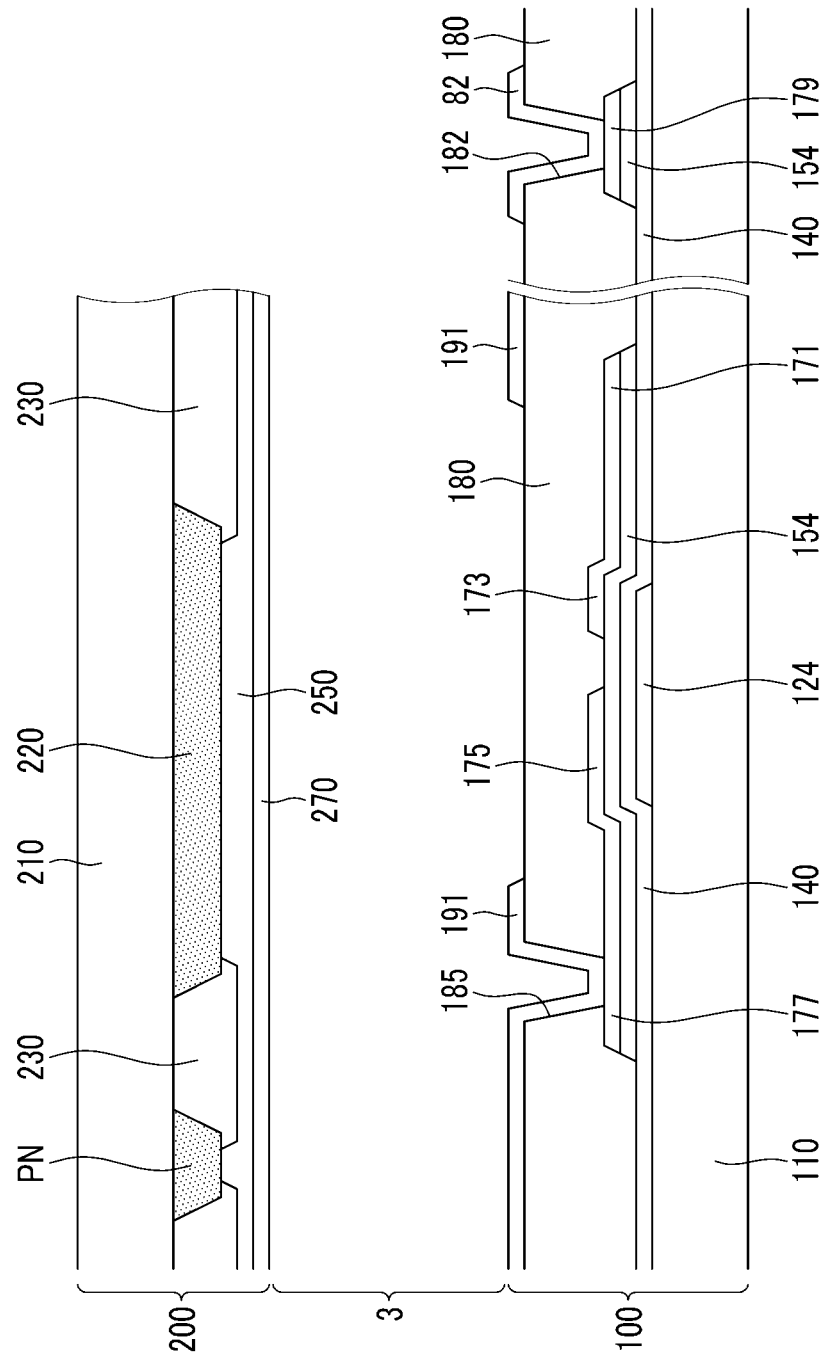
FIGS. 42 to 44 are cross-sectional views illustrating the display device of FIG. 41 taken along line XLII-XLII, respectively.
Figure 43:
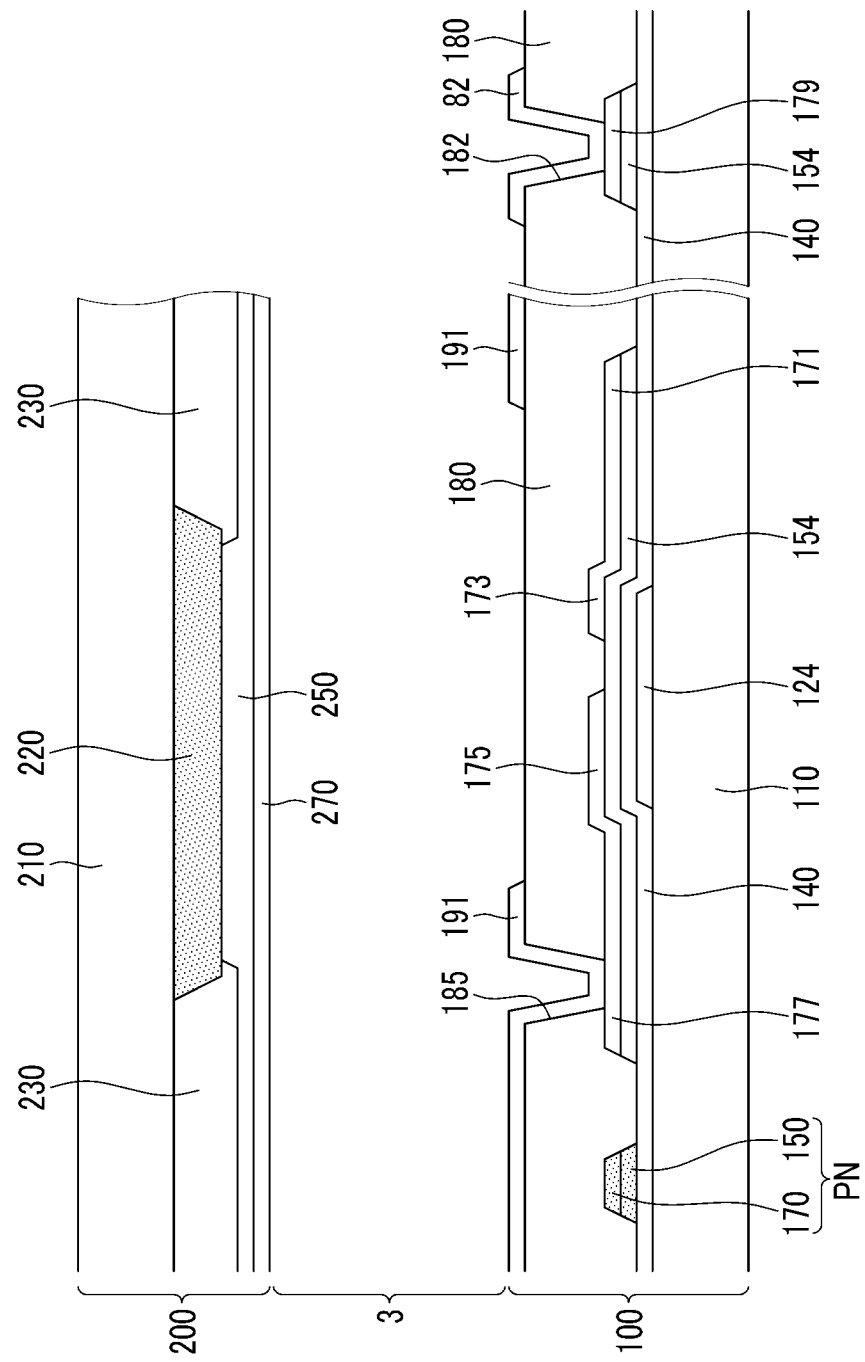
Figure 44:
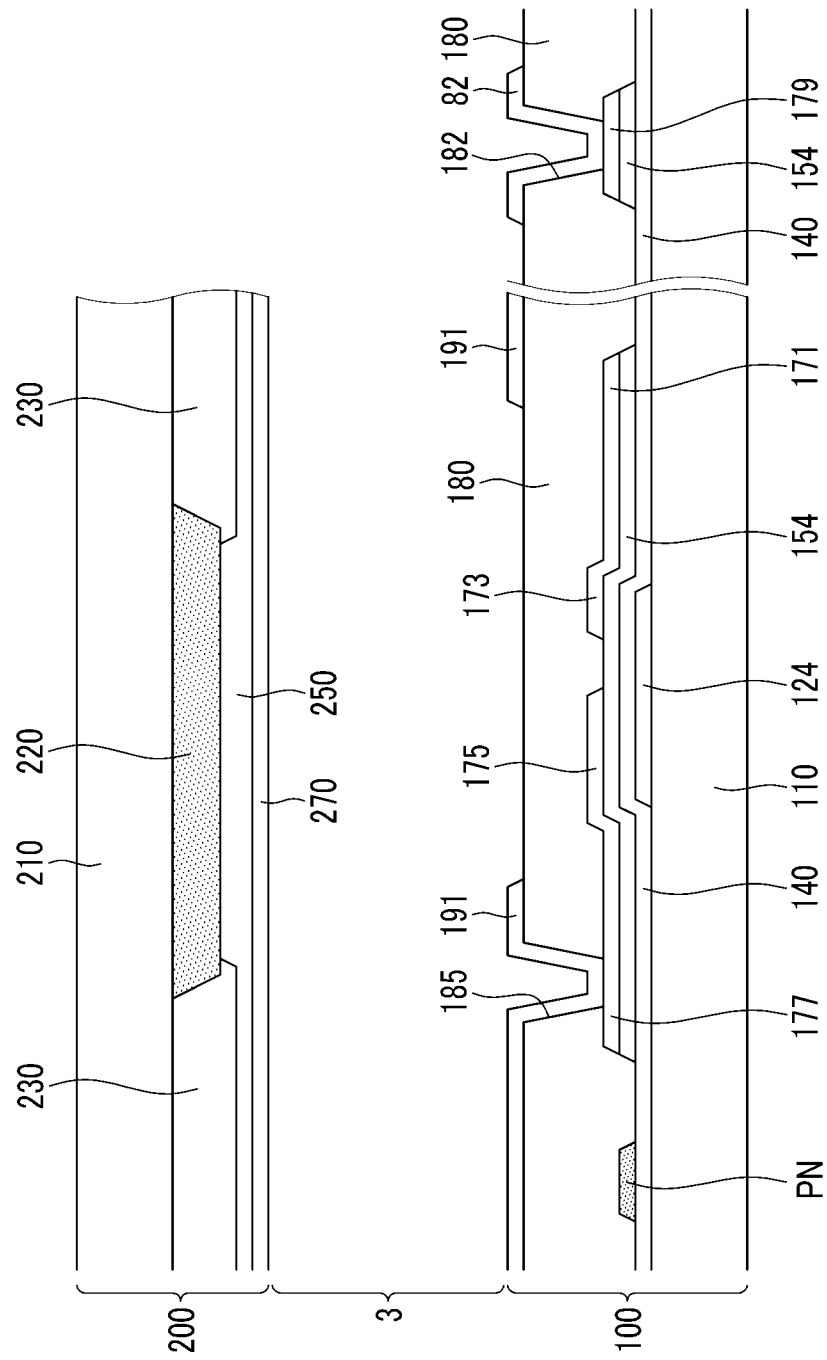

FIG. 41 is a layout view of one pixel of a display device according to the corresponding exemplary embodiment. FIGS. 42 to 44 are respective cross-sectional views illustrating the display device of FIG. 41 taken along line XLII-XLII, but for slight different and respective embodiments.

A display device according to the exemplary embodiment, as a liquid crystal display, includes a lower panel 100 and an upper panel 200 facing each other, and a liquid crystal layer 3 interposed between the panels 100 and 200.

First, when describing the lower panel 100, a gate line 121 is positioned on an insulation substrate 110 made of glass, plastic, or the like.

The gate line 121 transfers a gate signal, may extend substantially in a row direction, and may include a plurality of gate electrodes 124. Further, the gate line 121 includes a wide end portion 129 for connection with another layer or an external driving circuit. However, the end portion 129 of the gate electrode may be omitted.

The gate line 121 may be made of aluminum based metal such as aluminum or an aluminum alloy, silver based metal such as silver or a silver alloy, copper based metal such as copper or a copper alloy such as manganese-copper, molybdenum based metal such as molybdenum or a molybdenum alloy, chromium, tantalum, and titanium. Further, the gate line 121 may be made of a transparent conductive material such as ITO, IZO, or AZO. The gate line 121 may have a multilayered structure including two or more conductive layers (not illustrated) one for example having lower resistivity than the other.

A gate insulating layer 140 is positioned on the gate line 121. The gate insulating layer 140 may include a silicon nitride, a silicon oxide, SiON, an organic insulating material, and the like.

A semiconductor 154 including amorphous or polycrystalline silicon, a semiconductive oxide, or the like is positioned on the gate insulating layer 140.

A data line 171 and a drain electrode 175 are positioned on the semiconductor 154.

The data line 171 transfers a data voltage and mainly extends substantially in a column direction to cross the gate lines 121. The data line 171 includes a wide end portion 179 for connection with another layer or an external driving circuit and may include a source electrode 173 extending above the gate electrode 124.

The drain electrode 175 is separated from the data line 171 and may include a rod-shaped end portion surrounded by the source electrode 173 and an expansion 177 of the other end portion.

The data line 171 and the drain electrodes 175 and 177 may be made of aluminum based metal such as aluminum or an aluminum alloy, silver based metal such as silver or a silver alloy, copper based metal such as copper or a copper alloy such as manganese-copper, molybdenum based metal such as molybdenum or a molybdenum alloy, chromium, tantalum, and titanium. For example, the molybdenum alloy includes Mo—Nb and Mo—Ti. Further, the data line 171 and the drain electrodes 175 and 177 may be made of a transparent conductive material such as ITO, IZO, or AZO. The data line 171 and the drain electrodes 175 and 177 may have a multilayered structure including two or more conductive layers (not illustrated).

The gate electrode 124, the source electrode 173, and the drain electrode 175 form a thin film transistor together with the semiconductor 154, and a channel of the thin film transistor is positioned in the semiconductor 154 between the source electrode 173 and the drain electrode 175.

A passivation layer 180 made of an inorganic or an organic insulating material is positioned on the data line 171 and the drain electrode 175. The passivation layer 180 may be formed as a multilayer. The passivation layer 180 may include a contact hole 185 exposing the drain electrode 175, and a contact hole 182 exposing the end portion 179 of the data line. Further, the passivation layer 180 and the gate insulating layer 140 may include a contact hole 181 exposing the end portion 129 of the data line 121.

A pixel electrode 191 and contact assistants 81 and 82 may be positioned on the passivation layer 180. The pixel electrode 191 and the contact assistants 81 and 82 may be made of a transparent conductive material including ITO or IZO. The pixel electrode 191 may be electrically connected with the drain electrode 175 through the contact hole 185 to receive the data voltage. The contact assistant 81 is positioned on the end portion 129 of the gate line and connected with the end portion 129 of the gate line through the contact hole 181. The contact assistant 82 is positioned on the end portion 179 of the data line and connected with the end portion 179 of the data line through the contact hole 182.

Next, when describing the upper panel 200, a patterned light blocking member 220 and a color filter 230 are positioned on an insulation substrate 210. The light blocking member 220 is called a black matrix (BM) and prevents light leakage. The color filter 230 may be positioned between the adjacent data lines 171 in a band form. The color filter 230 may include a pigment expressing a color, a photosensitive organic material, and the like.

An overcoat 250 may be positioned on the light blocking member 220 and the color filter 230, and an opposing electrode 270 may be positioned thereon. The opposing electrode 270 may include transparent conductive oxide such as ITO or IZO.

According to another exemplary embodiment, at least one of the light blocking member 220, the color filter 230, and the opposing electrode 270 may be positioned on the lower panel 100.

The liquid crystal layer 3 may have dielectric anisotropy. The liquid crystal molecules 31 of the liquid crystal layer 3 may be aligned so that long axes thereof are substantially horizontal or vertical to surfaces of the lower panel 100 and the upper panel 200 while the electric field is not applied.

The pixel electrode 191 which receives the data voltage from the drain electrode 175 generates an electric field in the liquid crystal layer 3 together with the opposing electrode 270 of the upper panel 200 to determine directions of the liquid crystal molecules of the liquid crystal layer 3 between the pixel electrode 191 and the opposing electrode 270. As such, luminance of light passing through the liquid crystal layer 3 varies depending on the determined directions of the liquid crystal molecules.

Referring to FIG. 41, one pixel PX of the display device according to the exemplary embodiment may include a sub-optical pattern PN. The pixel PX including the sub-optical pattern PN may be the auxiliary pixel like the exemplary embodiments described above, and may be a basic pixel having a relatively larger area in the case where there is no auxiliary pixel. The optical pattern PN may be mainly positioned within the opening of the pixel PX, but is not limited thereto, and may be positioned in a region where the light blocking member is positioned.

Referring to FIG. 42, the optical pattern PN may include the same material as the light blocking member 220. Further, the optical pattern PN may be positioned on the same layer as the light blocking member 220.

Referring to the slightly different embodiment of FIG. 43, the optical pattern PN may include the same material as that of the data line 171 and the semiconductor 154. Further, the optical pattern PN may be positioned on the same layer as the data line 171 and the semiconductor 154. In this case, the optical pattern PN may have a multilayered structure including a conductive material layer 170 such as metal and a semiconductor material layer 150.

However, referring to the slightly different embodiment of FIG. 44, the optical pattern PN may include the same material as any one of the signal lines for example data line 171 or the gate line 124. Further, the optical pattern PN may be positioned on the same layer as any one of the data line 171 or the semiconductor 154 or the gate line 124.

However, the layer where the optical pattern PN is positioned or the material included in the optical pattern PN is not limited thereto, and as described above, the optical pattern PN may be positioned on various layers as various laminated structures with various materials having good reflectance or absorption for light having a wavelength band where the optical device such as the electronic pen 50 may sense.

Next, a display device according to a corresponding exemplary embodiment (e.g., on OLED embodiment) will be described with reference to FIG. 45 together with the drawings described above. The same constituent elements as the exemplary embodiments described above designate the same reference numerals, and the duplicated description is omitted.

Figure 45:
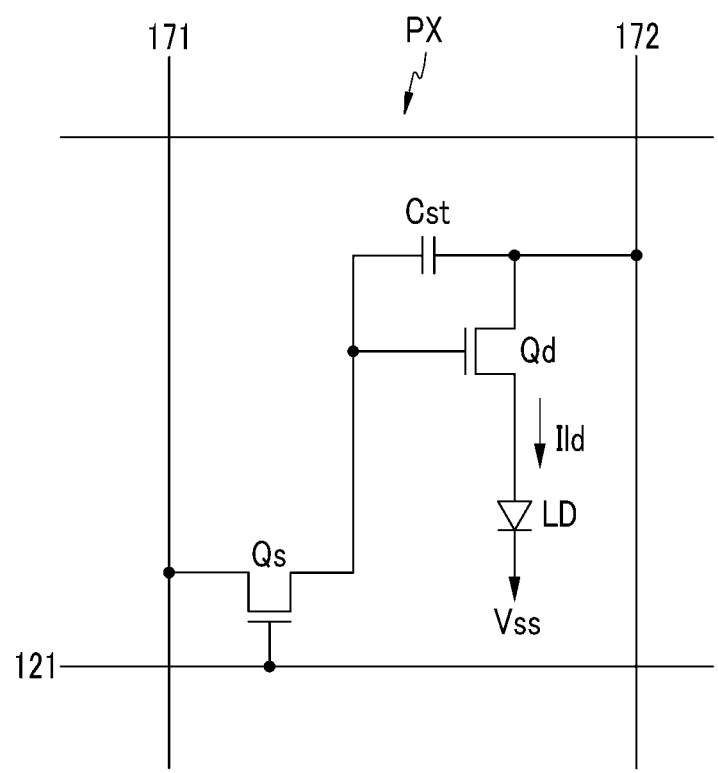
FIG. 45 is an equivalent circuit diagram of one pixel of a display device according to an exemplary embodiment.

FIG. 45 is an equivalent circuit diagram of one pixel of a display device according to an exemplary embodiment of the present invention.

The display device according to the exemplary embodiment, as an organic light emitting display (OLED), includes a plurality of signal lines and a plurality of pixels PX connected to the signal lines and arranged in a substantially matrix form.

The signal lines include a plurality of gate lines 121, a plurality of data lines 171, and a plurality of driving voltage lines 172 transferring driving voltages.

Each pixel PX includes a switching transistor Qs, a driving transistor Qd, a storage capacitor Cst, and an organic light emitting element LD.

The switching transistor Qs has a control terminal, an input terminal, and an output terminal, and the control terminal is connected to the gate line 121, the input terminal is connected to the data line 171, and the output terminal is connected to the driving transistor Qd. The switching transistor Qs transfers a data signal received from the data line 171 to the driving transistor Qd in response to a scanning signal received from the gate line 121.

The driving transistor Qd also has a control terminal, an input terminal, and an output terminal, and the control terminal is connected to the switching transistor Qs, the input terminal is connected to the driving voltage line 172, and the output terminal is connected to the organic light emitting element LD. The driving transistor Qd allows an output current Ild of which a size varies according to a voltage applied between the control terminal and the output terminal to flow.

The capacitor Cst is connected between the control terminal and the input terminal of the driving transistor Qd. The capacitor Cst charges a data signal applied to the control terminal of the driving transistor Qd and maintains the charged data signal even after the switching transistor Qs is turned off.

The organic light emitting element LD, for example, as an organic light emitting diode (OLED), has an anode connected to the output terminal of the driving transistor Qd and a cathode connected to a common voltage Vss. The organic light emitting element LD emits light with different intensities according to the output current Ild of the driving transistor Qd to display an image.

The organic light emitting element LD may include an organic material which uniquely emits any one or one or more light of primary colors such as three primary colors of red, green, and blue, or include an organic material which emits various colors such as white or yellow for improving color reproducibility. The organic light emitting display may display a desired image in a spatial combination of the colors. Each pixel PX may be classified into a basic pixel or an auxiliary pixel like the exemplary embodiments described above according to a color of light emitted by the organic light emitting element LD.

Then, a detailed structure of the organic light emitting display illustrated in FIG. 45 will be described with reference to FIGS. 46 to 50.

Figure 46:
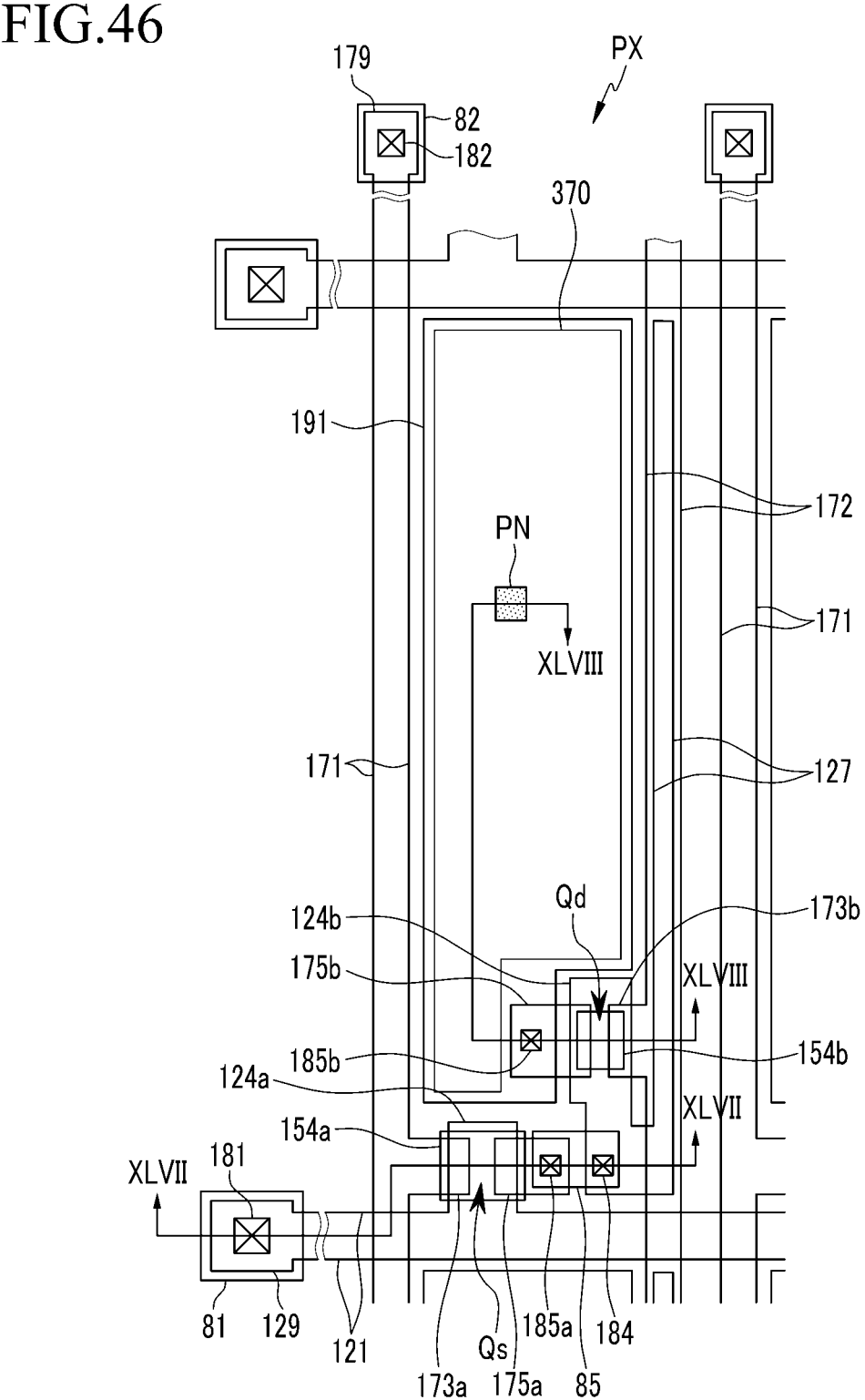
FIG. 46 is a layout view of one pixel of the display device according to the exemplary embodiment.
Figure 47:
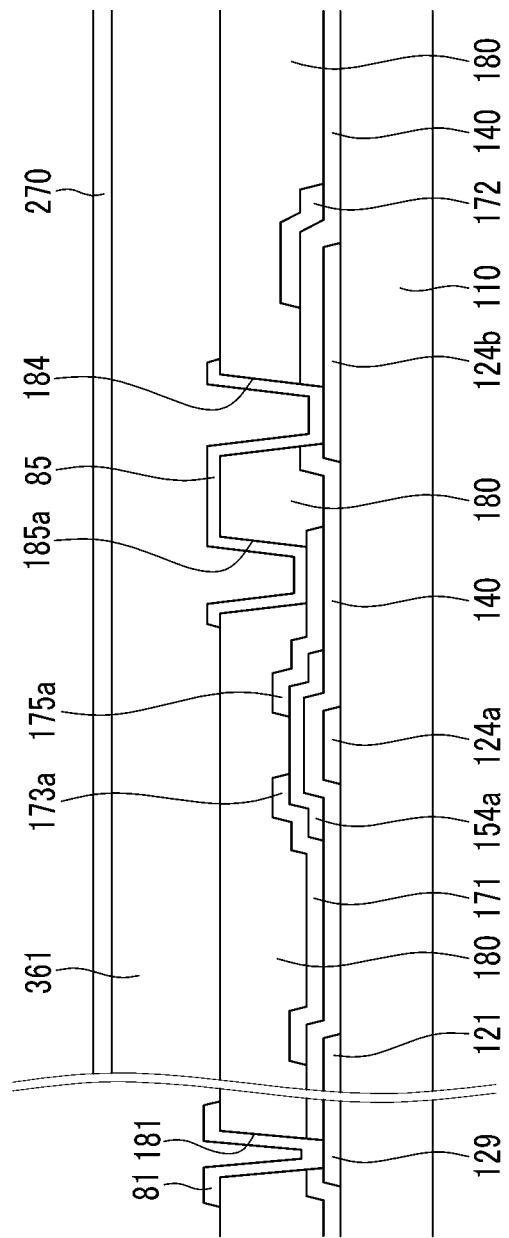
FIG. 47 is a cross-sectional view of the display device of FIG. 46 taken along line XLVII-XLVII.
Figure 48:
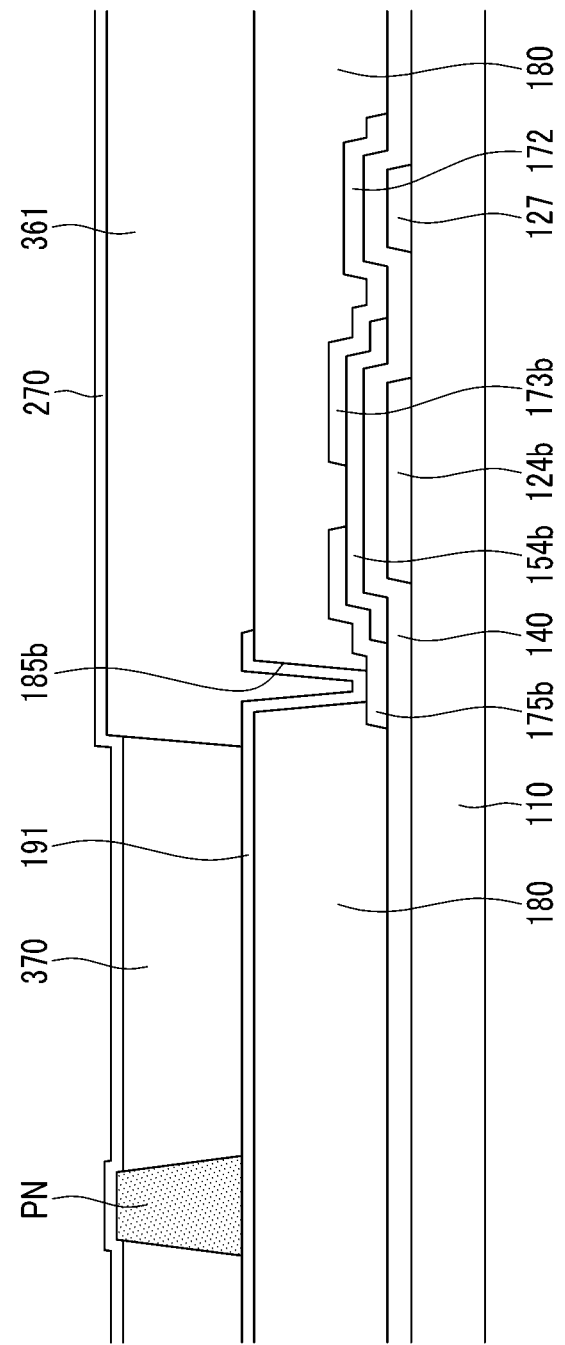
FIGS. 48 to 50 are cross-sectional views illustrating the display device of FIG. 46 taken along line XLVIII-XLVIII, respectively.
Figure 49:
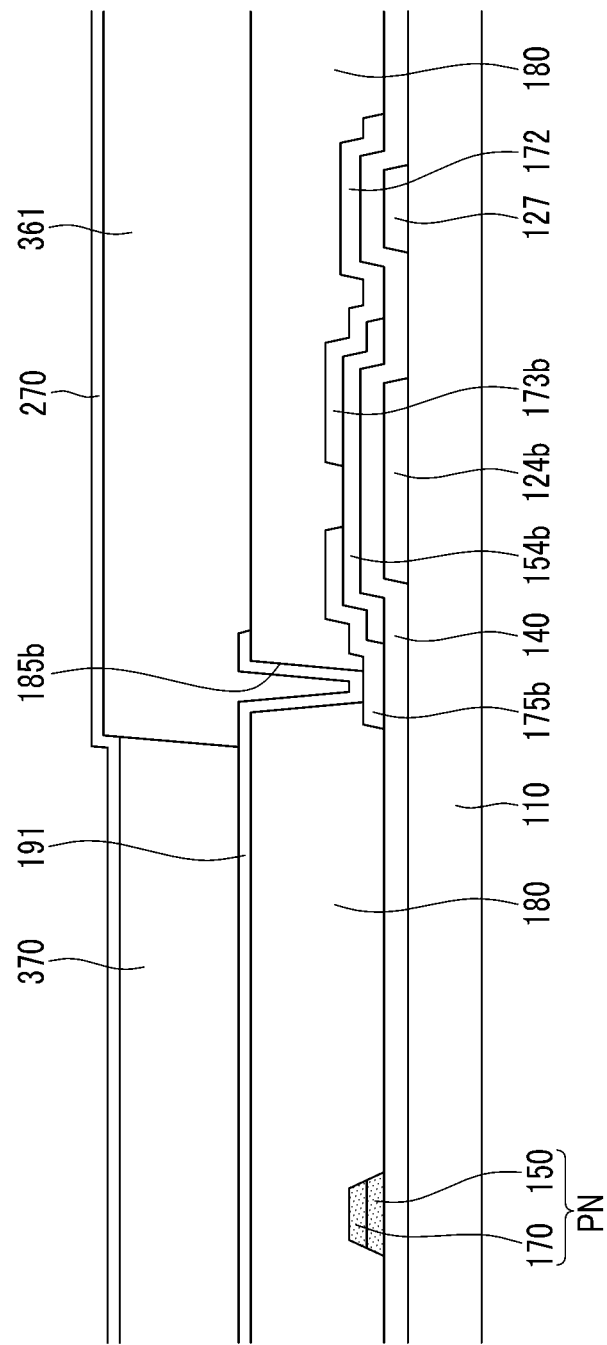
Figure 50:
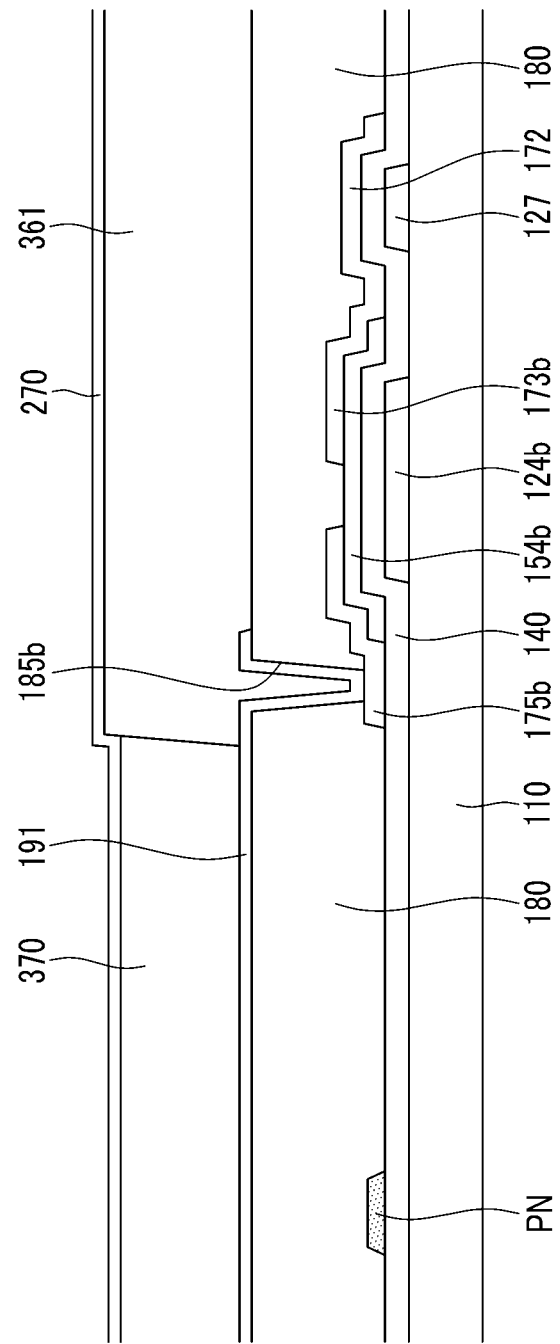

FIG. 46 is a layout view of one pixel of a display device according to an exemplary embodiment of the present invention, FIG. 47 is a cross-sectional view of the display device of FIG. 46 taken along line XLVII-XLVII, and FIGS. 48 to 50 are cross-sectional views illustrating the display device of FIG. 46 taken along line XLVIII-XLVIII, respectively.

A plurality of gate conductors including a plurality of gate lines 121 including a first control electrode 124a and a plurality of second control electrodes 124b including a storage electrode 127 is formed on an insulation substrate 110.

The gate line 121 includes an end portion 129, and the first control electrode 124a extends upward from the gate line 121.

The second control electrode 124b includes the storage electrode 127 which is separated from the gate line 121 and elongates in a vertical direction.

A gate insulating layer 140 is positioned on the gate conductor.

A plurality of switching semiconductors 154a and a plurality of driving semiconductors 154b are formed on the gate insulating layer 140. The switching semiconductor 154a is overlapped with the first control electrode 124a, and the driving semiconductor 154b is positioned on the second control electrode 124b.

A plurality of data conductors including a plurality of data lines 171, a plurality of driving voltage lines 172, and a plurality of first and second output electrodes 175a and 175b is positioned on the switching semiconductor 154a and the driving semiconductor 154b.

The data line 171 includes a plurality of first input electrodes 173a which extends toward the first control electrode 124a and an end portion 179.

The driving voltage line 172 includes a plurality of second input electrodes 173b which extends toward the second control electrode 124b, and may include a portion overlapped with the storage electrode 127.

The first and second output electrodes 175a and 175b are separated from each other to have island shapes and may be separated from the data line 171 and the driving voltage line 172. The first input electrode 173a and the first output electrode 175a face each other on the switching semiconductor 154a, and the second input electrode 173b and the second output electrode 175b face each other on the driving semiconductor 154b.

The first control electrode 124a, the first input electrode 173a, and the first output electrode 175a form the switching transistor Qs together with the switching semiconductor 154a, and a channel of the switching transistor Qs is formed in the switching semiconductor 154a between the first input electrode 173a and the first output electrode 175a. The second control electrode 124b, the second input electrode 173b, and the second output electrode 175b form the driving transistor Qd together with the driving semiconductor 154b, and a channel of the driving transistor Qd is formed in the driving semiconductor 154b between the second input electrode 173b and the second output electrode 175b.

A passivation layer 180 is positioned on the gate insulating layer 140, the data conductor, and the exposed portion of the semiconductors 154a and 154b.

The passivation layer 180 may include a contact hole 182 exposing the end portion 179 of the data line 171, a contact hole 185a exposing the first output electrode 175a, and a contact hole 185b exposing the second output electrode 175b. A contact hole 184 exposing the second control electrode 124b and a contact hole 181 exposing the end portion 129 of the data line 121 may be formed in the passivation layer 180 and the gate insulating layer 140.

A plurality of pixel electrodes 191, a plurality of connecting members 85, and a plurality of contact assistants 81 and 82 are positioned on the passivation layer 180. The pixel electrode 191 is physically and electrically connected with the second output electrode 175b through the contact hole 185. The connecting member 85 connects the first output electrode 175a and the second control electrode 124b through the contact hole 185a and the contact hole 184. The contact assistants 81 and 82 are connected with the end portion 129 of the gate line 121 and the end portion 179 of the data line 171 through the contact holes 181 and 182, respectively.

A partition 361 is positioned on the passivation layer 180. The partition 361 is defined as an opening by surrounding an edge periphery of the pixel electrode 191 like a bank and may be made of an organic insulator or an inorganic insulator. The partition 361 may also be made of a photoresist including a black pigment.

An organic light emitting member 370 is positioned in the opening on the pixel electrode 191 defined by the partition 361. The organic light emitting member 370 of the basic pixel may be made of an organic material which uniquely emits any one light of primary colors such as three primary colors of red, green, and blue, and the organic light emitting member 370 of the auxiliary pixel may emit an auxiliary color such as white and yellow for reinforcing luminance or improving color reproducibility.

An opposing electrode 270 is positioned on the organic light emitting member 370. The opposing electrode 270 receives the common voltage Vss and may be made of reflective metal including calcium (Ca), barium (Ba), magnesium (Mg), aluminum, silver, and the like, or a transparent conductive material such as ITO or IZO.

According to another exemplary embodiment, the organic light emitting members 370 of all the pixels PX may be white organic light emitting members emitting a white light. In this case, each basic pixel may include a color filter which uniquely emits any one light of primary colors such as three primary colors of red, green and blue. Further, in the case of including the auxiliary pixel, the auxiliary pixel may include a color filter displaying the corresponding auxiliary color.

Referring to FIG. 46, one pixel PX of the display device according to the exemplary embodiment of the present invention may include a sub-optical pattern PN. The pixel PX including the sub-optical pattern PN may be the auxiliary pixel like the exemplary embodiments described above, and may be a basic pixel having a relatively large area in the case where there is no auxiliary pixel. The optical pattern PN may be mainly positioned within the opening of the pixel PX, but is not limited thereto, and may be positioned in a region where the light blocking member is positioned.

Referring to FIG. 48, the sub-optical pattern PN may include the same material as the partition 361. Further, the optical pattern PN may be positioned in the same layer as that of the partition 361.

Referring to FIG. 49, the sub-optical pattern PN may include the same material as the data line 171 and the driving semiconductor 154b or the switching semiconductor 154a. Further, the optical pattern PN may be positioned on the same layer as the data line 171 and the driving semiconductor 154b or the switching semiconductor 154a. In this case, the optical pattern PN may have a multilayered structure including a conductive material layer 170 such as metal and a semiconductor material layer 150.

However, referring to FIG. 50, the optical pattern PN may include the same material as any one of the data line 171 and the driving semiconductor 154b or the switching semiconductor 154a. Further, the optical pattern PN may be positioned on the same layer as any one of the data line 171 and the driving semiconductor 154b or the switching semiconductor 154a.

However, the layer where the optical pattern PN is positioned or the material included in the optical pattern PN is not limited thereto, and as described above, the optical pattern PN may be positioned on various layers as various laminated structures with various materials having good reflectance or absorption for light having a wavelength band where the optical device such as the electronic pen 50 may sense.

In addition, the optical pattern PN according to the exemplary embodiments of the present disclosure of invention may be equally applied to various other display devices such as various transmissive display devices and flexible display devices.

While this disclosure of invention has been described in connection with what are presently considered to be practical exemplary embodiments, it is to be understood that the teachings are not limited to the disclosed embodiments, but, on the contrary, are intended to cover various modifications and equivalent arrangements included within the spirit and scope of the present teachings.

What is claimed is:

1. A display device comprising a plurality of pixels, a pixel of the plurality of pixels including a plurality of domains, the plurality of domains of the pixel having different aligning directions of liquid crystal molecules from each other,
    wherein at least three pixels each comprises a plurality of sub-optical patterns which are respectively disposed in the plurality of domains of the respective three pixels,
    all of the plurality of sub-optical patterns included in one pixel forms together an optical pattern of the pixel, and
    the at least three pixels have optical patterns having different shapes from one another.

2. The display device of claim 1, wherein: the plurality of sub-optical patterns included in a pixel have about the same size as each other so that display characteristics in different viewing angles be substantially the same as each other for different domains of the pixel.

3. The display device of claim 2, further comprising: a light blocking member that blocks light and defines openings of the domains of a pixel, wherein the openings of the domains included in a pixel have substantially the same area as each other.

4. The display device of claim 1, wherein: at least one of the plurality of sub-optical patterns included in the one pixel includes a portion positioned within the opening of the one pixel.

5. The display device of claim 4, wherein: the optical pattern included in one pixel of the plurality of pixels is selected from an optical pattern set including two or more different optical patterns.

6. The display device of claim 5, wherein: images of the plurality of optical patterns respectively included in respective pixels of a photographing unit comprising two or more adjacent pixels are different from each other according to a position.

7. The display device of claim 6, wherein: the plurality of pixels include a plurality of first color pixels displaying a first color, a plurality of second color pixels displaying a second color different from the first color, the first color pixel includes an optical pattern selected from a first optical pattern set including one or more optical patterns, and the second color pixel includes an optical pattern selected from a second optical pattern set including one or more optical patterns and provided separately from the first optical pattern set.

8. The display device of claim 7, wherein: the domains each includes an opening where light is transmitted, and the openings of the domains included in a pixel have substantially the same area as each other.

9. The display device of claim 7, wherein: the plurality of sub optical patterns included in the one pixel includes at least one of a same material as the light blocking member, a semiconductive material, and a metal.

10. The display device of claim 9, wherein: at least one of the sub optical pattern has an island shape which is separated from the light blocking member.

11. The display device of claim 10, wherein: the sub optical patterns positioned in a pair of adjacent domains among the plurality of domains of the one pixel are connected to each other.

12. The display device of claim 9, wherein: the one pixel includes a first subpixel and a second subpixel according to different gamma curves from each other, and the plurality of sub optical patterns is disposed in at least one of the first subpixel and the second subpixel.

13. The display device of claim 7, wherein:
    a light blocking member that blocks light and defines openings of the domains of a pixel is further comprised, and
    the sub optical pattern protrudes from an edge portion of the light blocking member inwardly into the opening of the domain.

14. The display device of claim 13, wherein: the sub optical patterns positioned in a pair of adjacent domains among the plurality of domains of the one pixel are connected to each other.

15. The display device of claim 13, wherein: the sub optical pattern extends in parallel to an inner edge of a bulk opening of the light blocking member.

16. The display device of claim 15, wherein: the inner edge of the light blocking member is bent at least once.

17. A display device comprising a plurality of pixels displaying different colors from each other,
    wherein a plurality of first pixels among the plurality of pixels display a first color,
    at least two of the first pixels each includes an optical pattern,
    a second pixel displaying a different color from the first pixel do not include the optical pattern, and
    the optical patterns of the at least two of the first pixels have different shapes or positions from each other.

18. The display device of claim 17, wherein: the plurality of pixels includes a plurality of basic color pixels for expressing full colors and at least one auxiliary pixel for assisting display, and the plurality of first pixels include at least one auxiliary pixel.

19. The display device of claim 18, further comprising: a light blocking member defining an opening of the plurality of pixels, wherein the optical pattern includes a same material as the light blocking member.

20. The display device of claim 19, wherein: the auxiliary pixel includes a white pixel or a yellow pixel or a clear pixel.

21. The display device of claim 18, further comprising: a thin film transistor connected with the pixel and including a semiconductor; and a signal line transferring a driving signal to the thin film transistor, wherein the optical pattern includes a same material as at least one of the signal line and the semiconductor.

22. The display device of claim 21, wherein: the auxiliary pixel includes a white pixel or a yellow pixel or a clear pixel.

23. The display device of claim 18, wherein: images of the plurality of optical patterns included in a photographing unit comprising two or more adjacent pixels are different from each other according to a position.

24. The display device of claim 23, wherein: an area of the auxiliary pixel is substantially the same as an area of the basic pixel.

25. The display device of claim 23, wherein: an area of the auxiliary pixel is different from an area of the basic pixel.

26. The display device of claim 23, wherein: the auxiliary pixel includes a white pixel or a yellow pixel or a clear pixel.

27. The display device of claim 17, wherein: the plurality of pixels includes a plurality of basic pixels for expressing full colors, and the plurality of first pixels include any one color pixel among the plurality of basic pixels.

28. The display device of claim 27, wherein: an area of the first pixel is different from an area a remaining pixel except for the first pixel among the plurality of pixels.

29. The display device of claim 28, wherein: an area of the first pixel is larger than an area of the remaining pixel except for the first pixel among the plurality of pixels.

30. The display device of claim 29, further comprising: a light blocking member defining an opening of the plurality of pixels, wherein the optical pattern includes a same material as the light blocking member.

31. The display device of claim 30, wherein: the first color pixel includes any one of a red pixel, a blue pixel, and a green pixel.

32. The display device of claim 29, further comprising: a thin film transistor connected with the pixel and including a semiconductor; and a signal line transferring a driving signal to the thin film transistor, wherein the optical pattern includes a same material as at least one of the signal line and the semiconductor.

33. The display device of claim 32, wherein: the first color pixel includes any one of a red pixel, a blue pixel, and a green pixel.

34. The display device of claim 29, wherein: the optical patterns of at least two pixels among the plurality of first pixels have different shapes or positions from each other.

35. The display device of claim 34, wherein: images of the plurality of optical patterns included in a photographing unit comprising two or more adjacent pixels are different from each other according to a position in the display area of the display device.

* * * * *